United States Patent
Elsharif et al.

(10) Patent No.: US 12,466,741 B2
(45) Date of Patent: Nov. 11, 2025

(54) METHOD TO SYNTHESIZE SILVER NANOHYBRID MATERIAL

(71) Applicant: Imam Abdulrahman Bin Faisal University, Dammam (SA)

(72) Inventors: Asma Mohammed Zamil Elsharif, Dammam (SA); Monerah Ahmed Hassan Almarzooq, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 601 days.

(21) Appl. No.: 17/980,993

(22) Filed: Nov. 4, 2022

(65) Prior Publication Data

US 2024/0150193 A1    May 9, 2024

(51) Int. Cl.
*C01G 5/00* (2006.01)
*B22F 1/054* (2022.01)
*C09D 5/03* (2006.01)

(52) U.S. Cl.
CPC .............. *C01G 5/006* (2013.01); *B22F 1/054* (2022.01); *C09D 5/038* (2013.01)

(58) Field of Classification Search
CPC ........ C01G 5/006; B22F 1/054; B22F 1/0545; B22F 1/0553; B22F 1/102; B22F 9/24; C09D 5/038; C09D 7/62; C09D 5/084; C22C 1/0466; C08K 3/10; C08K 9/04
See application file for complete search history.

(56) References Cited

U.S. PATENT DOCUMENTS

2020/0390908 A1   12/2020   Singh et al.

FOREIGN PATENT DOCUMENTS

| CN | 100553834 C | 10/2009 |
|----|-------------|---------|
| IN | 297476 | 3/2010 |
| JP | 2010229544 A | * 10/2010 |

(Continued)

OTHER PUBLICATIONS

Aiad, et al.; Effect of some prepared surfactants on silver nanoparticles formation and surface solution behavior and their biological activity; Journal of Molecular Liquids, vol. 265; Sep. 15, 2018; Abstract Only; 2 Page.

(Continued)

*Primary Examiner* — Rebecca Janssen
(74) *Attorney, Agent, or Firm* — Oblon, McClelland, Maier & Neustadt, L.L.P.

(57) ABSTRACT

A method to synthesize a silver nanohybrid material. The method includes mixing a nitrate solution with a citrate solution to form silver nanoparticles (AgNPs). The method further includes esterifying a first mixture including octadecanoic acid, octadec-9-enoic acid, and octadeca-9,12-dienoic acid with caffeic acid in the presence of an acid catalyst and a solvent to form an unsaturated carboxylic acid mixture including first, second, and third acrylic acid derivatives. The method includes reacting the unsaturated carboxylic acid mixture with ethylene glycol to form a second mixture including first, second, and third ester derivatives. The method further includes mixing the AgNPs with the second mixture to form a third mixture. The method includes evaporating water from the third mixture to form the silver nanohybrid material. The silver nanohybrid material includes a AgNP core covered with the first, second, and third ester derivatives bonded to the AgNP core.

11 Claims, 77 Drawing Sheets

(56) References Cited

FOREIGN PATENT DOCUMENTS

KR    10-2297118    9/2021
KR    10-2330638    11/2021

OTHER PUBLICATIONS

Badr, et al.; Synthesis of Schiffbase-based cationic Gemini surfactants andevaluation of their effect on in-situ AgNPs preparation: Structure,catalytic, and biological activity study; Journal of Molecular Liquids, vol. 326; Mar. 15, 2021 ' Abstract Only; 2 Pages.

* cited by examiner

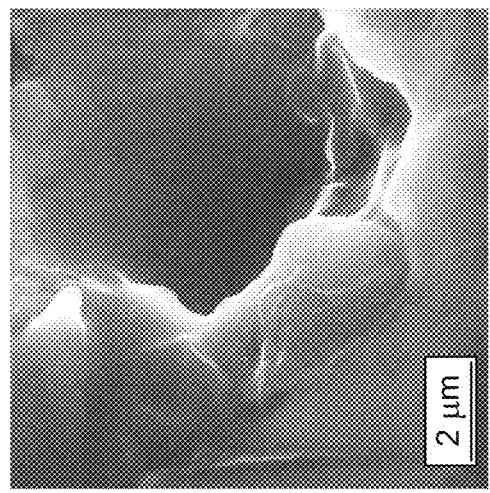
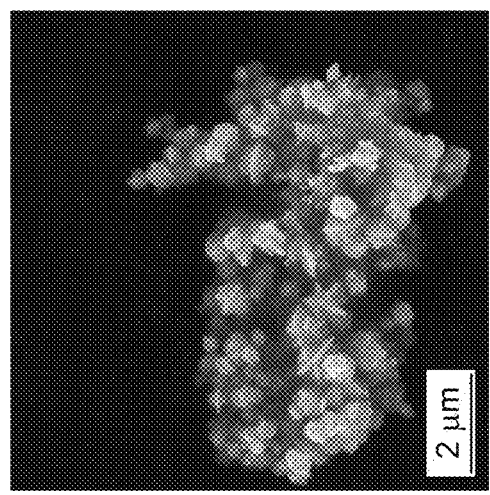
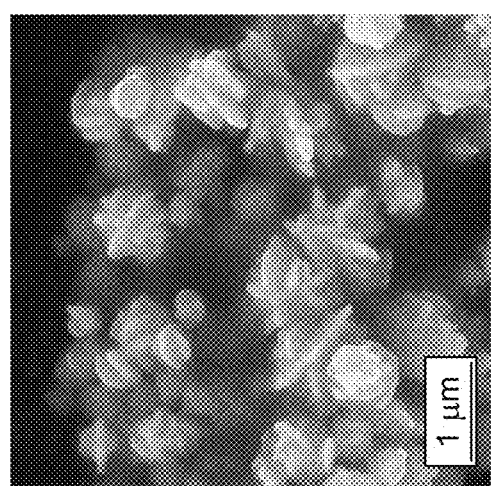
FIG. 25C
FIG. 25B
FIG. 25A

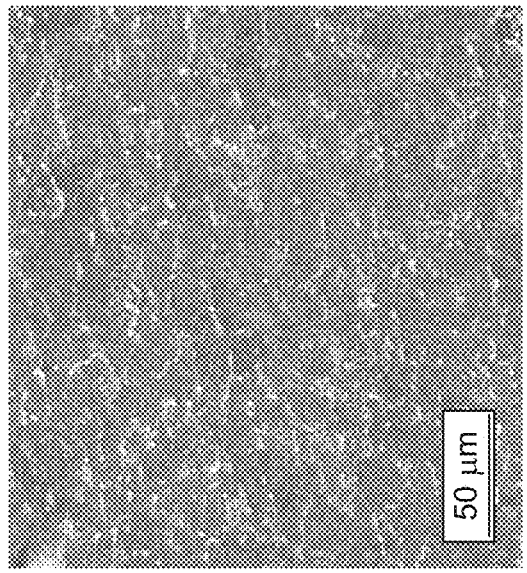
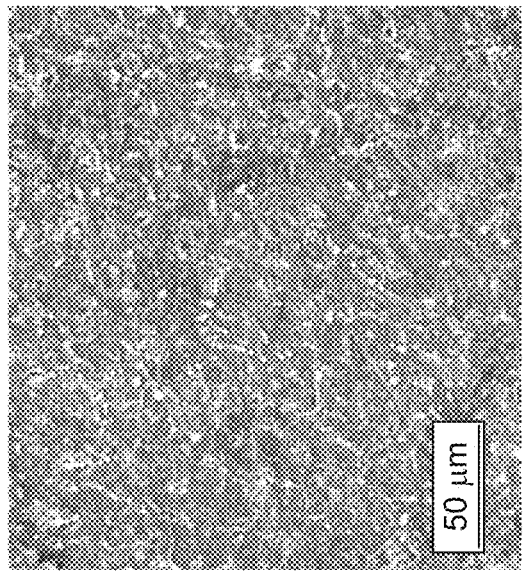
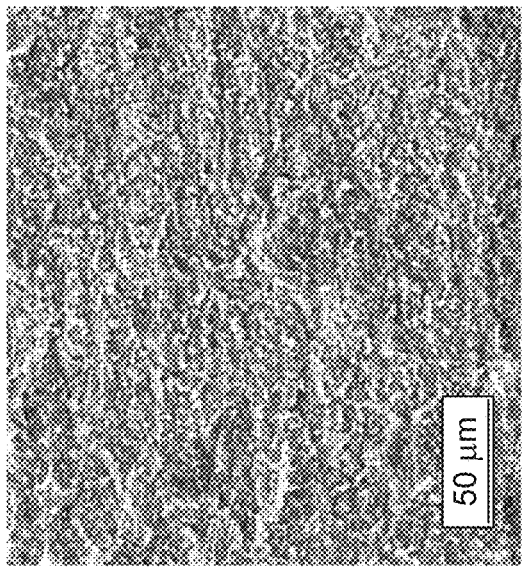
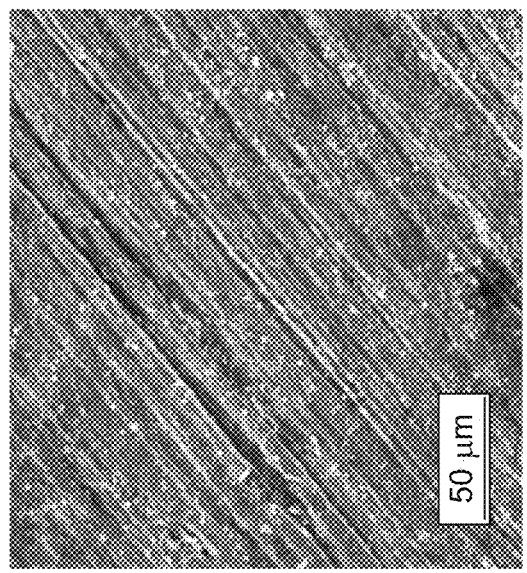
FIG. 31A
FIG. 31B
FIG. 31C
FIG. 31D

HOMO orbitals

HOMO orbitals

HOMO orbitals

HOMO orbitals

HOMO orbitals

LUMO orbitals

LUMO orbitals

LUMO orbitals

LUMO orbitals

HOMO orbitals

HOMO orbitals

HOMO orbitals

HOMO orbitals

HOMO orbitals

LUMO orbitals

LUMO orbitals

LUMO orbitals

LUMO orbitals

LUMO orbitals

METHOD TO SYNTHESIZE SILVER NANOHYBRID MATERIAL

BACKGROUND

Technical Field

The present disclosure is directed to nanomaterials, and particularly to a method to synthesize a silver nanohybrid material.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

One of the biggest causes of environmental and economic losses is the phenomenon of metal corrosion in industry. Corrosion is defined as the decomposition of metals and the change in corresponding basic properties of the metals, which leads to poor robustness, due to corresponding chemical interactions with the environment, leading to environmental degradations and huge industrial economic losses [Shaban, S. M., Elsharif, A. M., Elged, A. H., Eluskkary, M. M., Aiad, I., & Soliman, E. A. Envir. Tech.& Innovation. 24 (2021) 102051; Liu, J., Wang, D., Gao, L., & Zhang, D. Applied Surface Sci. 389 (2016) 369-377; Zhu, H., Li, X., Lu, X., Wang, J., Hu, Z., & Ma, X. Bioelectrochemistry. 140 (2021) 107809; Shaban, S. M., Abd Elsamad, S., Tawfik, S. M., Adel, A. H., & Aiad, I. Jour. of Molecular Liq. 316 (2020) 113881].

In the petroleum field, corrosion occurs as leaks in tanks, pipes, or equipment, causing the metals to change into another form. Corrosion increases in oil fields when a small quantity of $O_2$ is present in a sour brine system. Also, large amounts of hydrogen sulfide and carbon dioxide present in the water of oil wells increases corrosion [Al-Sabagh, A. M., Nasser, N. M., Khamis, E. A., & Mahmoud, T. Egyptian Journal of Petroleum. 26 (1), (2017) 41-51; Speller, F. N. Corrosion (Causes and Prevention) McGraw-Hill Book Company Inc, New York 1951; B. Rid, T. J. Blakset, D. Queen, Corrosion, NACE, Houston, Texas, Paper No (78) (1998); Tomas, O. A., & Alan, P. R. Oil and Gas Consultants International. 2 (1985); McMahon, A. J. Colloids and Surfaces. 59 (1991) 187-208; Clint, J. H. Surfactant aggregation. Springer Science & Business Media (2012); Osman, M. M., Omar, A. M. A., & Al-Sabagh, A. M. Materials Chem. and Physi. 50 (3), (1997) 271-274]. Therefore, the use of corrosion inhibitors becomes necessary to protect metals, such as steel, in the industry.

The performance of organic corrosion inhibitors such as surfactants and natural products is related to their corresponding chemical composition which leads to the formation of a protective coating layer based on electron-rich groups such as oxygen, nitrogen, sulfur, and double bonds. It enhances the adsorption on a surface of the steel and interacts with the vacant steel d-orbital in an acidic medium [Shaban, S. M., Elbhrawy, M. F., Fouda, A. S., Rashwan, S. M., Ibrahim, H. E., & Elsharif, A. M. Jour. of Molecular Structure. 1227 (2021) 129713; Branzoi, V., Branzoi, F., & Baibarac, M. Materials chem. and phys. 65(3), (2000) 288-297; Heakal, F. E. T., & Elkholy, A. E. Jour. of Molecular Liq. 230 (2017) 395-407; Kaczerewska, O., Leiva-Garcia, R., Akid, R., Brycki, B., Kowalczyk, I., & Pospieszny, T. Jour. of Molecular Liq. 249 (2018) 1113-1124; Adewuyi, A., Gopfert, A., & Wolff, T. Indust. Crops and Produc. 52 (2014) 439-449; Qiang, Y., Li, H., & Lan, X Jour. of Materials Scie. & Technology. 52 (2020) 63-71; Qiang, Y., Zhang, S., & Wang, L. Applied Surface Science, 492 (2019) 228-238; Qiang, Y., Guo, L., Li, H., & Lan, X. Chem. Engineering Journal. 406 (2021) 126863; Keramatinia, M., Ramezanzadeh, B., & Mahdavian, M.). Journ. of the Taiwan Institute of Chem. Engineers. 105 (2019) 134-149; Ramezanzadeh, M., Bahlakeh, G., Sanaei, Z., & Ramezanzadeh, B. Applied Surface Science. 463 (2019) 1058-1077; Shaban, S. M., Aiad, I., Yassin, F. A., & Mosalam, A. Journal of Surfactants and Detergents. 22(6), (2019) 1445-1460; Zhu, Y., & Free, M. L. Colloids and Surfaces A: Physicochemical and Engineering Aspects. 489(2016) 407-422; Aiad, I., Shaban, S. M., Tawfik, S. M., Khalil, M. M., & El-Wakeel, N. Jour. of Molecular Liq. 266 (2018) 381-392; Shaban, S. M., El-Sherif, R. M., & Fahim, M. A. Jour. of Molecular Liq. 252 (2018) 40-51; Hegazy, M. A., El-Tabei, A. S., Bedair, A. H., & Sadeq, M. A. Corrosion Science. 54 (2012) 219-230; Shaban, S. M., Aiad, I., El-Sukkary, M. M., Soliman, E. A., & El-Awady, M. Y. Jour. of Molecular Liq. 207 (2015) 256-265; M. A. Migahed, M. Abd-El-Raouf, A. M. Al-Sabagh, H. M. Abd-El-Bary. Electrochimica Acta. 50 (24) (2005) 4683-4689].

Among the latest materials used to prevent corrosion are surfactants, due to their corresponding distinctive composition, which includes hydrophilic and hydrophobic parts. The hydrophobic tail acts as a protective layer, while the hydrophilic head interacts with the steel surface via electron-rich groups, present on its surface, with high affinity. The materials have been classified into several types, including ionic, nonionic, cationic, or other [Heakal, F. E. T., & Elkholy, A. E. Jour. of Molecular Liq. 230 (2017) 395-407; Migahed, M. A., Alsabagh, A. M., Abdou, M. I., Adel, A. H., & Aboulrous, A. A. Jour. of Molecular Liq. 281 (2019) 528-541; Liang, Y., Li, H., Li, M., Mao, X., Li, Y., Wang, Z., & Hao, X. Jour. of Molecular Liq. 280 (2019) 319-326]. With increasing attention to environmental issues, the chemical industry is moving towards the production of more environmentally friendly surfactants that are derived from renewable sources. Most new materials are non-ionic surfactants that are completely manufactured from natural and renewable sources such as plant oils. [Negm, N. A., El Farargy, A. F., Mohammed, D. E., & Mohamad, H. N. Jour. of Surfactants and Detergents. 15(4), (2012) 433-443; Britton, L. N. Jour. of surfactants and Detergents.1(1), (1998) 109-117; Zhao, F., Clarens, A., Murphree, A., Hayes, K., & Skerlos, S. J. Environmental science & technology. 40(24), (2006) 7930-7937; Huang, H., & Verrall, R. E. Jour.l of solution chem. 26(2), (1997) 135-162; Negm, N. A., & Mohamed, A. S. Jour. of Surfactants and Detergents. 11(3), (2008) 215-221; Negm, N. A., & Zaki, M. F. Physicochemical and Engineering Aspects. 322(1-3), (2008) 97-102; Jurado, E., Vicaria, J. M., Fernandez-Arteaga, A., Chachalis, P., & Garcia-Martin, J. F. Jour. of surfactants and detergents. 13(4), (2010) 497-501].

Nonionic surfactants have a very low toxicity level and have many different applications and uses such as for wetting agents, detergents, and emulsifiers, and adjuvants for pharmaceuticals, cosmetics, and food products [Lee, S., Lee, J., Yu, H., & Lim, J. Jour. of Industrial and Engineering Chem. 38 (2016) 157-166; Miller, C. A., & Neogi, P. EdsInterfacial phenomena: equilibrium and dynamic effects (CRC Press) 139 (1985); T. Froṁe, P. Knepper, Trends Anal. Chem. 27 (2008) 1091; Li, X., Turánek, J., Knötigová, P., Kudláčková, H., Mašek, J., Parkin, S., Rankin, S., Knutson, B. & Lehmler, H. J. Biointerfaces. 73(1), (2009) 65-74; Jurado, E., Fernindez-Serrano, M., Camacho, F., Olea, J. N., Lechuga, M., & Luzón, G. Chem. Engineering Jour. 150(2-3), (2009) 440-446; Wen, Y., Xu, J., He, H., Lu, B., Li, Y., & Dong, B. Jour. of Electroanalytical Chem. 634(1), (2009) 49-58; Butt, C. M., Berger, U., Bossi, R., & Tomy, G. T. Science of the total environment. 408(15), (2010) 2936-2965; Negm, N. A., Kandile, N. G., Aiad, I. A., & Mohammad, M. A. Physicochemical and Engineering Aspects. 391(1-3), (2011) 224-233. Stoppel, W. L., White, J. C., Horava, S. D., Bhatia, S. R., & Roberts, S. C. Acta biomaterialia. 7(11), (2011) 3988-3998; Piętka-Ottlik, M., Frąckowiak, R., Maliszewska, I., Kolwzan, B., & Wilk, K. A. Chemosphere. 89(9), (2012) 1103-1111; Oldham, E. D., Seelam, S., Lema, C., Aguilera, R. J., Fiegel, J., Rankin, S. E., et al. Carbohydrate research. 379 (2013) 68-77; Brycki, B., Waligórska, M., & Szulc, A. Jour. of hazardous materials. 280 (2014) 797-815; Negm, N. A., & Tawfik, S. M. Jour. of Industrial and Engineering Chem. 20(6), (2014) 4463-4472; Lim, J. C., Lee, M. C., Lim, T. K., & Kim, B. J. Physicochemical and Engineering Aspects. 446 (2014) 80-89; Park, S. H., & Bae, J. Jour. of Industrial and Engineering Chem. 30 (2015) 1-9. Fatma, N., Panda, M., & Ansari, W. H. Jour. of Molecular Liq. 211 (2015) 247-255].

In recent years, the application of surfactants has extended to the field of nanotechnology, where the surfactants are used to prepare and modify nanoparticles. Previous research has shown that mixtures of nanoparticles with surfactants have two effects on organisms. Firstly, the surfactants can absorb on the surface of nanoparticles so that the surfactant prevents interaction between bacteria and nanoparticles by steric hindrance and charge repulsion and thus reduce the toxicity of nanoparticles. Also, the surfactants can change the surface charge of nanoparticles by adhesion to the nanoparticle surface and thus change corresponding toxicity and dispersibility [Azzam, E. M. S., & Zaki, M. F. Egyptian Jour. of Petroleum. 25(2), (2016) 153-159; Jain, T. K., Morales, M. A., Sahoo, S. K., Leslie-Pelecky, D. L., & Labhasetwar, V. Molecular pharmaceutics. 2(3), (2005) 194-205; Lovern, S. B., & Klaper, R. Environmental Toxicology and Chemistry: An International Journal. 25(4), (2006) 1132-1137; LW, Z. Zeng L, Barron A R, Monteiro-Riviere N A. Int J Toxicol. 26 (2007) 103-113; Elsherif, A., Elged, A. H., & Shaban, S. M. Surfaces and Interfaces. 27 (2021) 101530; Naderi, O., Nyman, M., Amiri, M., & Sadeghi, R. Jour. of Molecular Liq. 273 (2019) 645-652. [Fernando, I., Qian, T., & Zhou, Y. Environmental research, 179 (2019) 108781].

Although numerous methods to synthesize AgNPs have been identified in the past, there still exists a need to develop a surfactant assistant method for the synthesis of silver nanohybrid materials that contain AgNPs that can overcome the limitations of the art.

SUMMARY

In an exemplary embodiment, a method to synthesize a silver nanohybrid material is described. The method includes mixing a silver nitrate solution with a citrate solution to form silver nanoparticles (AgNPs). The method further includes esterifying a first mixture including octadecanoic acid, octadec-9-enoic acid, and octadeca-9,12-dienoic acid, with caffeic acid in the presence of an acid catalyst and a solvent to form an unsaturated carboxylic acid mixture including first, second, and third acrylic acid derivatives. The method further includes reacting the unsaturated carboxylic acid mixture with ethylene glycol to form a second mixture including first, second, and third ester derivatives. The method further includes mixing the silver nanoparticles with the second mixture to form a third mixture. The method further includes evaporating water from the third mixture to form the silver nanohybrid material. The silver nanohybrid material includes a silver nanoparticle core covered with the first, second, and third ester derivatives bonded to the silver nanoparticle core by hydrophobic tails of the first, second, and third ester derivatives.

In some embodiments, the citrate solution is trisodium citrate, the acid catalyst is p-toluene sulfonic acid, and the solvent is xylene. In some embodiments, the first unsaturated carboxylic acid derivative is (E)-3-(3,4-bis(stearoyloxy)phenyl)acrylic acid, the second unsaturated carboxylic acid derivative is (E)-3-(3,4-bis((E)-octadec-9-enoyloxy)phenyl)acrylic acid, and the third unsaturated carboxylic acid derivative is (E)-3-(3,4-bis((9E,12E)-octadeca-9,12-dienoyloxy)phenyl)acrylic acid. In some embodiments, the first ester derivative is (E)-4-(3-(2-hydroxyethoxy)-3-oxoprop-1-en-1-yl)-1,2-phenylene distearate, the second ester derivative is (Z)-4-((E)-3-(2-hydroxyethoxy)-3-oxoprop-1-en-1-yl)-1,2-phenylene dioleate (HDPO), and the third ester derivative is (9Z,9'Z,12Z,12'Z)-4-((E)-3-(2-hydroxyethoxy)-3-oxoprop-1-en-1-yl)-1,2-phenylene bis(octadeca-9,12-dienoate).

In some embodiments, the octadecanoic acid, the octadec-9-enoic acid, and the ocatdeca-9,12-dienoic acid are present in the first mixture in an amount ranging from 0.005 mole to 0.25 mole per mole solvent.

In some embodiments, the ethylene glycol is present in an amount from 0.005 mole to 0.25 mole per mole unsaturated carboxylic acid mixture.

In some embodiments, wherein the acid catalyst is present in an amount from 0.01 weight % (wt. %) to 1 wt. % of the solvent.

In some embodiments, the citrate solution is present in an amount from 1 milliliter (mL) to 25 mL per mL of the silver nitrate solution.

In some embodiments, the esterifying occurs in a temperature range of from 125 degrees Celsius (° C.) to 175° C.

In some embodiments, the esterifying further comprises washing the formed unsaturated carboxylic acid mixture with petroleum ether.

In some embodiments, the solvent consists essentially of xylene.

In some embodiments, the solvent consists of xylene.

In some embodiments, the silver nanoparticles are added to the second mixture in the form of a suspension, and the silver nanoparticles are present in the suspension at a weight percent (wt. %) of at least 1 wt. % per toal weight of the suspension.

In some embodiments, the method further comprises applying a treatment composition comprising a AgNP-(E)-4-(3-(2 hydroxyethoxy)-3-oxoprop-1-en-1-yl)-1,2-phenylene distearate (LANH) silver nanohybrid material to a metal substrate to form an anti-corrosive coating.

In some embodiments, the metal substrate treated with the treatment composition has a measurable corrosion rate of less than 0.25 millimeters per year (mmpy).

In some embodiments, the metal substrate treated with the treatment composition has an inhibition efficiency of at least 96% compared to a metal substrate not treated with the treatment composition, wherein inhibition efficiency is determined by measuring the inhibition efficiency of the metal substrate with a stainless steel tag and insulated cord.

In some embodiments, the method further comprises applying a treatment composition comprising a AgNP-(Z)-4-((E)-3-(2-hydroxyethoxy)-3-oxoprop-1-en-1-yl)-1,2-phenylene dioleate (OANH) silver nanohybrid material to a metal substrate to form an anti-corrosive coating.

In some embodiments, the metal substrate treated with the silver nanohybrid material has a measurable corrosion rate of less than 0.55 mmpy.

In some embodiments, the metal substrate treated with the silver nanohybrid material has an inhibition efficiency of at least 92.5% compared to a metal substrate not treated with the silver nanohybrid material, wherein inhibition efficiency is determined by measuring the inhibition efficiency of the metal substrate with a stainless steel tag and insulated cord.

In some embodiments, the method further comprises applying a treatment composition comprising a AgNP-(9Z,9′Z,12Z,12′Z)-4-((E)-3-(2-hydroxyethoxy)-3-oxoprop-1-en-1-yl)-1,2-phenylene bis(octadeca-9,12-dienoate) (SANH) silver nanohybrid material to a metal substrate to form an anti-corrosive coating.

In some embodiments, the metal substrate treated with the silver nanohybrid material has a measurable corrosion rate of less than 0.08 mmpy.

In some embodiments, the metal substrate treated with the silver nanohybrid material has an inhibition efficiency of at least 98.5% compared to a metal substrate not treated with the silver nanohybrid material, wherein inhibition efficiency is determined by measuring the inhibition efficiency of the metal substrate with a stainless steel tag and insulated cord.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 25A is a scanning electron microscope (SEM) micrograph of AgNPs of 20-25 nanometers (nm) sample at a magnification of 1 micrometer (m), according to certain embodiments of the present disclosure;

FIG. 25B is a SEM micrograph of the AgNPs of 20-25 nm sample at a magnification of 2 m, according to certain embodiments of the present disclosure;

FIG. 25C is a SEM micrograph of a AgNP-(9Z,9'Z,12Z, 12'Z)-4-((E)-3-(2-hydroxyethoxy)-3-oxoprop-1-en-1-yl)-1, 2-phenylene bis(octadeca-9,12-dienoate) (SANH) at magnification of 2 m, according to certain embodiments of the present disclosure;

FIG. 31A is a SEM micrograph of the mild steel specimen immersed in the absence of inhibitors (blank) in 1.0 M HCl at 100 ppm at a magnification of 50 m, according to certain embodiments of the present disclosure;

FIG. 31B is a SEM micrograph of the mild steel specimen immersed with the presence of the SANH in 1.0 M HCl at 100 ppm at a magnification of 50 m, according to certain embodiments of the present disclosure;

FIG. 31C is a SEM micrograph of the mild steel specimen immersed with the presence of the OANH in 1.0 M HCl at 100 ppm at a magnification of 50 m, according to certain embodiments of the present disclosure;

FIG. 31D is a SEM micrograph of the mild steel specimen immersed with the presence of the LANH in 1.0 M HCl at 100 ppm at a magnification of 50 m, according to certain embodiments of the present disclosure;

DETAILED DESCRIPTION

Figure 1:
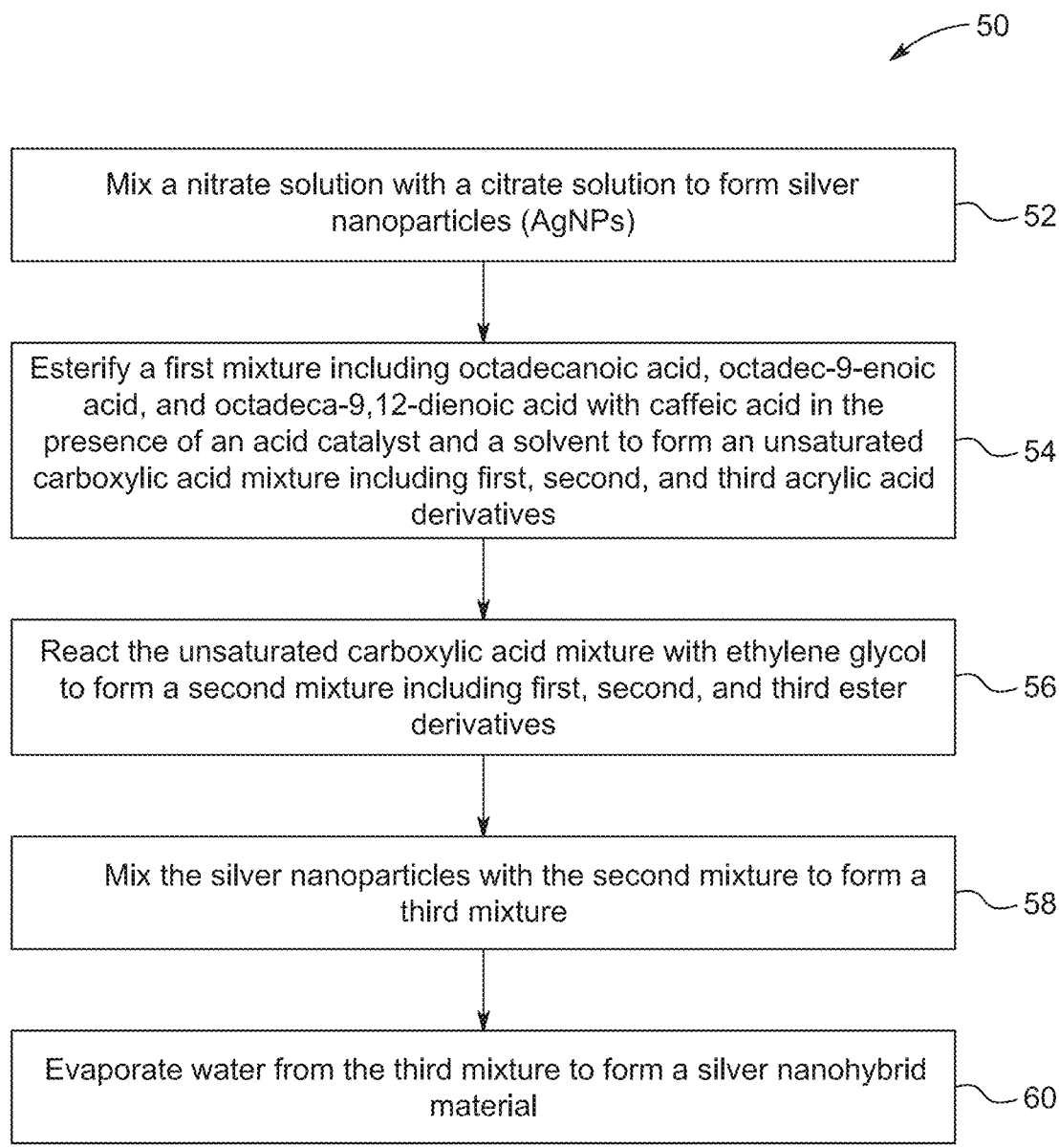
FIG. 1 is a schematic flow diagram of a method to synthesize a silver nanohybrid material, according to certain embodiments of the present disclosure.
Figure 2A:
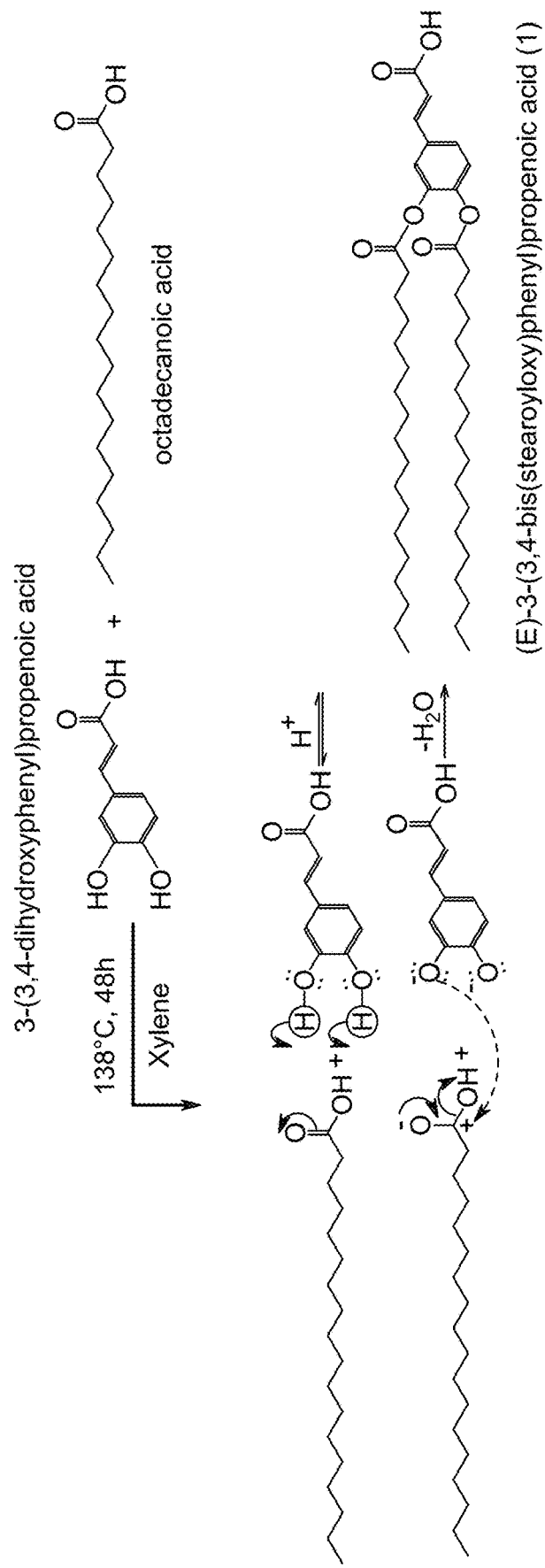
FIG. 2A is a schematic diagram depicting synthesis of (E)-3-(3,4-bis(stearoyloxy)phenyl)acrylic acid (SPAA), according to certain embodiments of the present disclosure.
Figure 2B:
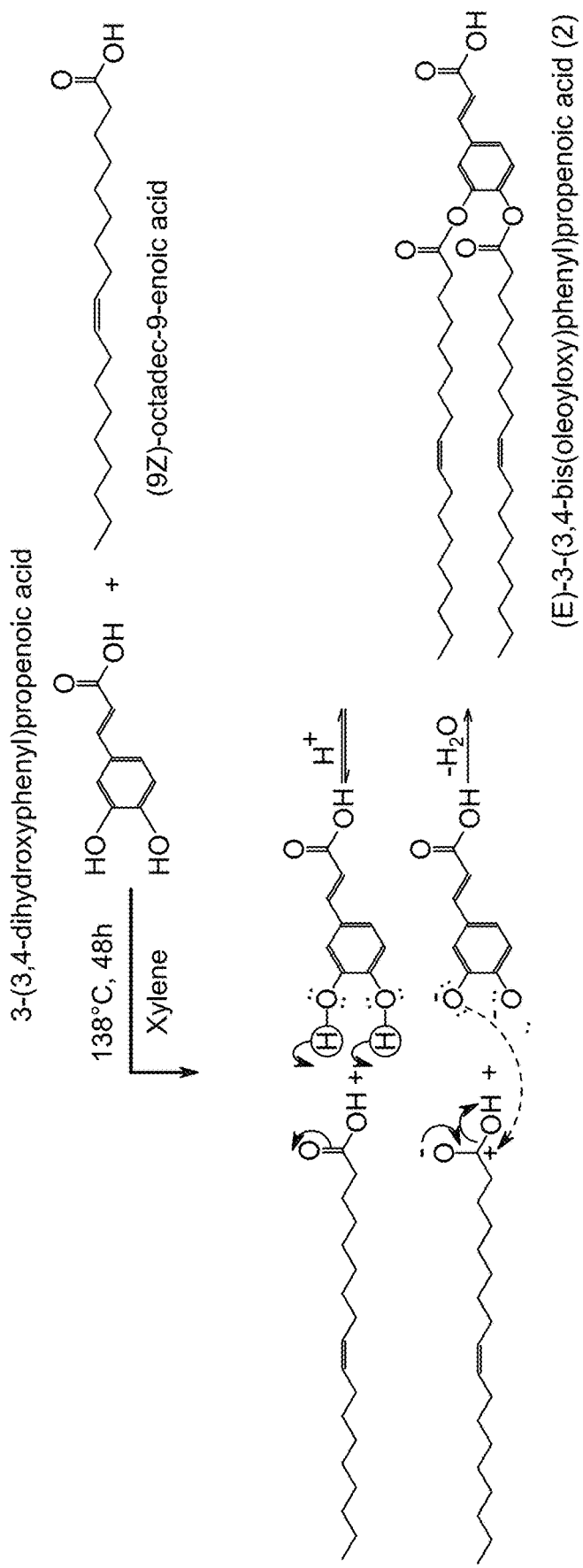
FIG. 2B is a schematic diagram depicting synthesis of (E)-3-(3,4-bis(oleoyloxy)phenyl)acrylic acid (OPAA), according to certain embodiments of the present disclosure.
Figure 2C:
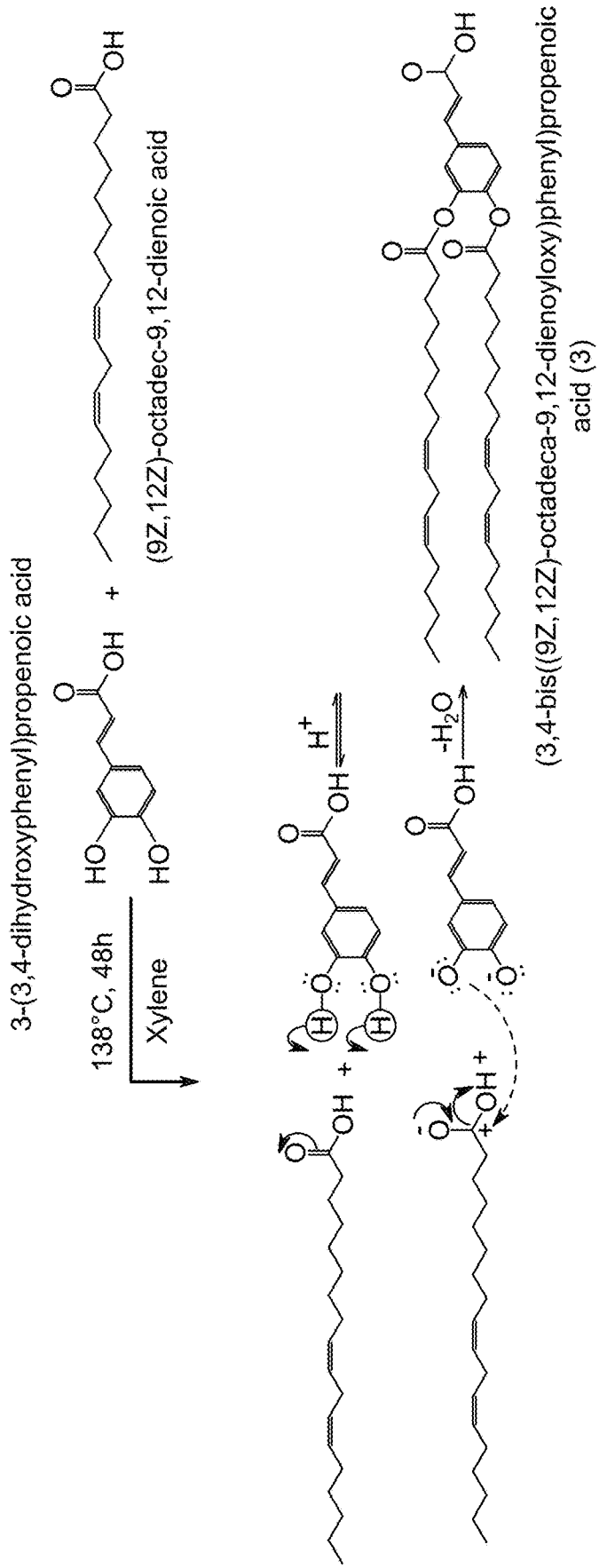
FIG. 2C is a schematic diagram depicting synthesis of (E)-3-(3,4-bis((9Z,12Z)-octadeca-9,12-dienoyloxy)phenyl) acrylic acid (ODPAA), according to certain embodiments of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed towards a cost-effective method of synthesizing a silver nanohybrid material, also referred to as the silver nanohybrid derivatives. In the present disclosure, non-ionic surfactants including more than one active site and corresponding nanohybrid derivatives are characterized and synthesized as effective corrosion inhibitors against mild steel using an environmentally friendly synthesis method. Although the description herein refers to the use of the silver nanohybrid material on mild steel for corrosion inhibition, it may be understood by a person skilled in the art that aspects of the present disclosure may be applied to other substrates such as carbon steel, stainless steel, and any other metallic substrate albeit with a few variations, as may be evident to a person skilled in the art. In addition, the metal when coated with the silver nanohybrid material of the present disclosure exhibits longer service life, enhanced biocompatibilities, long-lasting antibacterial properties, stronger adsorption, and consequently higher suppression of the mild steel corrosion, thereby circumventing the drawbacks such as high manufacturing cost, and low corrosion resistance properties of the prior art.

FIG. 1 shows a schematic flow diagram of a method 50 to synthesize a silver nanohybrid material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes mixing a nitrate solution with a citrate solution to form silver nanoparticles (AgNPs). In some embodiments, the citrate solution is present in an amount from 1 milliliter (mL) to 25 mL, more preferably 10-20 mL, more preferably 12-18 mL, more preferably 14-16 mL, or 15 mL per amount of the nitrate solution. The nitrate solution is a solution of silver nitrate ($AgNO_3$). In some embodiments, a molar ratio of the citrate solution to the silver nanoparticles formed is from 0.5:1 to 3:1, preferably from 1:1 to 2:1, or 1.5:1. In some embodiments, a molar ratio of the nitrate solution to the silver nanoparticles formed is from 5:1 to 30:1, preferably from 10:1 to 20:1, or 15:1. In some embodiments, the nitrate solution is used in an amount of $1\times10^{-3}$ M per mole nitrate solution, preferably $1\times10^{-4}$ to $1\times10^{-2}$ M per mole nitrate solution. In an embodiment, another silver salt, such as silver perchlorate ($AgClO_4$), silver chlorate ($AgClO_3$), silver chloride (AgCl), silver iodide (AgI), silver fluoride (AgF), silver bromide (AgBr), silver acetate ($CH_3COOAg$), etc., may be used instead of silver nitrate. The citrate solution may be a solution of, sodium citrate, calcium citrate, magnesium citrate, and triethyl citrate. In some embodiments, the citrate solution is preferably trisodium citrate. In some embodiments, the AgNPs may be synthesized by any of the methods known in the art; the choice of the method is dependent on desired size and morphology. In some embodiments, the nitrate solution is heated to boiling before mixing with the citrate solution. In some embodiments, the citrate solution is added dropwise to the heated nitrate solution.

At step 54, the method 50 mfurther includes esterifying a first mixture including octadecanoic acid (stearic acid), octadec-9-enoic acid (oleic acid) and octadeca-9,12-dienoic acid (linoleic acid) with 3-(3,4-dihydroxyphenyl)propenoic acid (caffeic acid) in the presence of an acid catalyst and a solvent to form an unsaturated carboxylic acid mixture including first, second, and third acrylic acid derivatives. In some embodiments, the esterification process occurs in a temperature range of from 125° C. to 175° C., preferably from 135° C. to 165° C., preferably from 145° C. to 155° C., or 150° C., in the presence of an acid catalyst and a solvent. The acid catalyst may include, but is not limited to, sulfuric acid, sulfonic acid, hydrochloric acid, organic sulfonic acid, fumaric acid, and ferric sulfate. In some embodiments, the acid catalyst is p-toluene sulfonic acid. The solvent may be any organic solvent used in an esterification reaction. In an embodiment, the solvent is toluene. In some embodiments, the solvent is xylene. In some embodiments, the xylene is present in an amount from 10 mL to 100 mL, preferably 20 mL to 80 mL, preferably 40 mL to 60 mL, or 50 mL during the esterifying. In some embodiments, the acid catalyst is present in an amount from 0.01 weight % (wt. %) to 1 wt. % of the solvent, preferably between 0.05 wt. % to 0.1 wt. % of the solvent, or 0.075 wt. % of the solvent. The esterification reaction yields an unsaturated carboxylic acid mixture including first, second, and third acrylic acid derivatives. The first unsaturated carboxylic acid derivative is (E)-3-(3,4-bis(stearoyloxy)phenyl)acrylic acid, the second unsaturated carboxylic acid derivative is (E)-3-(3,4-bis((E)-octadec-9-enoyloxy)phenyl)acrylic acid, and the third unsaturated carboxylic acid derivative is (E)-3-(3,4-bis((9E,12E)-octadeca-9,12-dienoyloxy)phenyl)acrylic acid.

Figure 3:
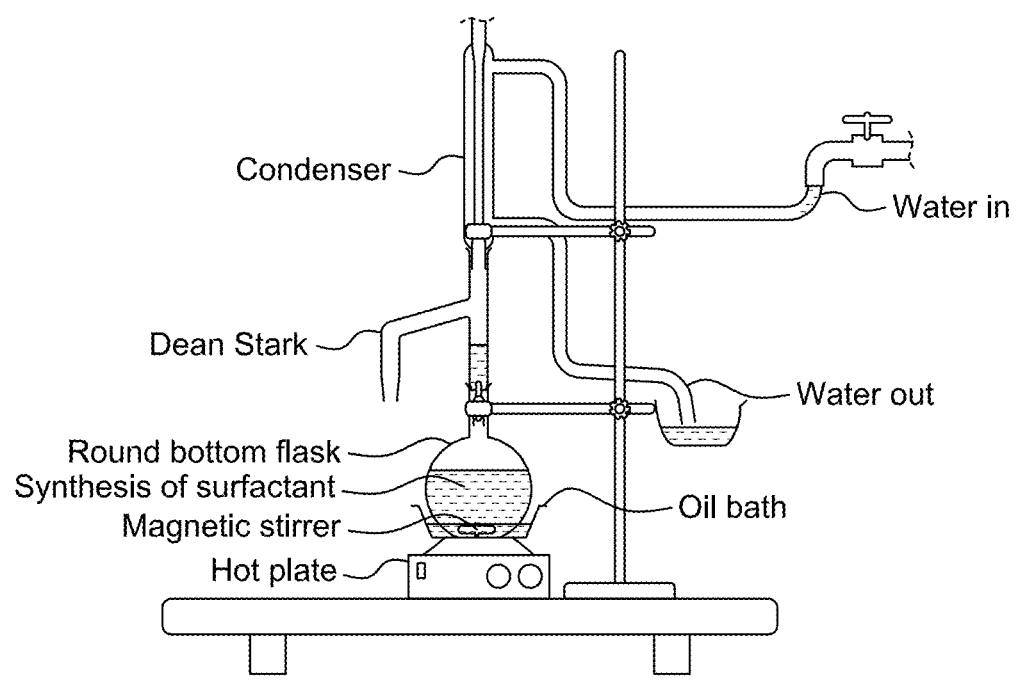
FIG. 3 depicts an experimental setup for the preparation of surfactants, according to certain embodiments of the present disclosure.

In some embodiments, the octadecanoic acid, the octadec-9-enoic acid, and the ocatdeca-9,12-dienoic acid are present in the first mixture in an amount ranging from 0.005 mole to 0.25 mole per mole solvent, preferably from 0.01 mole to 0.20 mole per mole solvent, preferably 0.05 mole to 0.15 mole per mole solvent, or 0.1 mole per mole solvent. In some embodiments, the esterification reaction may be optionally followed by washing the unsaturated carboxylic acid mixture with a solvent, for example, petroleum ether. In some embodiments, washing the unsaturated carboxylic acid mixture occurs with dichloromethane. In some embodiments, step 54 was conducted under a fume hood, which has a condenser connected to a water hose on one side and from the bottom to a Dean-Stark apparatus connected to the round flask 250 ml in the oil bath under the magnetic heating stirrer, as depicted in FIG. 3. In some embodiments, a magnetic stirrer was added to the round flask to facilitate mixing. In some embodiments, a vacuum rotary evaporator was used to evaporate the excess petroleum ether solvent from the unsaturated carboxylic acid mixture At step 56, the method 50 further includes reacting the unsaturated carboxylic acid mixture with ethylene glycol to form a second mixture including first, second, and third ester derivatives. In some embodiments, the xylene is present in an amount from 10 mL to 100 mL, preferably 20 mL to 80 mL, preferably 40 mL to 60 mL, or 50 mL during reacting the unsaturated carboxylic acid mixture with ethylene glycol to form the second mixture. In some embodiments, the ethylene glycol is present in an amount from 0.005 mole to 0.25 mole per mole unsaturated carboxylic acid mixture, preferably from 0.01 mole to 0.20 mole per mole of the unsaturated carboxylic acid mixture, preferably from 0.05 mole to 0.15 mole per mole of the unsaturated carboxylic acid mixture, or 0.1 mole per mole of the unsaturated carboxylic acid mixture. The first ester derivative is (E)-4-(3-(2-hydroxyethoxy)-3-oxoprop-1-en-1-yl)-1,2-phenylene distearate, the second ester derivative is (Z)-4-((E)-3-(2-hydroxyethoxy)-3-oxoprop-1-en-1-yl)-1,2-phenylene dioleate (HDPO), and the third ester derivative is (9Z,9'Z,12Z,12'Z)-4-((E)-3-(2-hydroxyethoxy)-3-oxoprop-1-en-1-yl)-1,2-phenylene bis(octadeca-9,12-dienoate). In some embodiments, the reacting the unsaturated carboxylic acid mixture is reacted with propylene glycol. In some embodiments, the second mixture is allowed to reflux until all the water was removed from the second mixture. In some embodiments, the reacting the unsaturated carboxylic acid mixture with ethylene glycol may be optionally followed by washing the second mixture with a solvent, for example, petroleum ether. In some embodiments, a vacuum rotary evaporator is used to evaporate the excess petroleum ether solvent from the second mixture.

At step 58, the method 50 further includes mixing the silver nanoparticles with the second mixture to form a third mixture. In some embodiments, the silver nanoparticles are added to the second mixture in the form of a mixture and/or suspension in a solvent or carrier, and the silver nanoparticles are present in the mixture at a weight percent (wt. %) of at least 1 wt. % per total weight of the mixture, preferably from 1 to 20 wt. %, preferably at least 20 wt %, or at least 25 wt. %. In some embodiments, a molar ratio of the silver nitrate to the citrate is from 1:1 to 1:5, preferably from 1:1 to 1:3, preferably from 1:1 to 1:1.5 or about 1:1. In some embodiments, the second mixture was added dropwise to the silver nanoparticles. In some embodiments, mixing, e.g., with a magnetic stirrer, is conducted while the silver nanoparticles are added to the flask to facilitate mixing.

Figure 5:
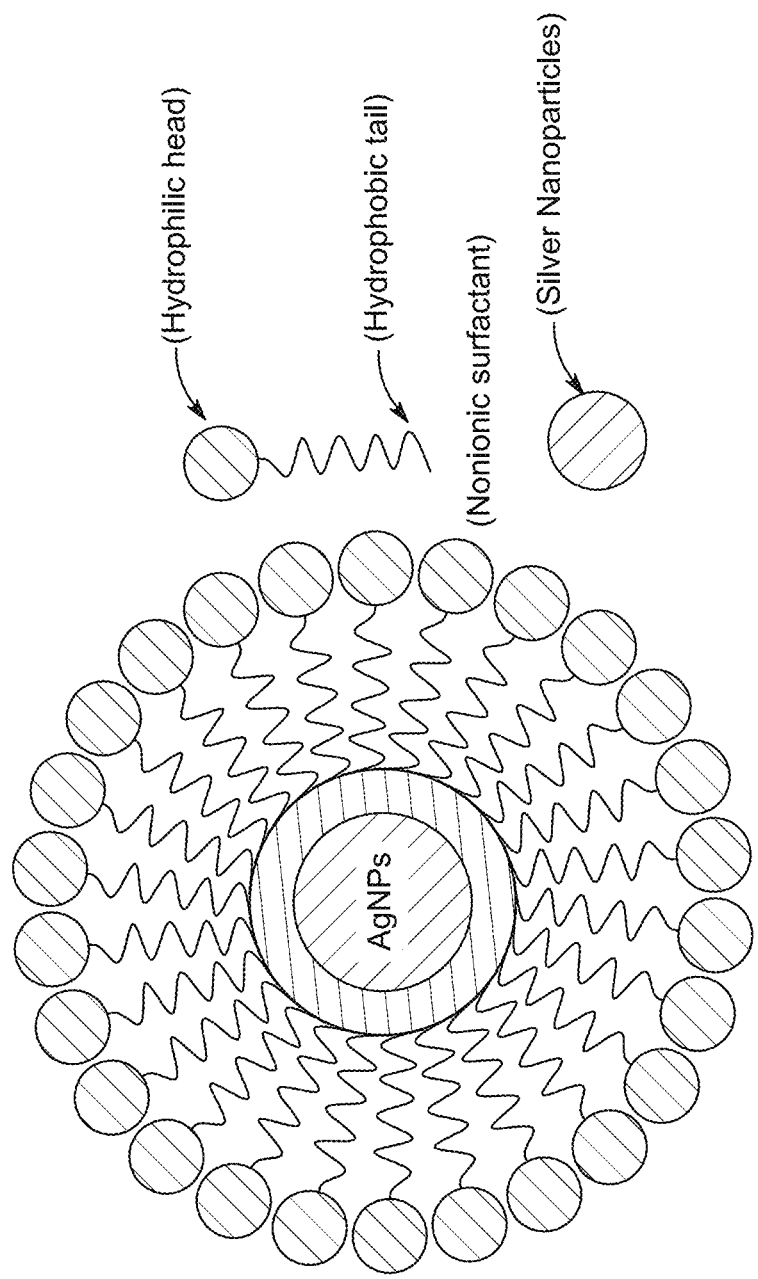
FIG. 5 is a schematic diagram of synthesis of silver nanohybrids such as silver nanoparticles/(E)-4-(3-(2-hydroxyethoxy)-3-oxoprop-1-en-1-yl)-1,2-phenylene-distearate (AgNPs/HPDS), silver nanoparticles/(Z)-4-((E)-3-(2-hydroxyethoxy)-3-oxoprop-1-en-1-yl)-1,2-phenylene dioleate (AgNPs/HPDO) and silver nanoparticles/(9Z,9′Z,12Z,12′Z)-4-((E)-3-(2-hydroxyethoxy)-3-oxoprop-1-en-1-yl)-1,2-phenylenebis(octadeca-9,12-dienoate (AgNPs/HPDE, according to certain embodiments of the present disclosure.

At step 60, the method 50 further includes evaporating water from the third mixture to form the silver nanohybrid material. Evaporation may be carried out by heating or oven drying the third mixture to a temperature above 100° C. In some embodiments, a vacuum rotary evaporator was used to evaporate the excess solvent from the third mixture. The silver nanohybrid material includes a silver nanoparticle core covered with the first, second, and third ester derivatives bonded to, e.g., adsorbed and/or or physical contact with, the silver nanoparticle core by hydrophobic tails of the first, second, and third ester derivatives. As depicted in FIG. 5, the hydrophilic tails are directly adjacent the silver nanoparticle core. The hydrophobic tail extends radially outwards from the silver nanoparticle core. Further depicted in FIGS. 25D-25H, the silver nanohybrid material formed has a porous network morphology. Specifically looking at FIG. 25F, a matrix morphology has interconnected spaces or vacancies permitting passage of a fluid. Further looking at FIG. 25G, the morphology may be described as a network because it has interconnected clusters (agglomerates) of the porous members that extend across the morphology, making it a network of interconnected pore structures. The agglomerates may have an average particle size of 50-500 μm, preferably 75-250 μm or 100-200 μm. In one embodiment the AgNPs in the silver nanohybrid material are fully covered with organic material such that the AgNPs do not project outside an ester derivative matrix. Pores typically have a pore size of 5-200 μm, preferably 20-150 μm or 30-100 μm.

In some embodiments, the method further comprises applying a composition comprising a AgNP-(E)-4-(3-(2 hydroxyethoxy)-3-oxoprop-1-en-1-yl)-1,2-phenylene distearate (LANH) silver nanohybrid material to a metal substrate to form an anti-corrosive coating. In some embodiments, the metal substrate is steel, aluminum, copper, zinc, stainless steel, galvanized steel, or alloys of the like. In some embodiments, the metal substrate treated with the silver nanohybrid material, LANH, has a measurable corrosion rate of less than 0.25 millimeters per year (mmpy), preferably less than 0.24 mmpy, or 0.232 mmpy. As used herein, the term, "corrosion rate," refers to the speed at which a metal deteriorates. Further, the corrosion rate is measured in millimeters per year (mmpy), defining the amount of corrosion loss per year per unit thickness of the metal substrate. Corrosion or inhibition efficiency can be measured according to ASTM G50-20, ASTM G102-89(2015)e1, or ASTM G111-21a, preferably G52-00(2006). In an embodiment, the inhibition efficiency is measured according to ASTM G50-20, where the user attaches a stainless steel tag by means of an insulated cord to measure the inhibition efficiency of the metal substrate. In some embodiments, metal substrate treated with the treatment composition has an inhibition efficiency of at least 96% compared to a metal substrate not treated with the treatment composition, wherein inhibition efficiency is determined by measuring the inhibition efficiency of the metal substrate with a stainless steel tag and insulated cord, preferably at least 96.2%, preferably at least 96.4%, preferably at least 96.6%, or 96.8%. A corrosion inhibitor is a chemical substance that, when added in small concentration to an environment, effectively decreases the corrosion rate. The inhibition efficiency, as used herein, is thus expressed by a measure of this improvement with the inhibitor present, based off the corrosion rate with the inhibitor present and with the inhibitor absent. In some embodiments, the anti-corrosive coating only comprises the silver nanohybrid material. In some embodiments, the anti-corrosive coating is a mixture of the silver nanohybrid material and one of a paint, powder coat, an anodizing, a plasma electrolytic oxidizer, or a chromate coating. In some embodiments, the anti-corrosive coating is a continuous coating on the metal substrate. In some embodiments, the thickness of the continuous coating on the metal substrate ranges from 5 millimeters (mm) to 50 mm, preferably from 10 mm to 45 mm, preferably from 15 mm to 40 mm, preferably from 20 mm to 35 mm, or 27.5 mm. In some embodiments, the anti-corrosive coating is applied to the metal substrate through electrospraying. In some embodiments, the anti-corrosive coating is applied to the metal substrate through chemical vapor deposition. In some embodiments, the metal substrate is dipped into a solution of the silver nanohybrid materials to form the anti-corrosive coating.

In some embodiments, the method further comprises applying a composition comprising a AgNP-(Z)-4-((E)-3-(2-hydroxyethoxy)-3-oxoprop-1-en-1-yl)-1,2-phenylene dioleate (OANH) silver nanohybrid material to a metal substrate to form an anti-corrosive coating. In some embodiments, the metal substrate is steel, aluminum, copper, zinc, stainless steel, galvanized steel, or alloys of the like. In some embodiments, the metal substrate treated with the silver nanohybrid material, OANH, has a measurable corrosion rate of less than 0.55 mmpy, preferably less than 0.548 mmpy, preferably less than 0.546 mmpy, preferably less tha 0.544 mmpy, preferably less than 0.542 mmpy, or 0.541 mmpy. Corrosion or inhibition efficiency can be measured according to ASTM G50-20, ASTM G102-89(2015)e1, ASTM G111-21a, or preferably G52-00(2006). In an embodiment, the inhibition efficiency is measured according to ASTM G50-20, where the user attaches a stainless steel tag by means of an insulated cord to measure the inhibition efficiency of the metal substrate. In some embodiments, metal substrate treated with the treatment composition has an inhibition efficiency of at least 92.5% compared to a metal substrate not treated with the treatment composition, wherein inhibition efficiency is determined by measuring the inhibition efficiency of the metal substrate with a stainless steel tag and insulated cord, preferably 92.6%, preferably 92.7%, or 92.8%. In some embodiments, the anti-corrosive coating only comprises the silver nanohybrid material. In some embodiments, the anti-corrosive coating is a mixture of the silver nanohybrid material and one of a paint, powder coat, an anodizing, a plasma electrolytic oxidizer, or a chromate coating. In some embodiments, the anti-corrosive coating is a continuous coating on the metal substrate. In some embodiments, the thickness of the continuous coating on the metal substrate ranges from 5 millimeters (mm) to 50 mm, preferably from 10 mm to 45 mm, preferably from 15 mm to 40 mm, preferably from 20 mm to 35 mm, or 27.5 mm. In some embodiments, the anti-corrosive coating is applied to the metal substrate through electrospraying. In some embodiments, the anti-corrosive coating is applied to the metal substrate through chemical vapor deposition. In some embodiments, the metal substrate is dipped into a solution of the silver nanohybrid materials to form the anti-corrosive coating.

In some embodiments, the method further comprises applying a composition comprising a AgNP-(9Z,9'Z,12Z,12'Z)-4-((E)-3-(2-hydroxyethoxy)-3-oxoprop-1-en-1-yl)-1,2-phenylene bis(octadeca-9,12-dienoate) (SANH) to a metal substrate to form an anti-corrosive coating. In some embodiments, the metal substrate is steel, aluminum, copper, zinc, stainless steel, galvanized steel, or alloys of the like. In some embodiments, the metal substrate treated with the silver nanohybrid material, SANH, has a measurable corrosion rate of less than 0.08 mmpy, preferably less than 0.0795 mmpy, or 0.079 mmpy. In some embodiments, metal substrate treated with the treatment composition has an inhibition efficiency of at least 98.5% compared to a metal substrate not treated with the treatment composition, wherein inhibition efficiency is determined by measuring the inhibition efficiency of the metal substrate with a stainless steel tag and insulated cord. In some embodiments, the anti-corrosive coating only comprises the silver nanohybrid material. In some embodiments, the anti-corrosive coating is a mixture of the silver nanohybrid material and one of a paint, powder coat, an anodizing, a plasma electrolytic oxidizer, or a chromate coating. In some embodiments, the anti-corrosive coating is a continuous coating on the metal substrate. In some embodiments, the thickness of the continuous coating on the metal substrate ranges from 5 millimeters (mm) to 50 mm, preferably from 10 mm to 45 mm, preferably from 15 mm to 40 mm, preferably from 20 mm to 35 mm, or 27.5 mm. In some embodiments, the anti-corrosive coating is applied to the metal substrate through electrospraying. In some embodiments, the anti-corrosive coating is applied to the metal substrate through chemical vapor deposition. In some embodiments, the metal substrate is dipped into a solution of the silver nanohybrid materials to form the anti-corrosive coating.

EXAMPLES

The following examples describe and demonstrate exemplary embodiments of the method 50 to synthesize the silver nanohybrid material described herein. The examples are provided solely for the purpose of illustration and are not to be construed as limitations of the present disclosure, as many variations thereof are possible without departing from the spirit and scope of the present disclosure.

Example 1: Synthesis of Silver Nanoparticles (AgNps)

A chemical reduction method was used to prepare the AgNPs. 50 ml, $1\times10^{-3}$ M of silver nitrate aqueous solution was heated to boiling, to which (5 ml, 1%) of trisodium citrate solution was added dropwise with stirring. The reaction mixture was further left at room temperature to cool once a color change was observed.

Example 2: Preparation of 3-(3,4-bis(octadecaloxy)phenyl) derivatives

Octadecanoic acid, octadec-9-enoic acid, and octadeca-9,12-dienoic acid (0.005 moles) are individually esterified with (0.005 moles) of 3-(3,4-dihydroxyphenyl)propenoic acid in a 250 mL round flask. Then 20 ml of xylene as a solvent was added, in the presence of 0.01% p-toluene sulfonic acid as a catalyst, in the same round flask with a magnetic stirrer, and then placed on an oil bath in a heating magnetic stirrer to form a reaction mixture. The reaction mixture was heated at 138° C. for 48 hours (h) until the water of the reaction mixture (0.005 mol, 0.09 ml) was removed in the Dean-Stark apparatus to obtain a product. Then the product was washed with petroleum ether to extract the catalyst. The solvent was removed using a vacuum rotary evaporator (BUCHI Labortechnik AG, 2019) to obtain (E)-3-(3,4-bis(stearoyloxy)phenyl)propenoic acid or (E)-3-(3,4-bis(stearoyloxy)phenyl)acrylic acid SPAA (1), (E)-3-(3,4-bis(oleoyloxy)phenyl)propenoic acid or (E)-3-(3, 4-bis(oleoyloxy)phenyl)acrylic acid OPAA (2) and (E)-3-(3, 4-bis((9Z,12Z)-octadeca-9,12-dienoyloxy)phenyl)propenoic acid or (E)-3-(3,4-bis((9Z,12Z)-octadeca-9,12-dienoyloxy)phenyl)acrylic acid ODPAA (3) as shown in FIGS. 2A-2C and FIG. 3.

Example 3: Characterization Data for the Compounds Synthesized in Example 2

The compounds, (E)-3-(3,4-bis(stearoyloxy)phenyl)propenoic acid or (E)-3-(3,4-bis(stearoyloxy)phenyl)acrylic acid SPAA (1), (E)-3-(3,4-bis(oleoyloxy)phenyl)propenoic acid or (E)-3-(3,4-bis(oleoyloxy)phenyl)acrylic acid OPAA (2) and (E)-3-(3,4-bis((9Z,12Z)-octadeca-9,12-dienoyloxy)phenyl)propenoic acid or (E)-3-(3,4-bis((9Z,12Z)-octadeca-9,12-dienoyloxy)phenyl)acrylic acid ODPAA (3), were further characterized and the data is included herewith.
Characterization Data for (E)-3-(3,4-bis(stearoyloxy)phenyl)acrylic acid (1)

Yield (88%), as light purple powder. IR: v $(cm^{-1})$=3400, 2800, 2900, 1710, 1735, 1400 and 1150 $cm^{-1}$. $^1$HNMR, δ: 0.86 (t, 6H, —CH$_3$); 1.23-1.27 (m, 56H, —CH$_2$—); 1.48 (m, 4H, —CH$_2$—CH$_2$—COO$^-$); 2.19 (t, 4H, —CH$_2$—COO$^-$); 6.15 (d, 1H, HOOC—CH=CH—); 6.9 (m, 1H, —Ar—CH=CH—); 7.02-7.48 (m, Aromatic ring); 11.0 (s, 1H, OH). $^{13}$C NMR, δ: 14.4 (2C, —CH$_3$); 22.5 (2C, —CH$_2$—CH$_3$); 24.9 (2C, CH$_2$—CH$_2$—COO$^-$); 29.0-29.5 (24C, —CH$_2$—); 31.7 (2C, CH$_3$—CH$_2$—CH$_2$—); 34.1 (2C, —CH$_2$—COO$^-$); 115-116 (1C, CH=CH—COOH); 121.6-146.1 (6C, C Ar ring); 148.5 (1C, Ar—CH=CH—); 168.3 (1C, —COOH); 174.9 (2C, —CH$_2$—COO$^-$).
Characterization Data for (E)-3-(3,4-bis(oleoyloxy)phenyl) acrylic acid (2)

Yield (85%), as dark purple oil. IR: v $(cm^{-1})$=3400, 2800, 2900, 3000, 1710, 1735, 1620, 1400 and (1200-1300) $cm^{-1}$. $^1$H NMR, δ: 0.86 (t, 6H, —CH$_3$); 1.23-1.31 (m, 40H, —CH$_2$—); 1.48 (m, 4H, —CH$_2$—CH$_2$—COO$^-$); 2.0 (m, 8H, —CH$_2$—CH=CH—); 2.18 (t, 4H, —CH$_2$—COO$^-$); 5.33 (m, 4H, —CH=CH—); 6.15 (d, 1H, CH=CH—COOH); 6.7 (m, 1H, —Ar—CH=CH—); 7.02-7.47 (m, Ar ring); 11.0 (s, 1H, COOH). $^{13}$C NMR, δ: 14.4 (2C, —CH$_3$); 22.5 (2C, —CH$_2$—CH$_3$); 24.4-25.1 (2C, CH$_2$—CH$_2$—COO$^-$); 27.0 (4C, CH$_2$—CH=CH—); 28.6-29.5 (14C, —CH$_2$—); 31.7 (2C, CH$_3$—CH$_2$—CH$_2$—); 34.1 (2C, —CH$_2$—COO$^-$); 115-116 (1C, CH=CH—COOH); 121.6-146.0 (6C, C Ar ring); 130.5 (4C, —CH=CH—); 148.5 (1C, Ar—CH=CH—); 168.3 (1C, —COOH); 174.9 (2C, —CH—COO$^-$).
Characterization Data for (E)-3-(3,4-bis((9Z,12Z)-octadeca-9,12-dienoyloxy)phenyl)acrylic acid (3)

Yield (75%), as dark purple oil. IR: v $(cm^{-1})$=3400, 2800, 2900, 3000, 1710, 1735, 1620, 1420, (1200-1300) $cm^{-1}$. $^1$H NMR, δ: 0.86 (t, 6H, —CH$_3$); 1.23-1.31 (m, 28H, —CH$_2$—); 1.47 (m, 4H, —CH$_2$—CH$_2$—COO$^-$); 1.93-2.02 (m, 8H, —CH$_2$—CH=CH—); 2.18 (t, 4H, —CH$_2$—COO$^-$); 2.68 (t, 4H, CH=CH—CH$_2$—CH=CH—); 5.33-5.37 (m, 8H, —CH=CH—); 6.1 (d, 1H, —CH=CH—COOH); 6.7 (m, 1H, —Ar—CH=CH—); 7.11-7.48 (m, 6H, —Ar ring); 11.0 (s, 1H, COOH). $^{13}$C NMR, δ: 14.4 (2C, —CH$_3$); 21-23.4 (2C, —CH$_2$—CH$_3$); 24.9 (2C, CH$_2$—CH$_2$—COO$^-$); 25.6 (2C, —CH=CH—CH$_2$—CH=CH—); 27.3 (4C, CH$_2$—CH=CH—); 28.5-29.5 (14C, —CH$_2$—); 31.9 (2C, CH$_3$—CH$_2$—CH$_2$—); 34.1 (2C, —CH$_2$—COO$^-$); 115-116 (1C, CH=CH—COOH); 121.1-146.2 (6C, C Ar ring); 127.3 (4C, —CH=CH—CH$_2$—CH=CH); 130.5 (4C, —CH=CH—); 148.5 (1C, Ar—CH=CH—); 168.3 (1C, —COOH); 174.9 (2C, —CH—COO—).

Example 4: Synthesis of Non-Ionic Surfactants

Figure 4A:
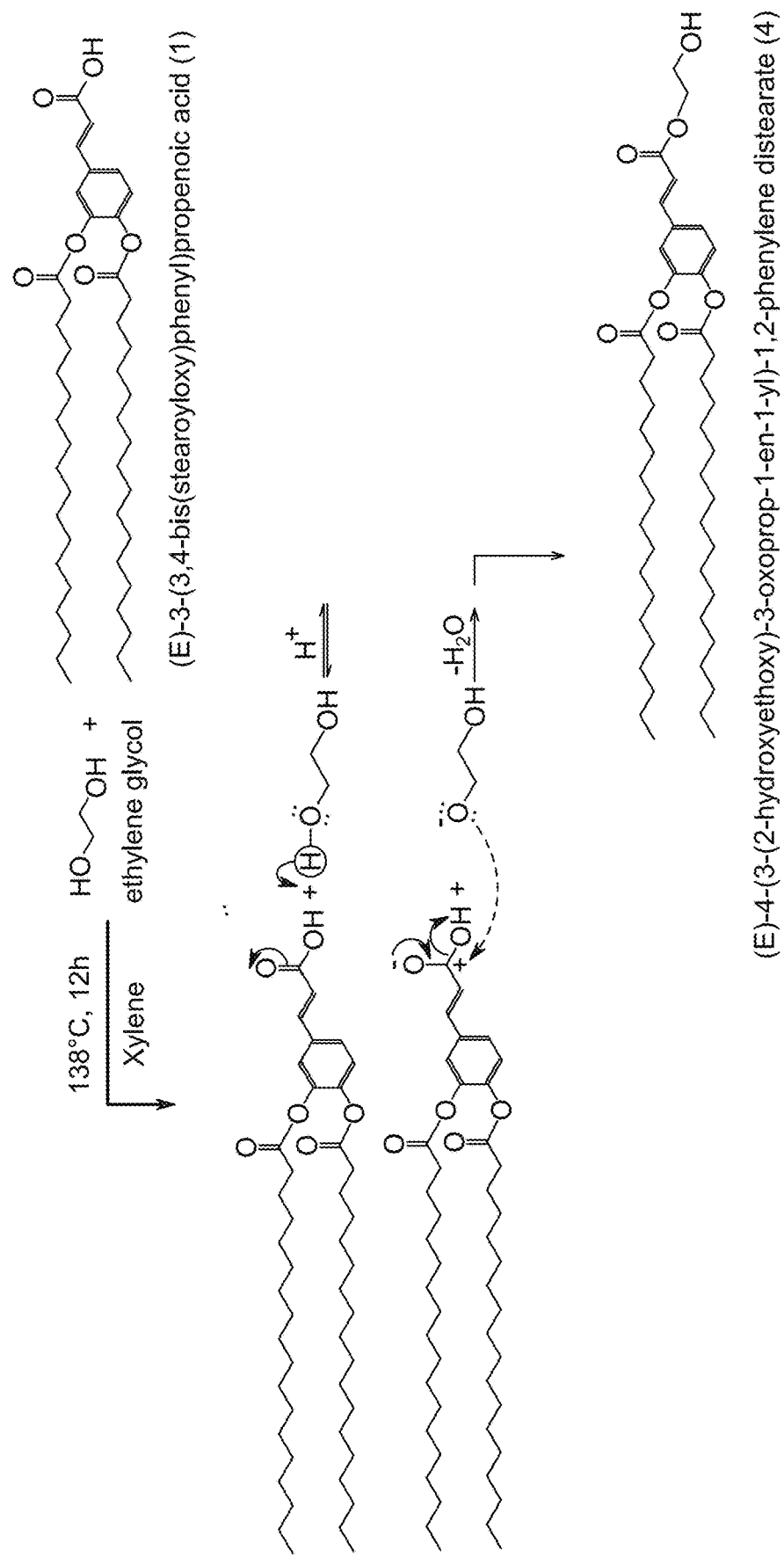
FIG. 4A is a schematic diagram depicting synthesis of (E)-4-(3-(2-hydroxyethoxy)-3-oxoprop-1-en-1-yl)-1,2-phenylene distearate (HPDS), according to certain embodiments of the present disclosure.
Figure 4B:
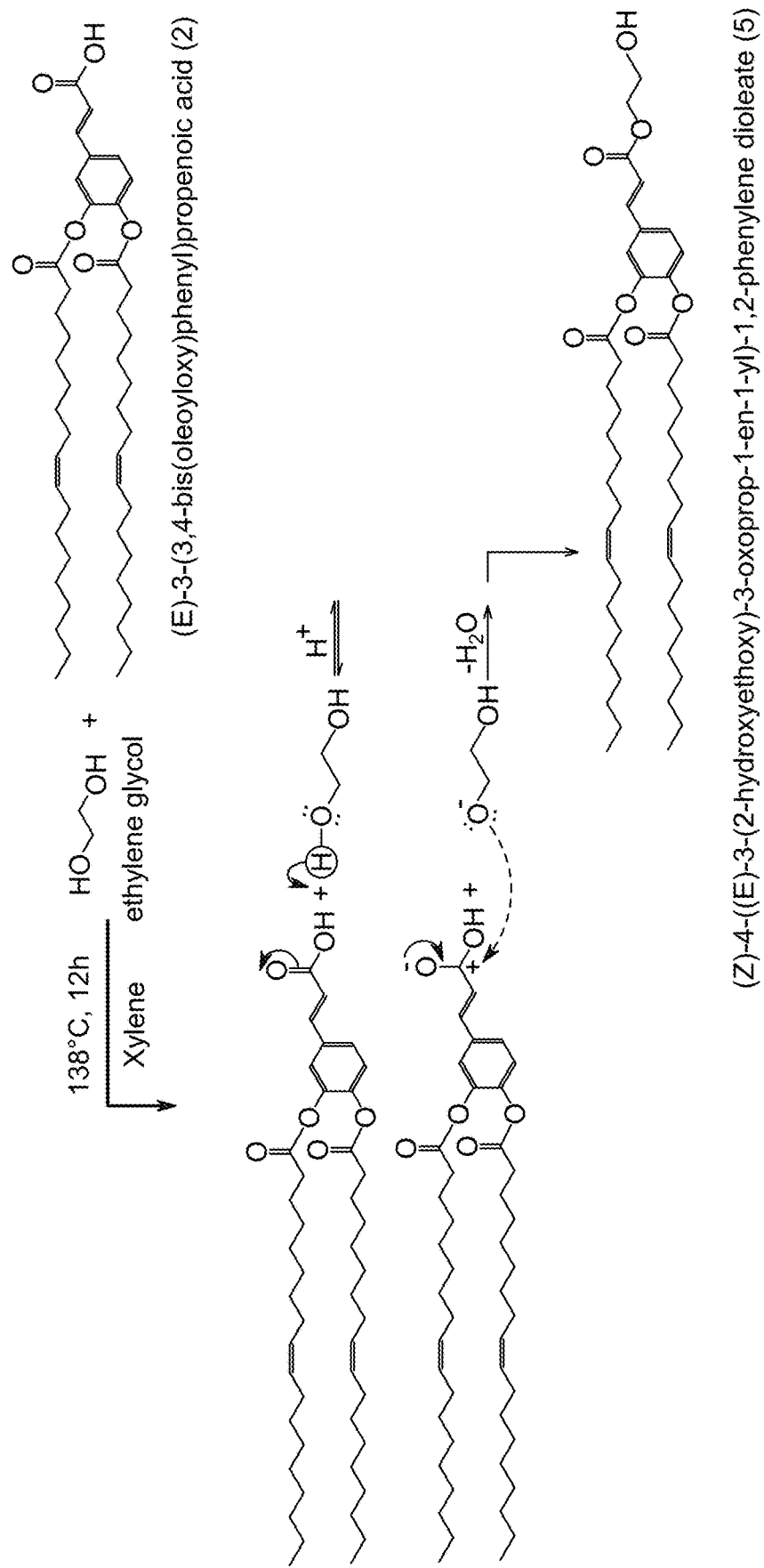
FIG. 4B is a schematic diagram depicting synthesis of (Z)-4-((E)-3-(2-hydroxyethoxy)-3-oxoprop-1-en-1-yl)-1,2-phenylene dioleate (HPDO), according to certain embodiments of the present disclosure.
Figure 4C:
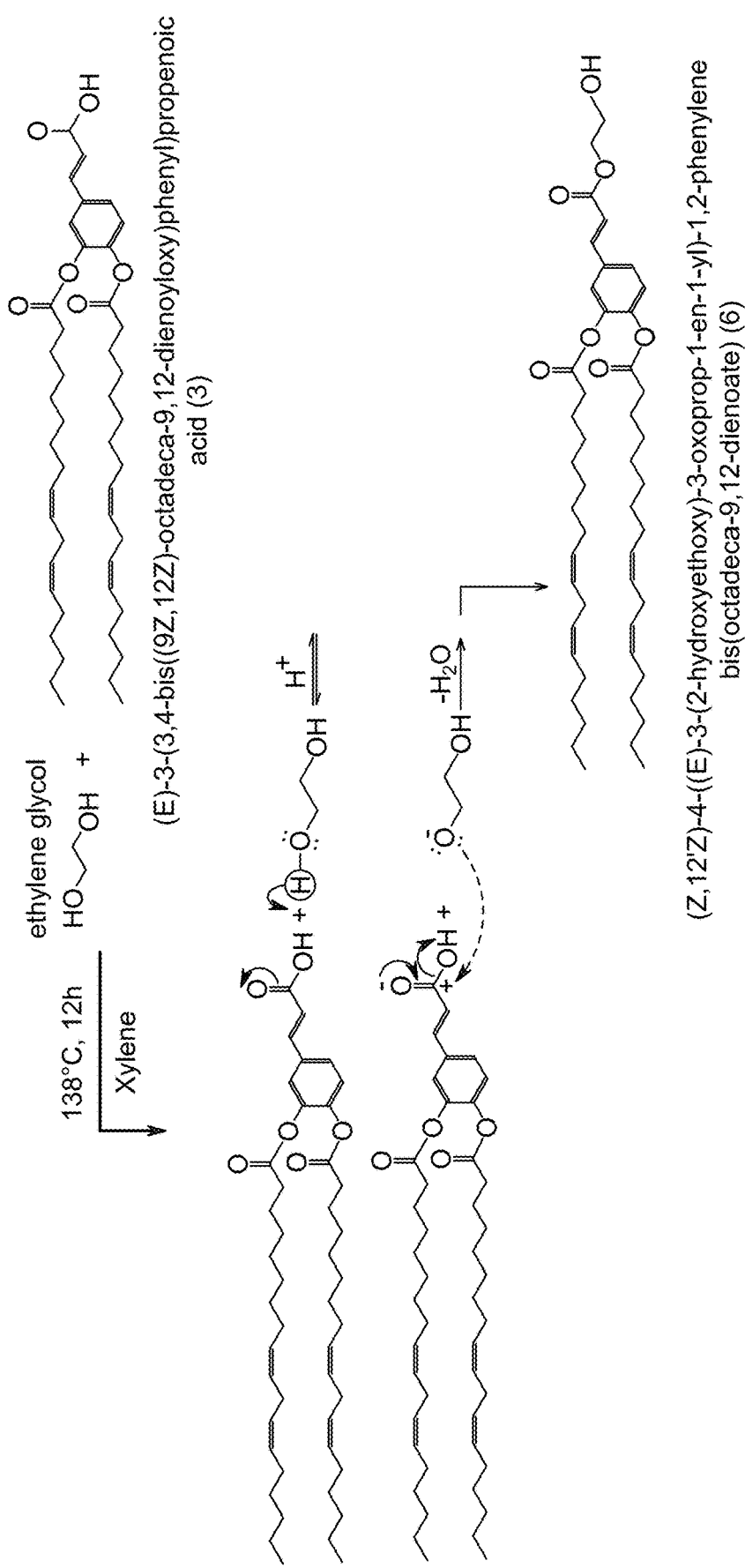
FIG. 4C is a schematic diagram depicting synthesis of (9Z,9′Z,12Z,12′Z)-4-((E)-3-(2-hydroxyethoxy)-3-oxoprop-1-en-1-yl)-1,2-phenylenebis(octadeca-9,12-dienoate) (HPDE), according to certain embodiments of the present disclosure.

Compounds (1), (2), and (3) (0.005 mol) prepared in step 1 were esterified with (0.005 mol) of ethylene glycol in a round flask of 250 ml, then 20 ml of xylene as a solvent was added in the presence of 0.01% p-toluene sulfonic acid as a catalyst in the same round flask with a magnetic stirrer to form a reaction mixture. The reaction mixture was heated at 138° C. for 10 h until the water of the reaction mixture (0.005 mol, 0.09 ml) was removed in Dean-Stark apparatus and a product was washed with petroleum ether to extract the catalyst. The solvent was removed using a vacuum rotary evaporator (BUCHI Labortechnik AG, 2019) to synthesize the (E)-4-(3-(2-hydroxyethoxy)-3-oxoprop-1-en-1-yl)-1,2-phenylene distearate HPDS (4), (Z)-4-((E)-3-(2-hydroxyethoxy)-3-oxoprop-1-en-1-yl)-1,2-phenylene dioleate HPDO (5) and (9Z,9'Z,12Z,12'Z)-4-((E)-3-(2-hydroxyethoxy)-3-oxoprop-1-en-1-yl)-1,2-phenylenebis(octadeca-9,12-dienoate HPDE (6) as shown in FIGS. 4A-4C.

Example 5: Characterization Data for the Compounds Synthesized in Example 4

The compounds, (E)-4-(3-(2-hydroxyethoxy)-3-oxoprop-1-en-1-yl)-1,2-phenylene distearate HPDS (4), (Z)-4-((E)-3-(2-hydroxyethoxy)-3-oxoprop-1-en-1-yl)-1,2-phenylene dioleate HPDO (5) and (9Z,9'Z,12Z,12'Z)-4-((E)-3-(2-hydroxyethoxy)-3-oxoprop-1-en-1-yl)-1,2-phenylenebis(octadeca-9,12-dienoate HPDE (6), were further characterized and the data is included herewith.
Characterization Data for (E)-4-(3-(2-hydroxyethoxy)-3-oxoprop-1-en-1-yl)-1,2-phenylene distearate (4)

Yield (88%), as light purple powder. IR: v $(cm^{-1})$=3350, 2800, 2900, 1735, 1470, 1380, 1170 (. $^1$HNMR, δ: 0.84 (t, 6H, —CH$_3$); 1.14-1.24 (m, 56H, —CH$_2$—); 1.51 (m, 4H, —CH$_2$—CH$_2$—COO—); 2.28 (t, 4H, —CH$_2$—COO—); 2.57 (t, 2H, —COO—CH$_2$—CH$_2$—OH); 3.55 (t, 1H, —CH$_2$—OH); 4.11 (t, 2H, —COO—CH$_2$—CH$_2$—OH); 6.55 (d, 1H, —CH=CH—COO—); 7.51 (d, 1H, —CH=CH—COO—); 7.03-7.52 (m, 3H, Ar ring). $^{13}$C NMR, δ: 14.4 (2C, —CH$_3$); 21.2-22.5 (2C, —CH$_2$—CH$_3$); 24.9 (2C, —CH$_2$—CH$_2$—COO—); 28.6-29.4 (24C, —CH$_2$—); 31.7 (2C, CH$_3$—CH$_2$—CH$_2$—); 34.1 (2C, —CH$_2$—COO—); 60.6 (1C, —CH$_2$—CH$_2$—OH); 66.8 (1C, —COO—CH$_2$—CH$_2$—OH); 116.1 (1C, —CH=CH—COO—); 119-146 (6C, Ar—C); 146.1 (1C, Ar—CH=CH—); 173.6 (1C, —COO—CH$_2$CH$_2$OH); 175-1 (2C, —CH—COO—).

Characterization Data for (Z)-4-((E)-3-(2-hydroxyethoxy)-3-oxoprop-1-en-1-yl)-1,2-phenylene dioleate (5)

Yield (75%), as black oil. IR: v (cm$^{-1}$)=3350, 2800, 2900, 3000, 1740, 1610, 1515, 1360 cm$^{-1}$. $^1$HNMR, δ: 0.86 (t, 6H, —CH$_3$); 1.23-1.30 (m, 40H, —CH$_2$—); 1.45 (m, 4H, —CH$_2$—CH$_2$—COO—); 2.18 (m, 8H, —CH$_2$—CH═CH—); 2.42 (t, 4H, —CH$_2$—COO—Ar—); 3.51 (t, 2H, —COO—CH$_2$—CH$_2$—OH); 4.0 (t, 1H, —CH$_2$—OH); 4.29 (t, 2H, —COO—CH$_2$—CH$_2$—OH); 5.32 (m, 4H, —CH═CH—); 6.5 (d, 1H, —CH═CH—COO—); 6.8 (d, 2H, —Ar—CH═CH—); 7.1-7.7 (m, Ar ring). $^{13}$C NMR, δ 14.4 (2C, —CH$_3$); 21.2-22.5 (2C, —CH$_2$—CH$_3$); 24.9 (2C, —CH$_2$—CH$_2$—COO—); 27.0 (4C, —CH$_2$—CH═CH—); 28.8-29.5 (14C, —CH$_2$—); 31.7 (2C, CH$_3$—CH$_2$—CH$_2$—); 33.9 (2C, —CH$_2$—COO—); 60.6 (1C, —CH$_2$—CH$_2$—OH); 65.9 (1C, —COO—CH$_2$—CH$_2$—OH); 116.1 (1C, —CH═CH—COO—); 125.9-143 (6C, Ar—C); 130.6 (4C, —CH═CH—); 145.3 (1C, Ar—CH═CH—); 172 (1C, —COO—CH$_2$CH$_2$OH); 174.9 (2C, —CH$_2$—COO—).

Characterization Data for (9Z,9'Z,12Z,12'Z)-4-((E)-3-(2-hydroxyethoxy)-3-oxoprop-1-en-1-yl)-1,2-phenylene bis(octadeca-9,12-dienoate) (6)

Yield (85%), as black oil. IR: v (cm$^{-1}$)=3350, 2800, 2900, 3000, 1737, 1610, 1460, 1170 cm$^{-1}$. $^1$HNMR, δ: 0.86 (t, 6H, —CH$_3$); 1.16-1.31 (m, 28H, —CH$_2$—); 1.4-1.5 (m, 4H, —CH$_2$—CH$_2$—COO—); 1.97-2.02 (m, 8H, —CH$_2$—CH═CH—); 2.18 (t, 4H, —CH$_2$—COO—); 2.63 (t, 4H, —CH═CH—CH$_2$—CH═CH—); 3.4 (m, 2H, —COO—CH$_2$—CH$_2$—OH); 3.6 (t, 1H, —CH$_2$—OH); 4.20 (t, 2H, —COO—CH$_2$—CH$_2$—OH); 5.32 (m, 8H, —CH═CH—); 6.4 (d, 1H, —CH═CH—COO—); 6.8 (d, 2H, —Ar—CH═CH—); 7.1-7.8 (m, Ar ring). $^{13}$C NMR, δ: 14.4 (2C, —CH$_3$); 21.5-22.5 (2C, —CH$_2$—CH$_3$); 24.9 (2C, —CH$_2$—CH$_2$—COO—); 25.6 (2C, —CH═CH—CH$_2$—CH═CH—); 27.0 (4C, —CH$_2$—CH═CH—); 28.6-29.5 (14C, —CH$_2$—); 31.7 (2C, CH$_3$—CH$_2$—CH$_2$—); 33.9 (2C, —CH$_2$—COO—); 60.7 (1C, —CH$_2$—CH$_2$—OH); 65.9 (1C, —COO—CH$_2$—CH$_2$—OH); 116.1 (1C, —CH═CH—COO—); 119-146 (6C, Ar—C); 127.0 (4C, —CH═CH—CH$_2$—CH═CH—); 130.1 (4C, —CH═CH—); 145.1 (1C, —Ar—CH═CH—); 171.0 (1C, —COO—CH$_2$CH$_2$OH); 174.9 (2C, —CH—COO—).

Example 6: Preparation of Silver Nanohybrid Derivatives 5 ml of each of the surfactant's solutions, as prepared in Example 4, was added to 20 ml of prepared AgNPs (as prepared in Example 1) dropwise in 20 minutes to form a mixture. The mixture was stirred continuously for 24 hours until the color changed to obtain SANH (AgNPs/HPDS) (7), OANH (AgNPs/HPDO) (8) and LANH (AgNPs/HPDE) (9) as shown in FIG. 5.

Example 7: Apparatus

Ultraviolet-visible spectrophotometer (UV-Vis) measurements of AgNPs solution and nanohybrid were made by Spectrophotometer (8UVD11064, Somatko, 2013). Fourier transform infrared spectrophotometer (FT-IR) measurements were performed from SHIMADZU on prepared samples in the present project. $^1$H NMR and $^{13}$C NMR were recorded on Bruker spectrometer, 850 megahertz (MHz). The samples were prepared by dissolution of 0.5 ml of sample in 0.6 ml of dimethyl sulfoxide (DMSO). Chemical shifts (δ) are presented in parts per million (ppm) using tetramethyl silane (TMS) as the internal standard. Scanning Electron Microscopy (SEM) micrographs of the prepared nanoparticles were recorded using an SEM (FEI, Inspect S50) equipped with an energy-dispersive X-ray (EDX) spectroscopy detector. The EDS spectra and EDS mapping were recorded in order to confirm the presence of the constituent elements and corresponding distribution. Elemental analysis (C, H, N) was done by Carlo Erba analyzer model 110.

Example 8: Corrosion Measurements

Specimens and Solutions

Corrosion tests were conducted in 1.0 M HCl by weight loss measurements on a mild steel specimen. The specimen for each measurement was roughened on different grades of emery abrasive papers with grit sizes 100, 400, 600, 800, and 1200, followed by de-greasing by sonication in acetone, and finally washed in distilled water. The specimen was then dried and stored in a desiccator before use. 1.0 M HCl solutions were freshly prepared from the concentrated stock HCl by dilution with de-ionized water. Medium containing the inhibitors in the concentration range 50-200 ppm was prepared from the acid solutions. For proper dispersion, the inhibitor molecules were prepared in the solution containing 1:100 volume/volume (v/v) of ethanol/water solution. A similar ratio was used for the preparation of the blank medium.

Example 9: Gravimetric Measurements

For gravimetric studies, flat sheets of AISI 1018 technical grade mild steel specimen having the dimensions of 0.8× 0.8×0.2 and a surface area of 3.84 in$^2$ were used. Freshly prepared specimens were fully immersed in 250 ml of test solutions in the absence of blank and in the presence of 50-200 ppm of the inhibitor molecules at 298-333 K for 96 h. The specimens were thereafter washed thoroughly to remove residual corrosion products by washing with de-ionized water, then acetone, and dried at room temperature. Corrosion rates (CR) and inhibition efficiencies (η %) were calculated by equations (1) and (2):

$$CR\left(\frac{mm}{yr}\right) = \frac{8760 \cdot \Delta w}{\rho A t}; \qquad (1)$$

$$\eta\% = \left(\frac{CR_0 - CR_i}{CR_o}\right) \times 100, \qquad (2)$$

where, Δw is the weight loss during the immersion (g), ρ is the density of the mild steel (g/cm$^3$), A is the specimen area (cm$^2$), t is the time of immersion, and $CR_o$ and $CR_i$ are the corrosion rates in the absence and the presence of the inhibitors, respectively.

Example 10: Surface Characterization

Surface analysis of the mild steel coupons immersed in 1.0 M HCl for 96 h in the absence and presence of inhibitor particles was performed using the SEM. After performing the above-mentioned gravimetric experiment, the samples were thoroughly washed to remove the remaining corrosion products by washing with de-ionized water, then acetone, and dried at room temperature. Then the microscopic images were recorded using the SEM equipped with the EDS spectroscopy detector.

Example 11: Theoretical Calculations

First principal quantum chemical simulations were conducted on the inhibitor molecules using density functional theory (DFT) at hybrid B3LYP functional. Pople's 6-311G** basis set was adopted for non-metal atoms, while for the metal atoms the Stuttgart/Dresden effective core potential (ECP) basis set was selected. Geometries of the inhibitor molecules were thoroughly modeled without imposing symmetry constraints, and the vibrational frequencies were assessed to ensure they represent the minima on the potential energy surface. For the simulation of aqueous media, the Polarizable Continuum Model-Self-Consistent Reaction Field (PCM-SCRF) model was adopted, and the solvent chosen was water. Similar calculations were conducted on protonated forms of the inhibitor molecules to simulate the acid media. Reactivity descriptors are derived from energies of the highest occupied molecular orbital ($E_{HOMO}$) and lowest unoccupied molecular orbital ($E_{LUMO}$). Adsorption of the inhibitor molecules on a surface of the mild steel in an acidic medium was carried out using $Fe_4$ cluster model.

The inhibitor adsorption energies were estimated according to equation (3):

$$E_{adsorption} = E_{complex} - E_{Fe} - E_{inhibitor}, \quad (3)$$

where, $E_{complex}$, $E_{Fe}$, and $E_{inhibitor}$ are the free energies of a metal-inhibitor complex, the isolated $Fe_4$ cluster, and the isolated inhibitor molecules, respectively. All the simulations were conducted on Gaussian 09 suite, whereas data extrapolation and analysis were accomplished on Gauss View 5.0.9 graphical user interface.

Results and Discussion

Confirmation of the structure of 3-(3,4-bis(octadecaloxy) phenyl) derivatives (SPAA 1, OPAA 2, and ODPAA 3)

Figure 6:
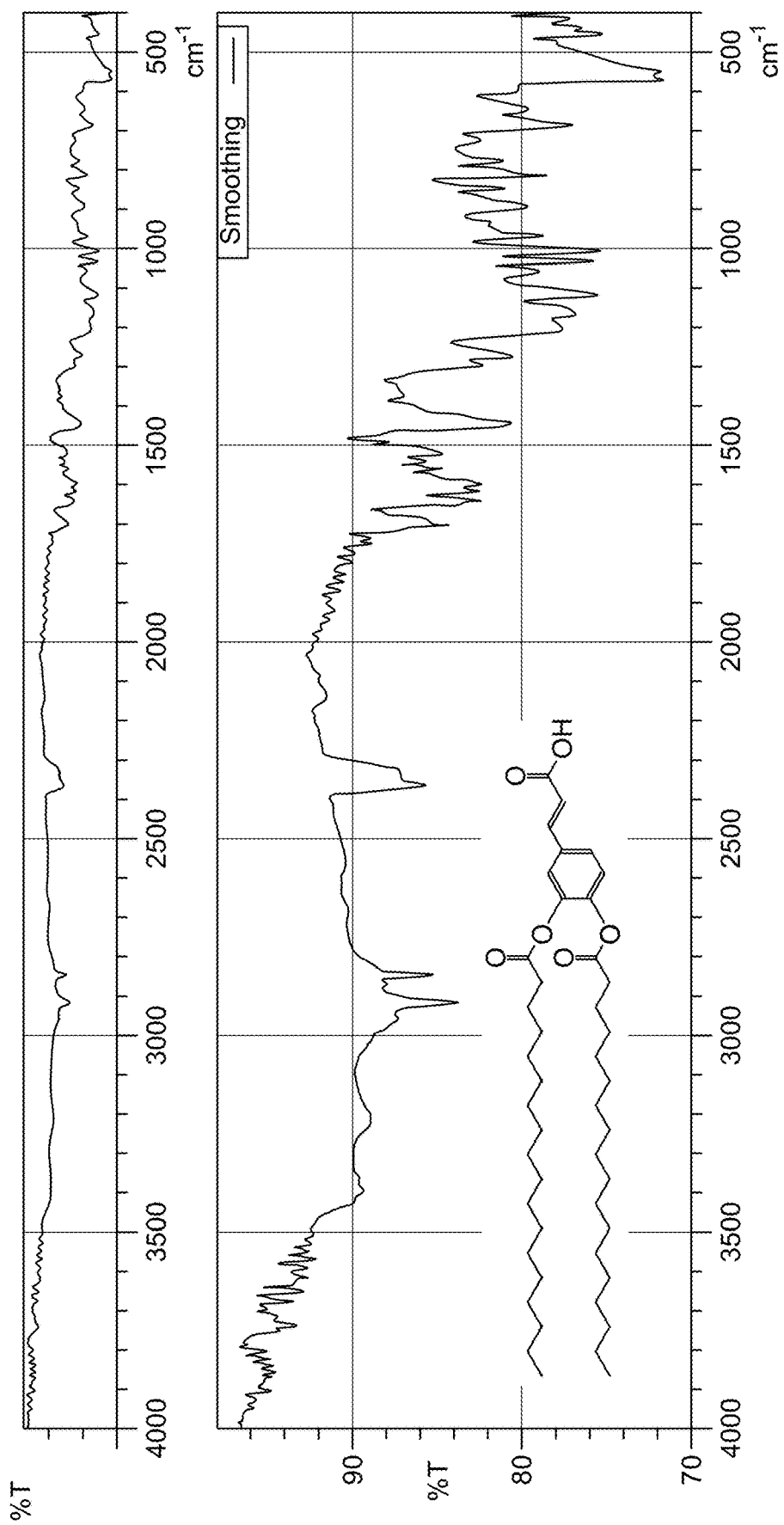
FIG. 6 is an infrared (IR) spectrum of the SPAA, according to certain embodiments of the present disclosure.
Figure 7:
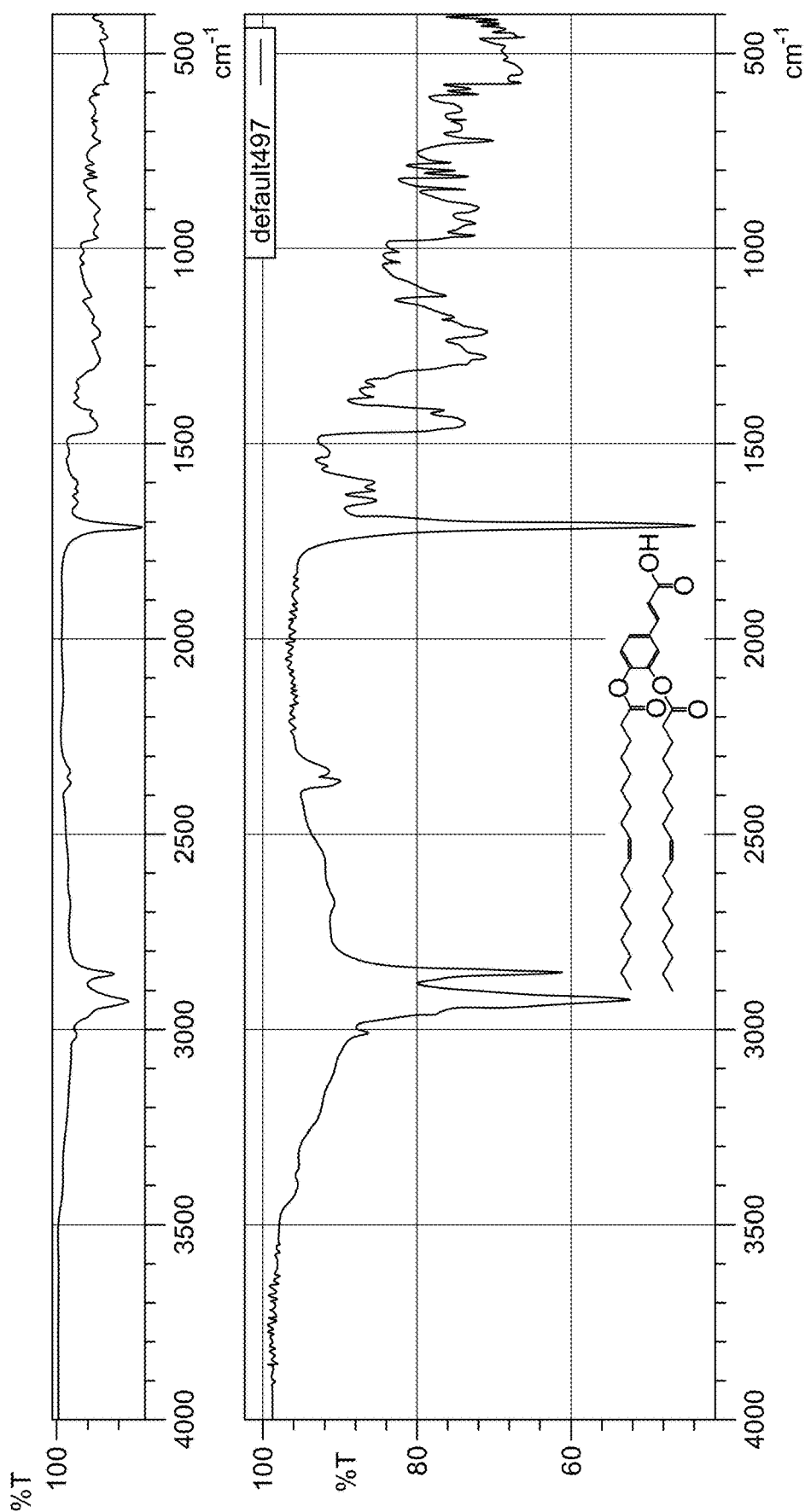
FIG. 7 is an IR spectrum of the OPAA, according to certain embodiments of the present disclosure.
Figure 8:
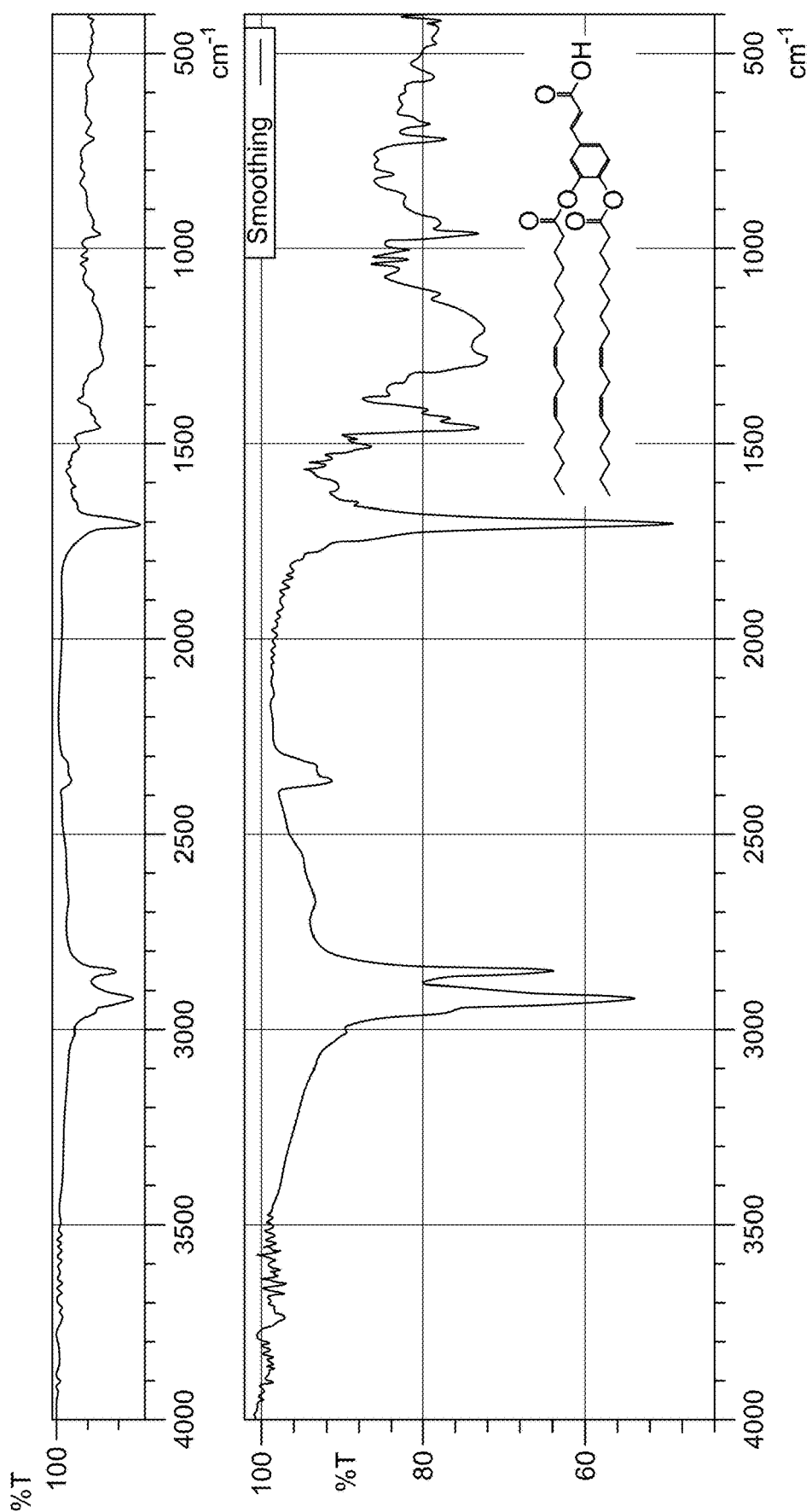
FIG. 8 is an IR spectrum of the ODPAA, according to certain embodiments of the present disclosure.

The chemical structure of the prepared compounds (SPAA, OPAA, and ODPAA) from Example 2 was confirmed using IR spectroscopy in the range 500-4000 $cm^{-1}$, $^1$HNMR, and $^{13}$CNMR. The FTIR spectrum of the prepared compounds (SPAA, OPAA, and ODPAA) showed broad bands at 3400 $cm^{-1}$ for OH stretching and bands at (2800-2900) $cm^{-1}$ for C—H stretching, and bands at 1735 $cm^{-1}$ and 1710 $cm^{-1}$ for ester carbonyl C=O and carboxylic acid respectively. In addition to the appearance of bands at 1400 $cm^{-1}$ that are indicative of aromatic C=C (benzene ring) and bands at 1150-1300 $cm^{-1}$ corresponding to C—O stretching. Moreover, the two prepared compounds (OPAA and ODPAA) show absorption at 1620 $cm^{-1}$ indicating the presence of a double bond in the chain for C=C stretching as shown in FIGS. 6-8.

Figure 9:
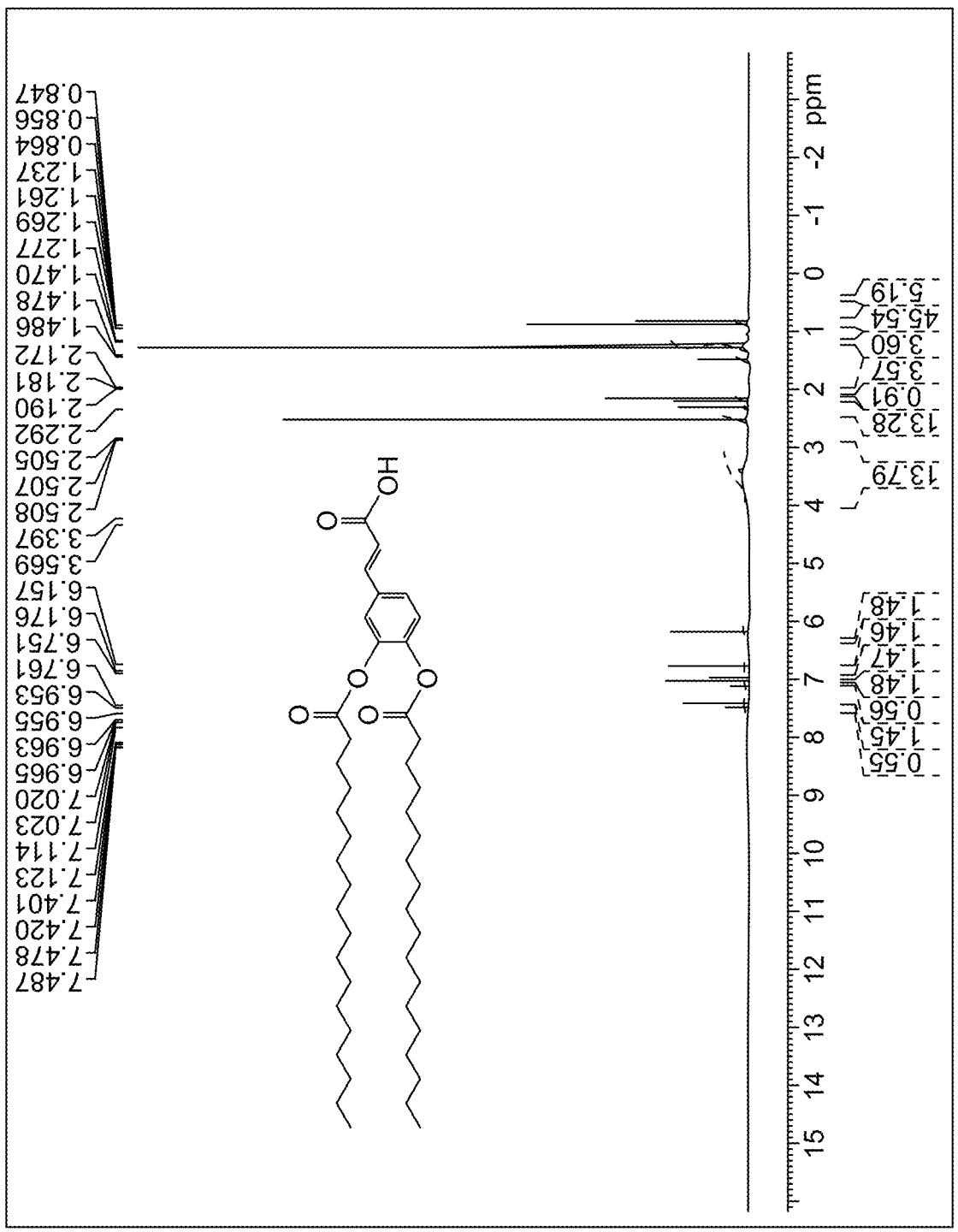
FIG. 9 is $^1$H nuclear magnetic resonance (NMR) spectrum (850 megahertz (MHz)) of the SPAA in dimethyl sulfoxide (DMSO) at 25° C., according to certain embodiments of the present disclosure.
Figure 10:
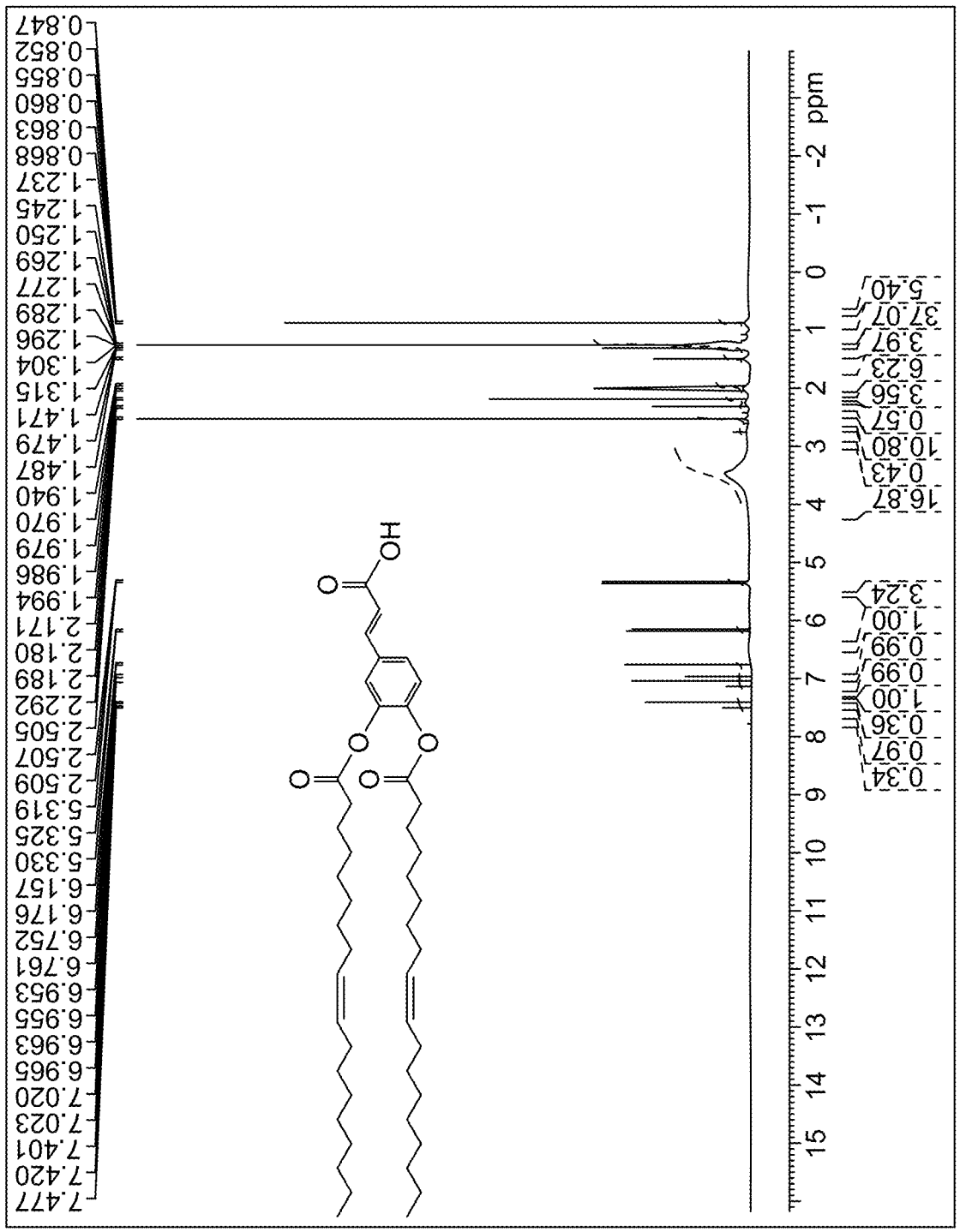
FIG. 10 is $^1$H NMR spectrum (850 MHz) of the OPAA in the DMSO at 25° C., according to certain embodiments of the present disclosure.
Figure 11:
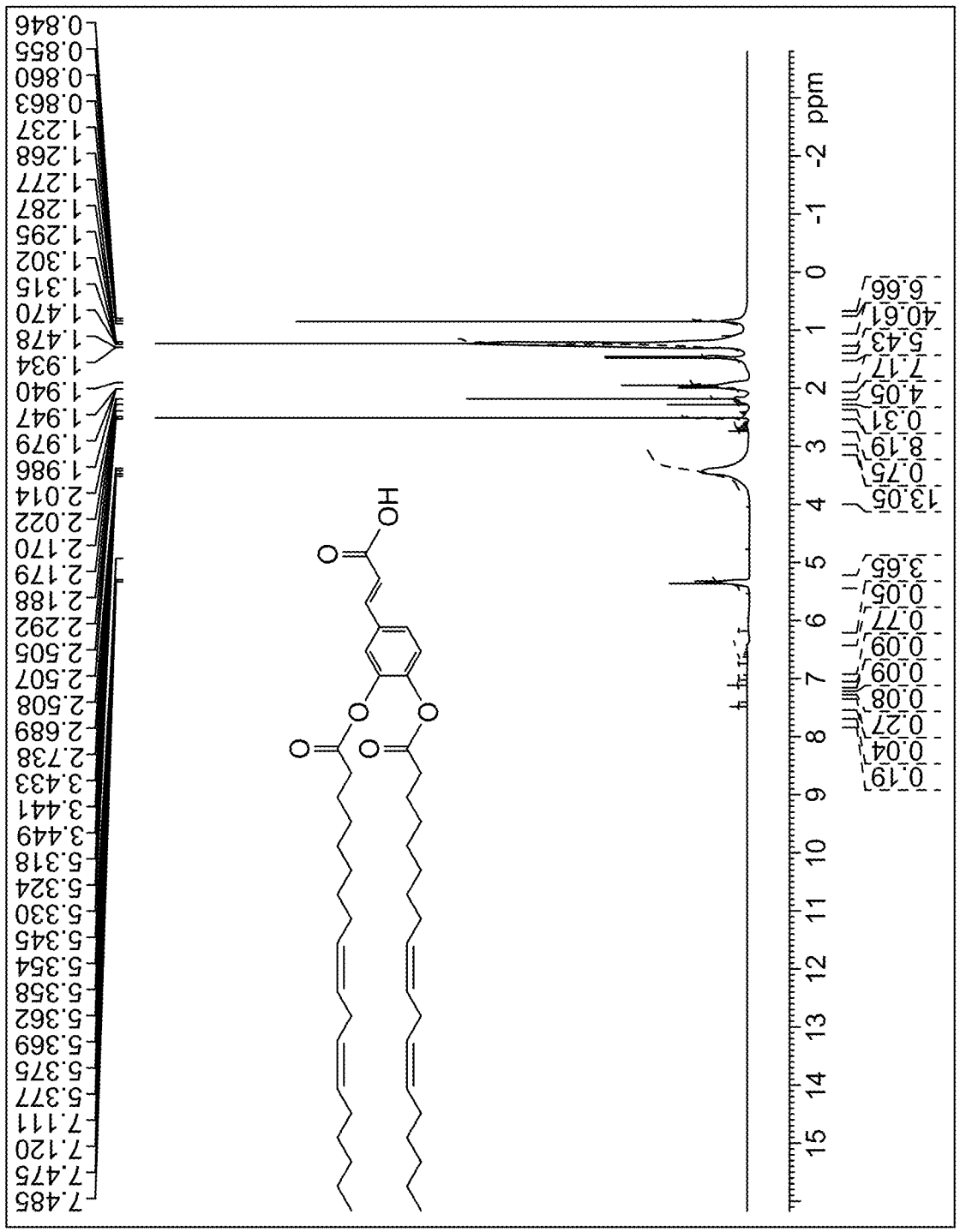
FIG. 11 is $^1$H NMR spectrum (850 MHz) of the ODPAA in the DMSO at 25° C., according to certain embodiments of the present disclosure.

The $^1$H NMR spectra of the three compounds prepared (SPAA, OPAA, and ODPAA) in the DMSO have the same proton distribution except for some additions as follows: a major signal appeared for (—CH$_3$) at δ 0.86; (—CH$_2$—) at δ 1.23-1.31; (—CH$_2$—CH$_2$—COO—) at δ 1.48; (—CH$_2$—COO—) at δ 2.19; (HOOC—CH=CH—) at δ 6.15; (—Ar—CH=CH—) at δ 6.9; (Ar ring) at δ 7.02-7.48 and at δ 11.0 for (OH). While two distinct signals appeared in the two prepared compounds (OPAA and ODPAA) for (—CH$_2$—CH=CH—) at δ 1.93-2.0 and for (—CH=CH—) at δ 5.33, in addition to the appearance of a signal of the prepared compound (ODPAA) at δ 2.68 for (CH=CH—CH$_2$—CH=CH) as shown in FIGS. 9-11.

Figure 12:
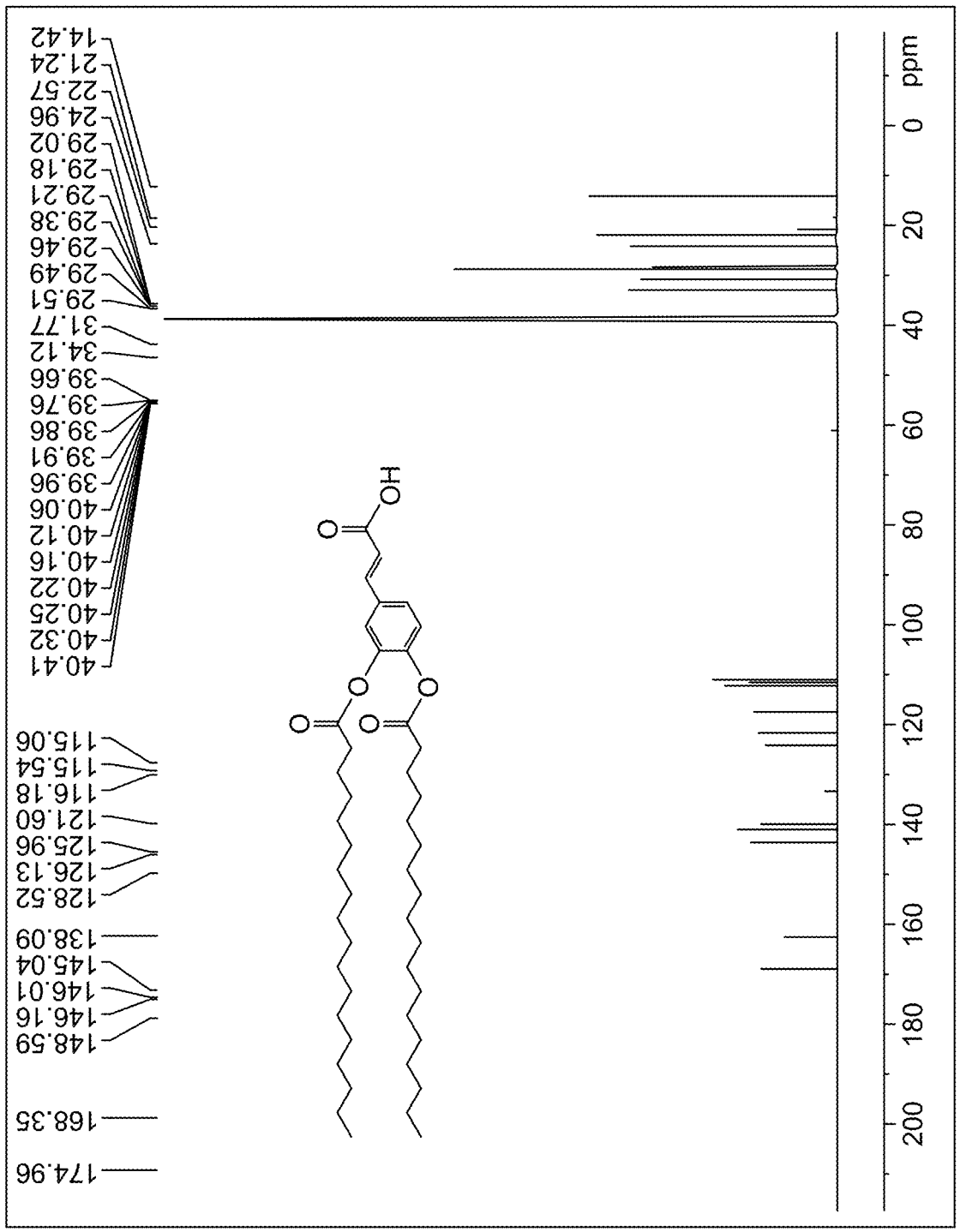
FIG. 12 is $^{13}$C NMR spectrum (850 MHz) of the SPAA in the DMSO at 25° C., according to certain embodiments of the present disclosure.
Figure 13:
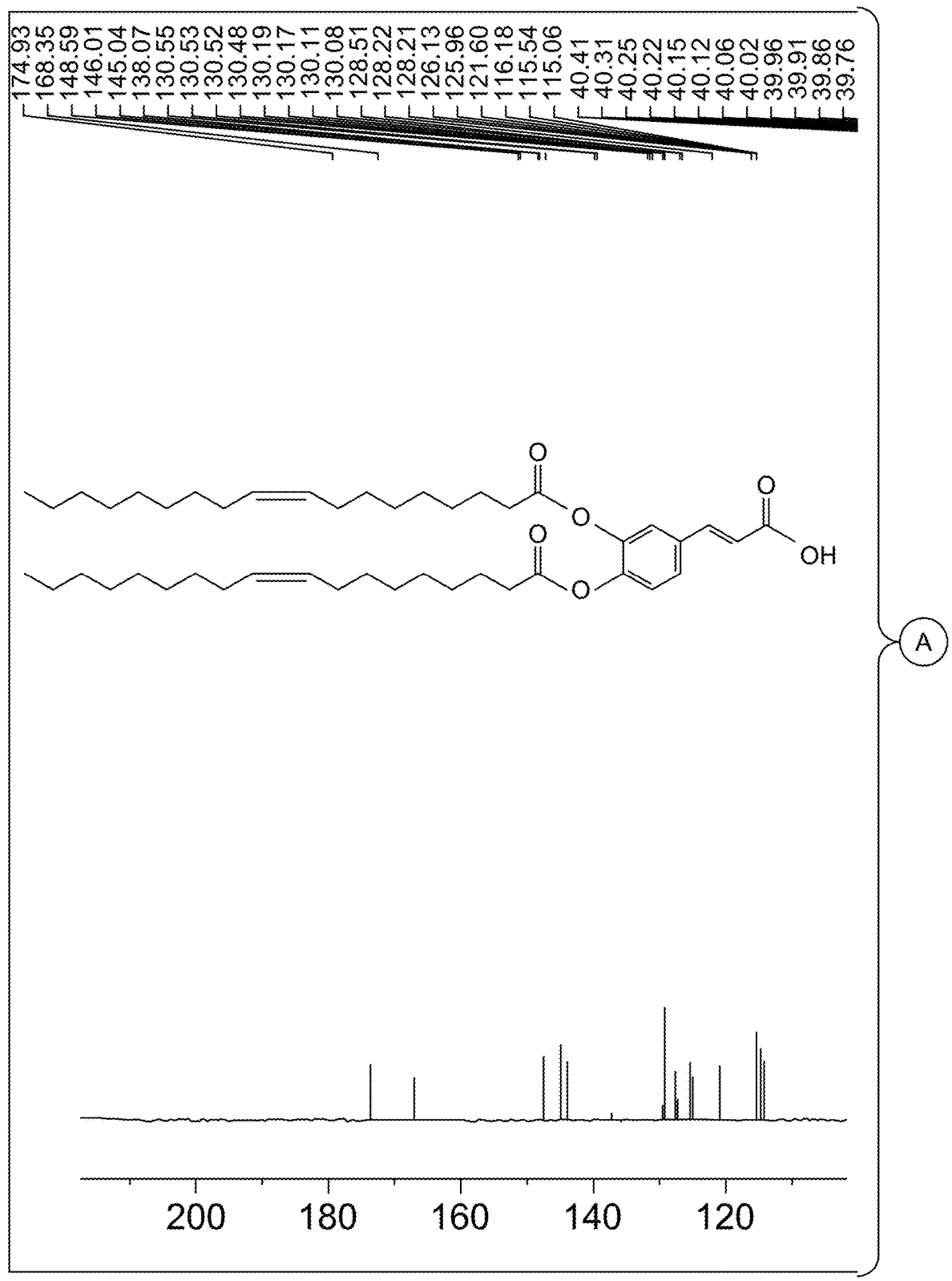
FIG. 13 is $^{13}$C NMR spectrum (850 MHz) of the OPAA in the DMSO at 25° C., according to certain embodiments of the present disclosure.
Figure 13:
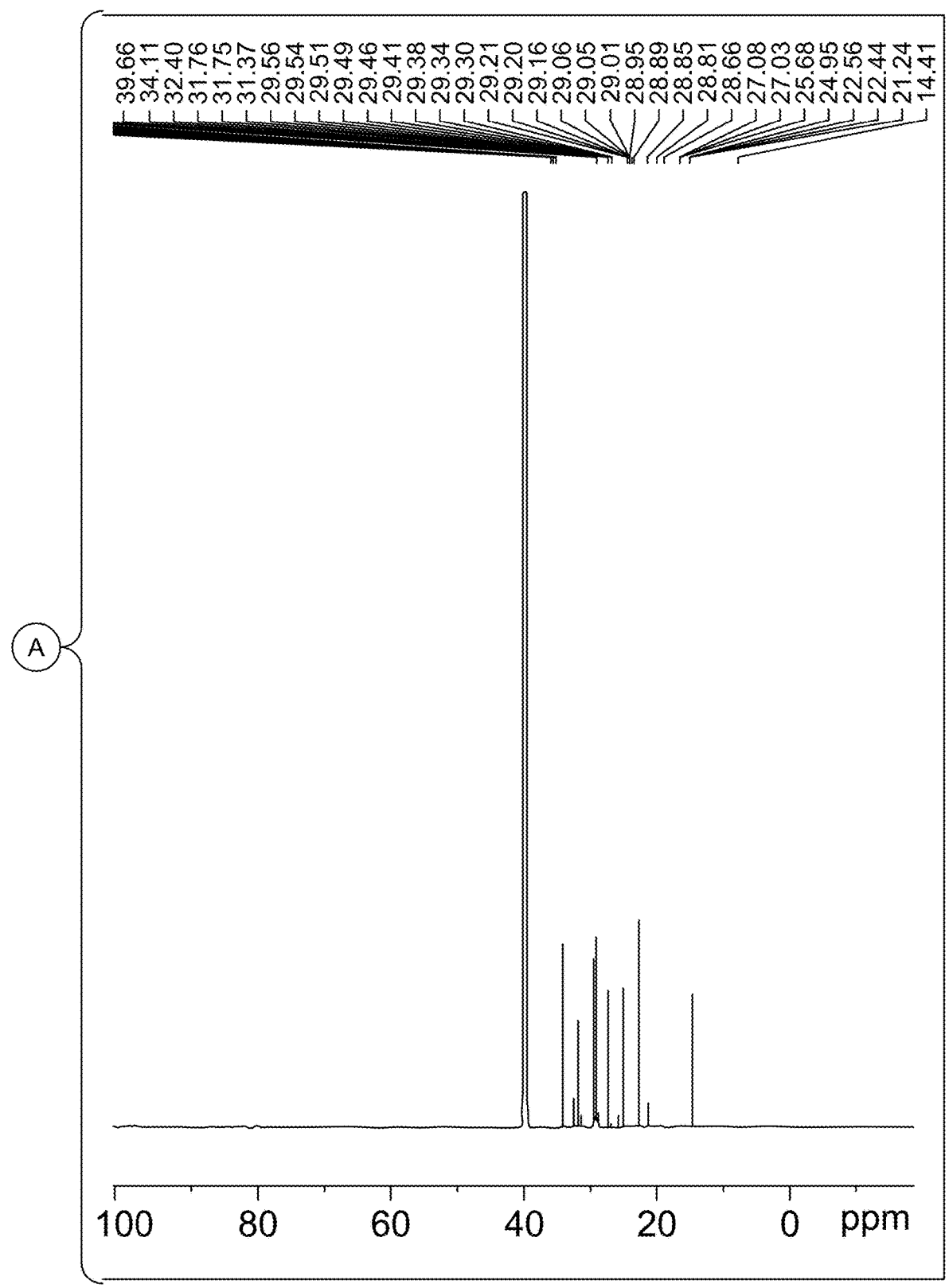
Figure 14:
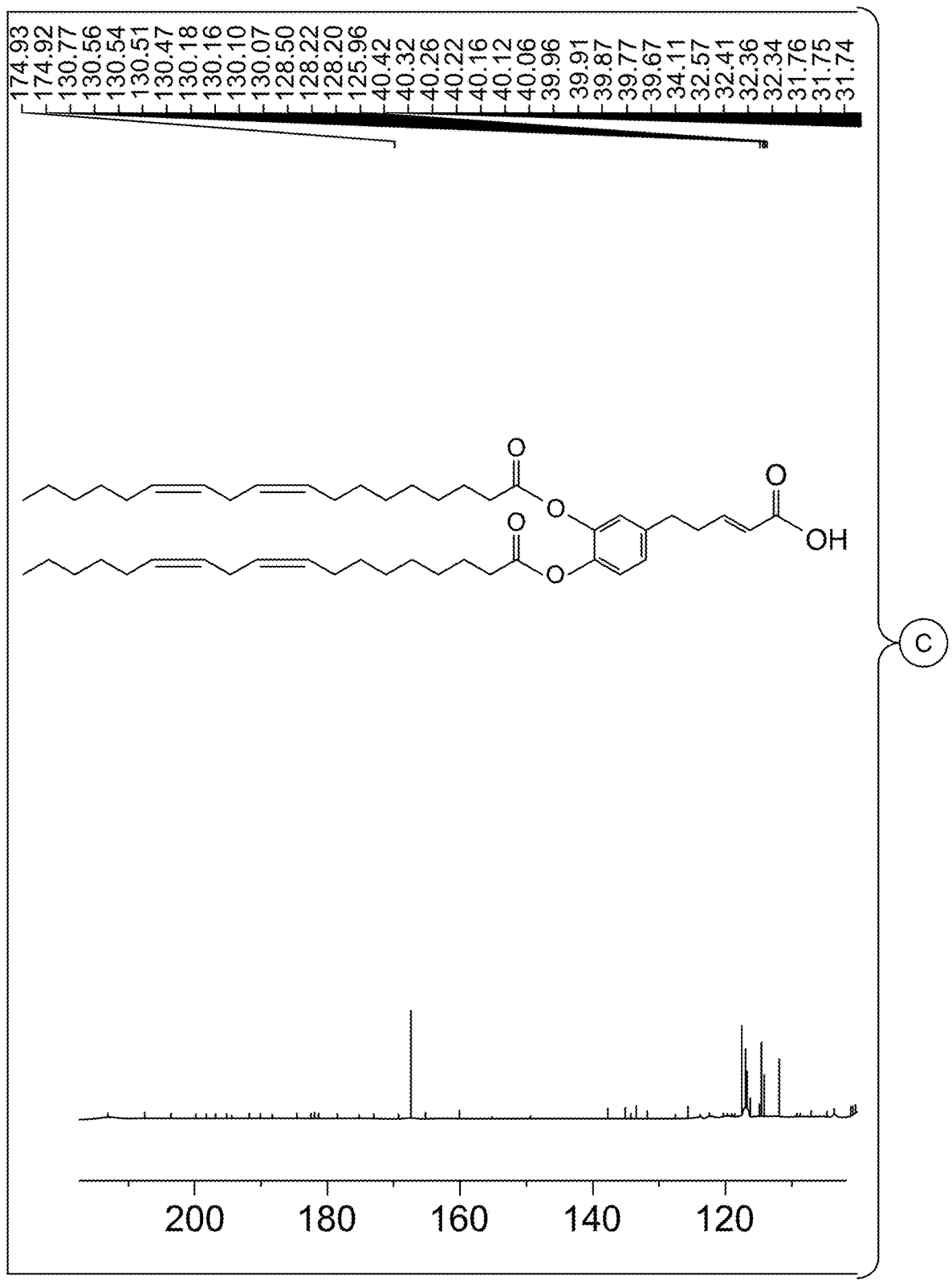
FIG. 14 is $^{13}$C NMR spectrum (850 MHz) of the ODPAA in the DMSO at 25° C., according to certain embodiments of the present disclosure.
Figure 14:
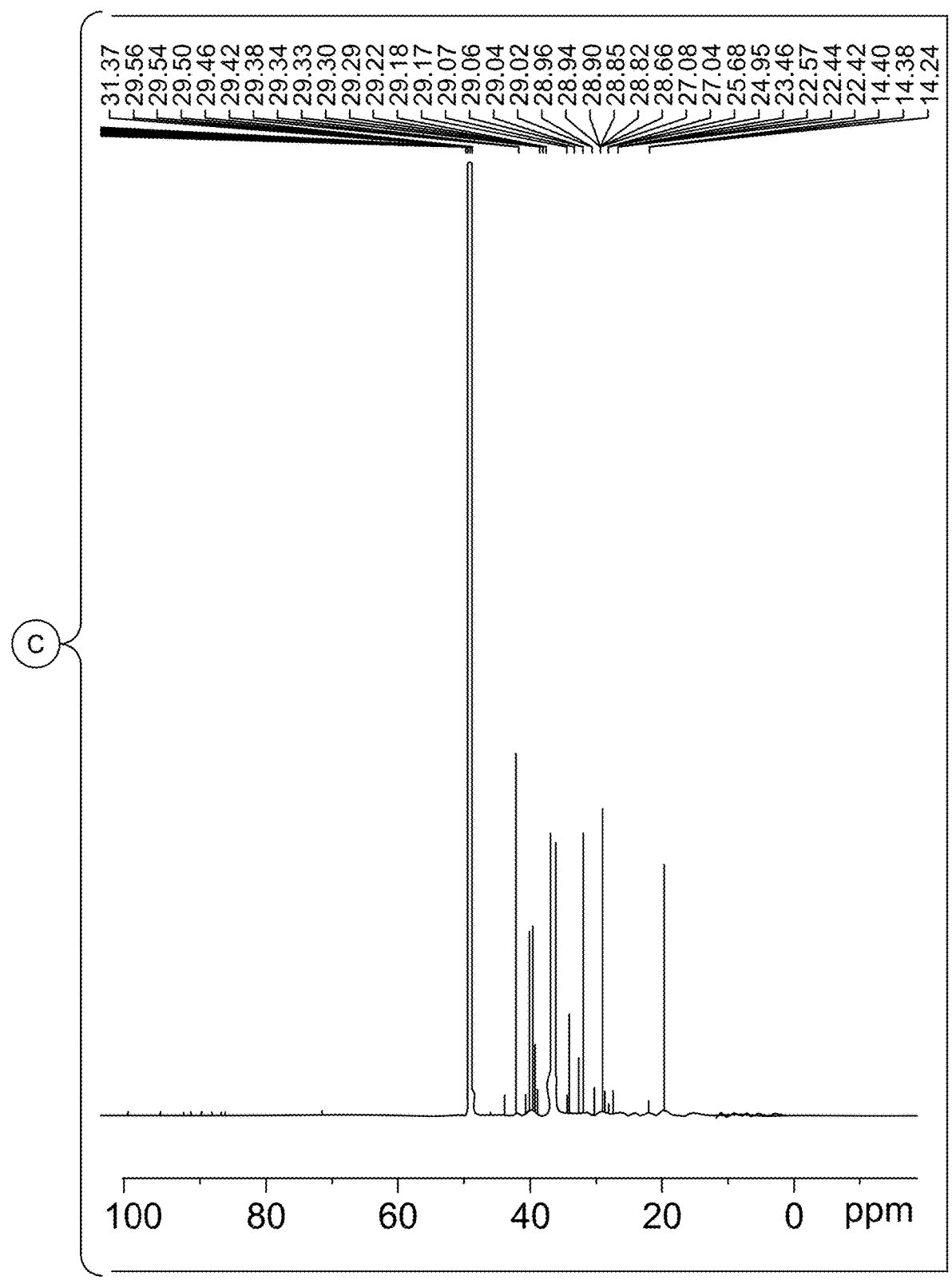

Furthermore, the $^{13}$C NMR spectra in the DMSO of the (SPAA, OPAA and ODPAA) showed major carbon signals at δ 14.4 to (—CH$_3$); δ 22.5 to (—CH$_2$—CH$_3$); δ 24.9 to (CH$_2$—CH$_2$—COO); δ 29.0-29.5 to (—CH$_2$—); δ 31.7 to (CH$_3$—CH$_2$—CH$_2$—); δ 34.1 to (—CH$_2$—COO—); δ 115-116 to (CH=CH—COOH); δ 121.6-146.1 to (C Ar ring); δ 148.5 to (Ar—CH=CH—); δ 168.3 to (—COOH); δ 174.9 to (—CH$_2$—COO—). Two distinct signals appeared in the two prepared compounds (OPAA and ODPAA) at δ 27.0 to (CH$_2$—CH=CH—) and at δ 130.5 to (—CH=CH—), in addition to the appearance of a signal for the prepared compound (ODPAA) at δ 25.6 to (—CH=CH—CH$_2$—CH=CH—) and δ 127.3 to (—CH=CH—CH$_2$—CH=CH—) as shown in FIGS. 12-14.

Confirmation of the structure of the nonionic surfactants (HPDS 4, HPDO 5 and HPDE 6) as prepared in Example 4.

Figure 15:
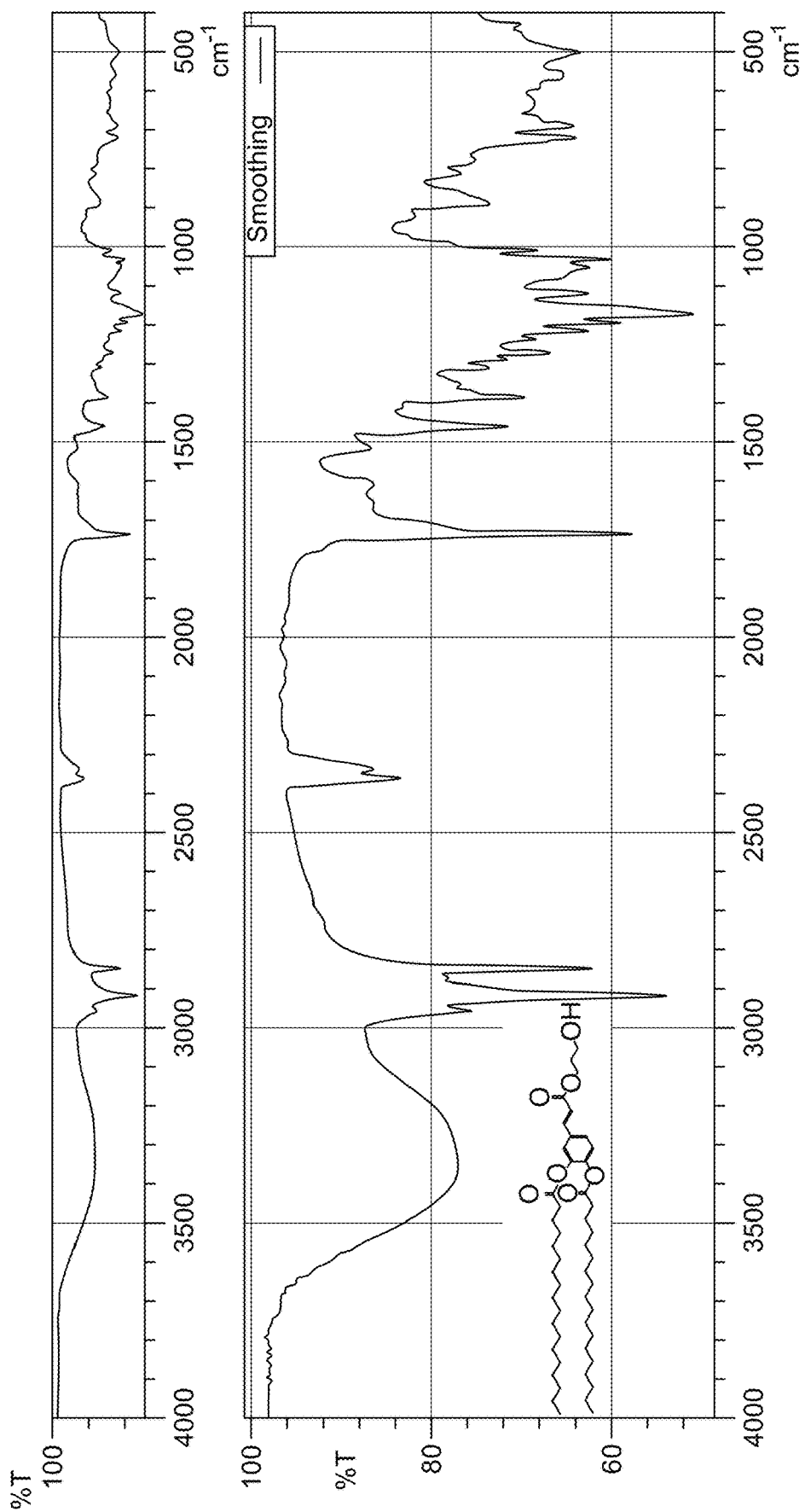
FIG. 15 is an IR spectrum of the HPDS, according to certain embodiments of the present disclosure.
Figure 16:
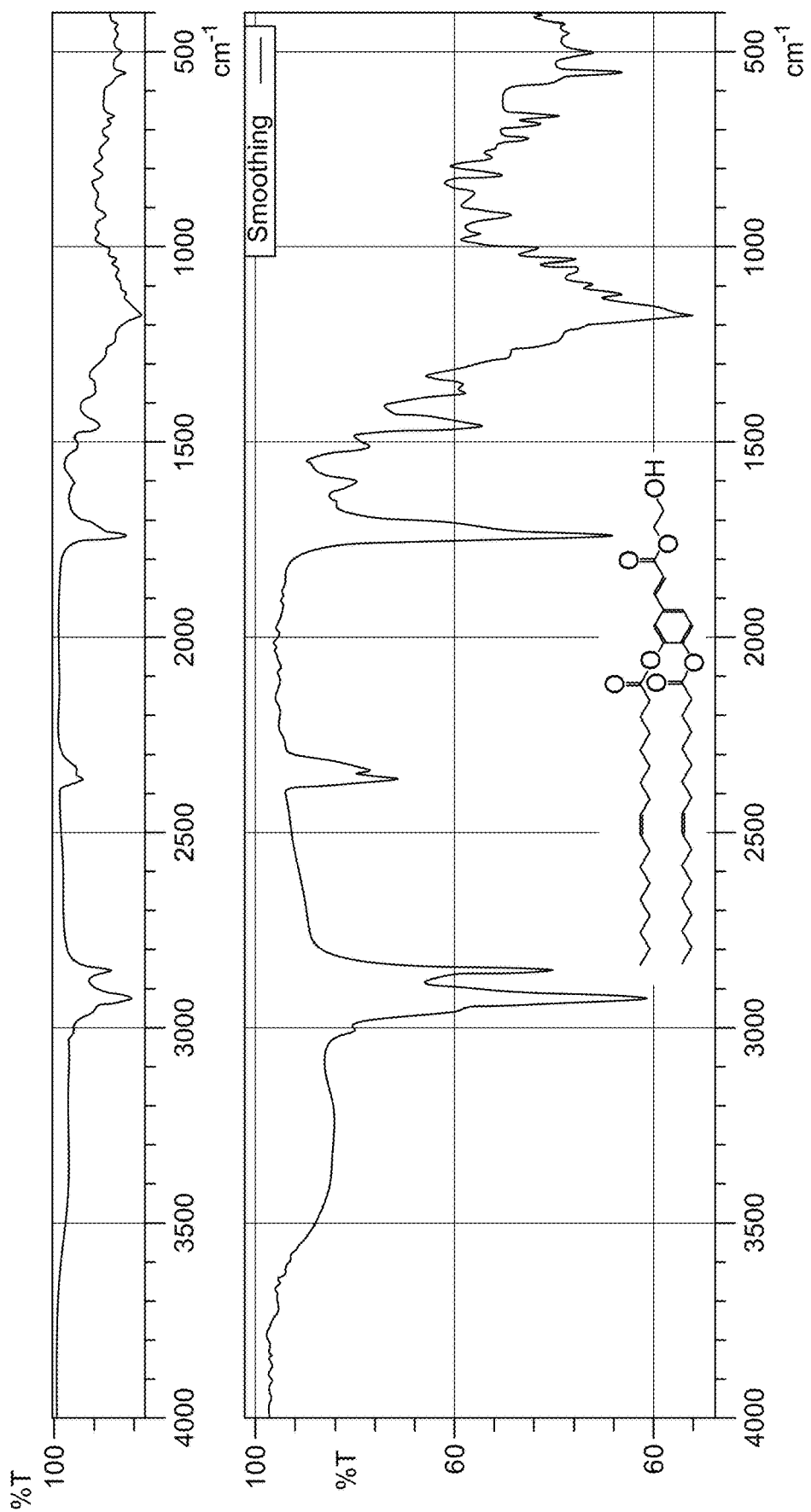
FIG. 16 is an IR spectrum of the HPDO, according to certain embodiments of the present disclosure.
Figure 17:
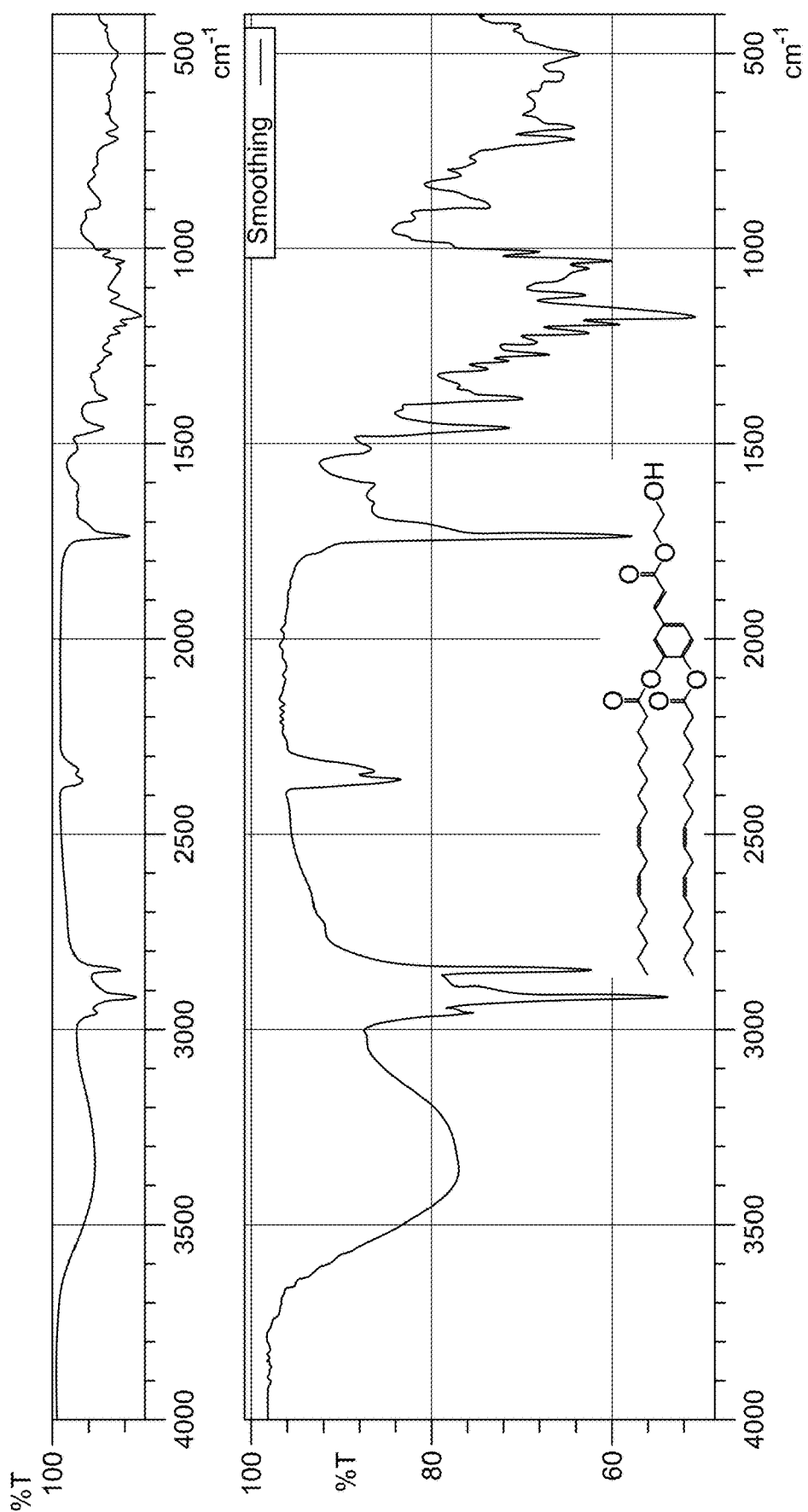
FIG. 17 is an IR spectrum of the HPDE, according to certain embodiments of the present disclosure.

The chemical structure of the nonionic surfactants (HPDS, HPDO and HPDE) from Example 4 was confirmed using IR spectroscopy in the range 500-4000 $cm^{-1}$, $^1$HNMR and $^{13}$CNMR. The FTIR spectrum of the prepared compounds (HPDS, HPDO and HPDE) showed broad bands at 3350 $cm^{-1}$ corresponding to OH stretching, bands at 2800-2900 $cm^{-1}$ corresponding to C—H stretching. The carboxyl carbonyl disappeared, and the carbonyl ester appeared at 1735 $cm^{-1}$. The appearance of bands at 1470 $cm^{-1}$, 1380 $cm^{-1}$ and 1170 $cm^{-1}$ correspond to aromatic C=C (benzene ring), aliphatic CH$_2$ bending, and C—O stretching, respectively. In the two compounds (HPDO and HPDE) corresponding absorption appeared at 3000 $cm^{-1}$ for $sp^2$ C—H stretching and 1610 $cm^{-1}$ for C=C stretching as shown in FIGS. 15-17.

Figure 18:
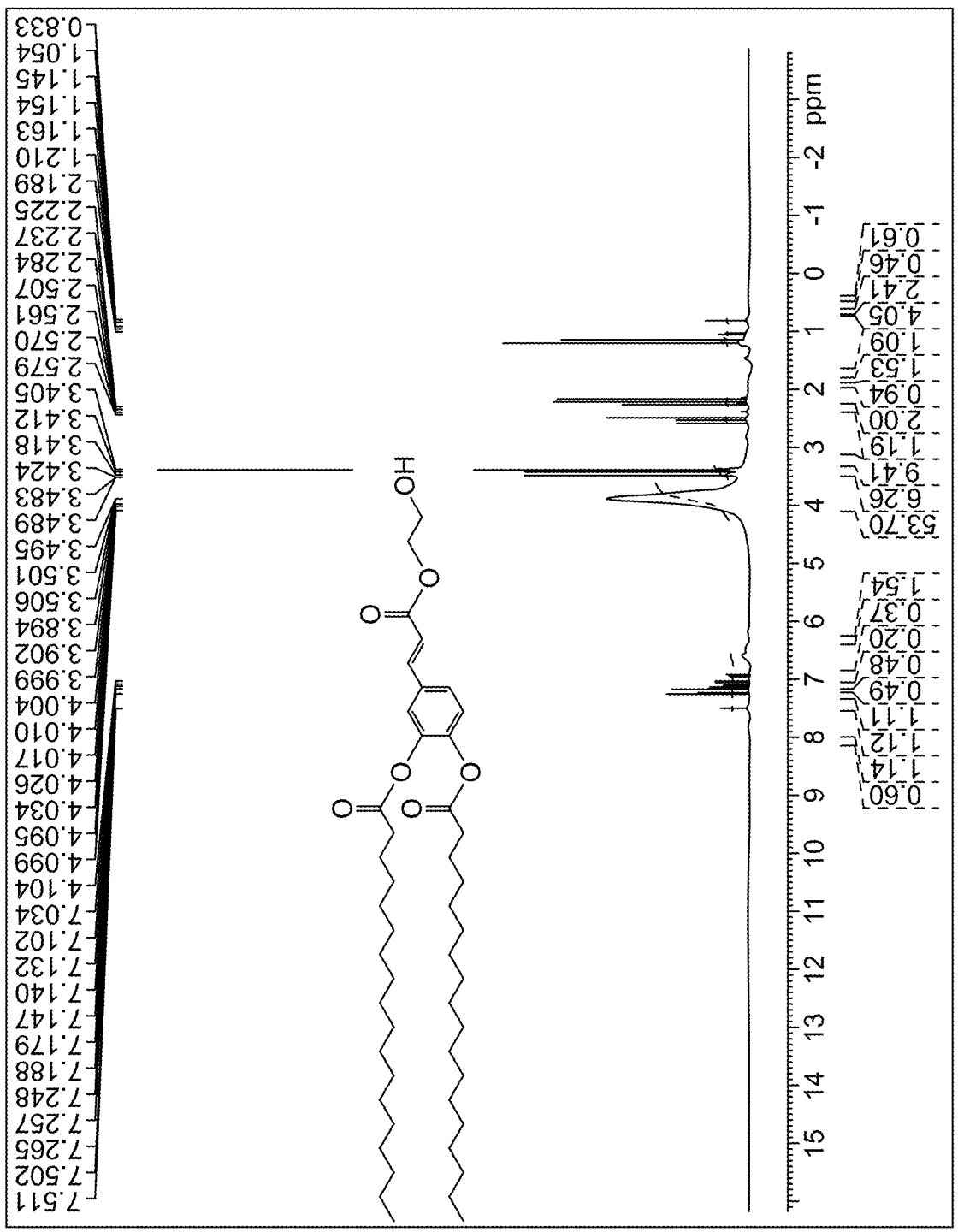
FIG. 18 is $^1$H NMR (850 MHz) spectrum of the HPDS in DMSO at 25° C., according to certain embodiments of the present disclosure.
Figure 19:
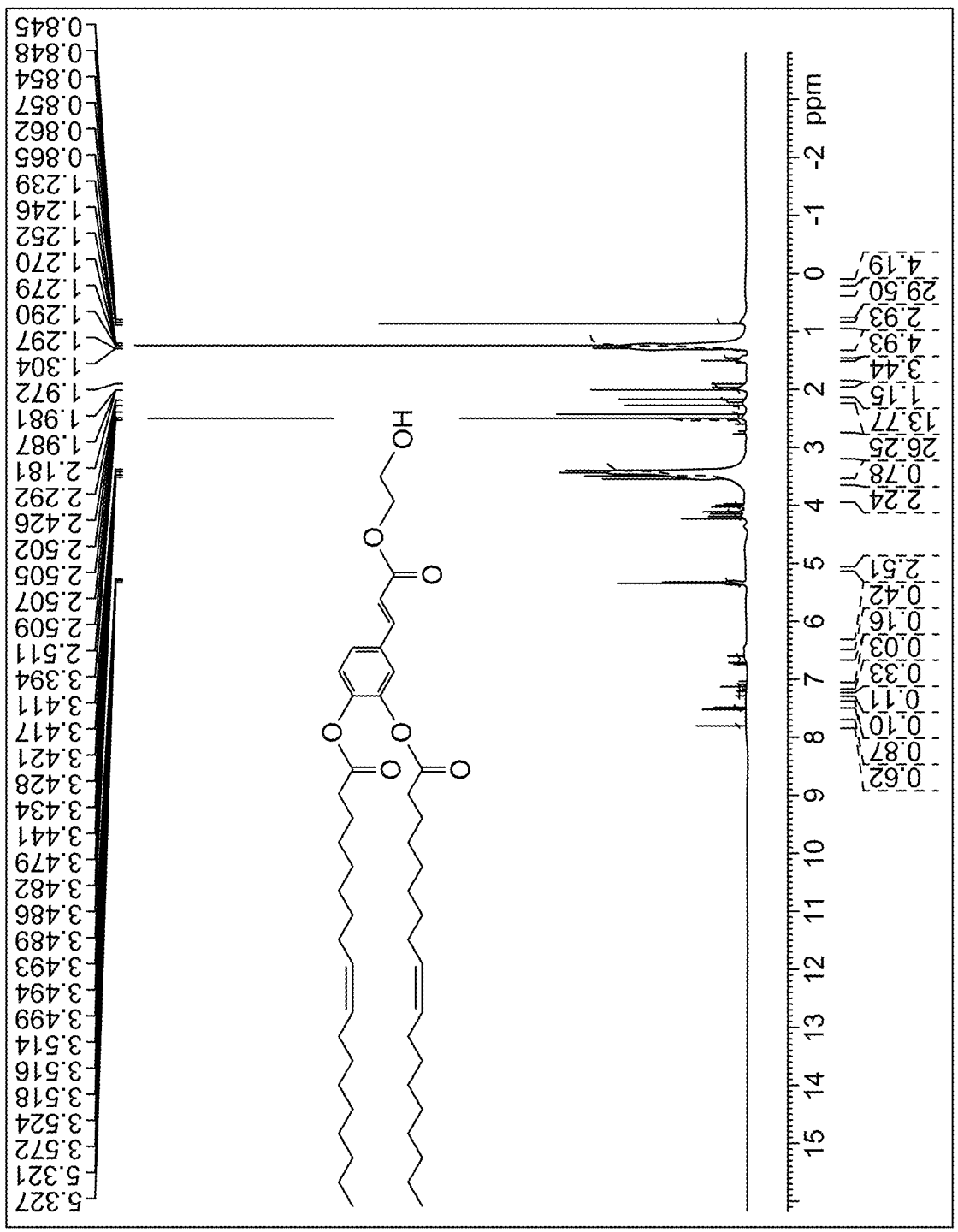
FIG. 19 is $^1$H NMR (850 MHz) spectrum of the HPDO in DMSO at 25° C., according to certain embodiments of the present disclosure.
Figure 20:
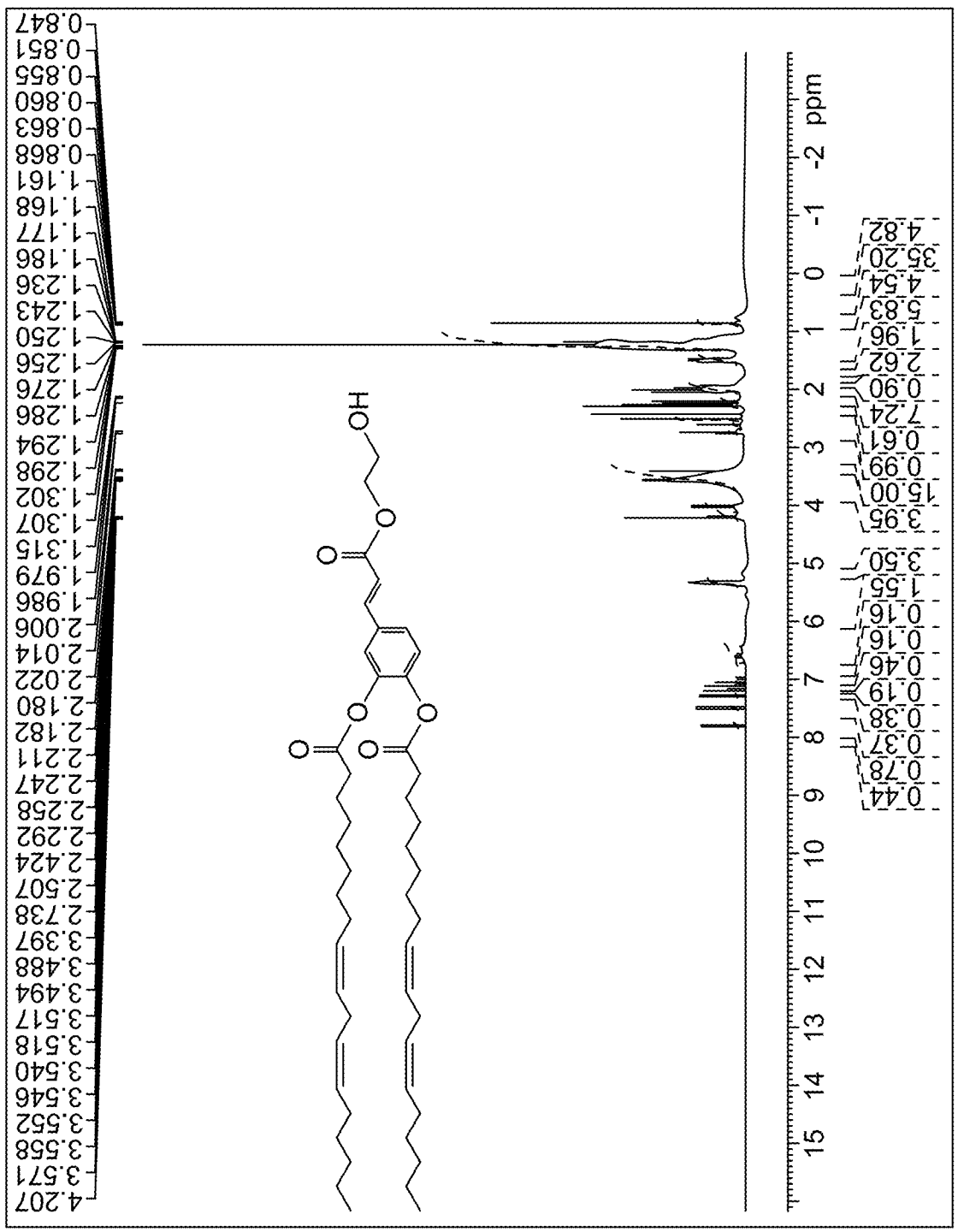
FIG. 20 is $^1$H NMR (850 MHz) spectrum of the HPDE in DMSO at 25° C., according to certain embodiments of the present disclosure.

The $^1$H NMR spectra of the three compounds prepared (SPAA, OPAA, and ODPAA) in the DMSO showed major signals for (—CH$_3$) at δ 0.86; (—CH$_2$—) at δ 1.14-1.31; (—CH$_2$—CH$_2$—COO—) at δ 1.51; (—CH$_2$—COO—Ar) at δ 2.28; (—COO—CH$_2$—CH$_2$—OH) at δ 2.57-3.51; (—CH$_2$—OH) at δ 3.6; (—COO—CH$_2$—CH$_2$OH) at δ 4.20; (—CH=CH—COO—) at δ 6.55; (—CH=CH—COO—) at δ 6.8-7.51; (—Ar ring) at δ 7.03-7.8. In addition to the appearance of a signal for the compounds HPDO and HPDE showed signals for (—CH$_2$—CH=CH—) at δ 1.97-2.02 and at δ 5.32 for (—CH=CH—). A distinctive signal of the compound (HPDE) appears at δ 2.63 for (—CH=CH—CH$_2$—CH=CH—) as shown in FIGS. 18-20.

Figure 21:
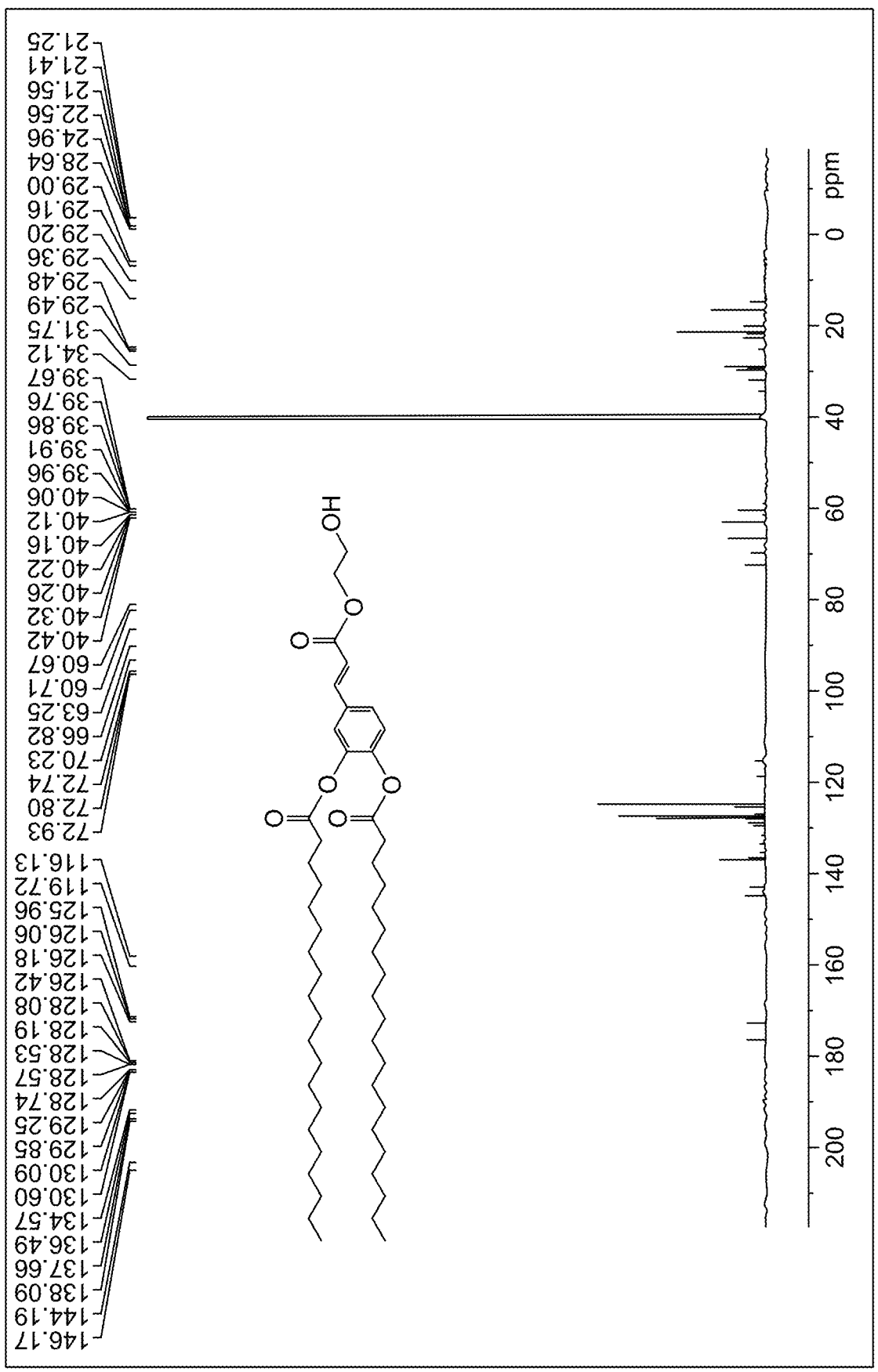
FIG. 21 is $^{13}$C NMR spectrum (850 MHz) of the HPDS in DMSO at 25° C., according to certain embodiments of the present disclosure.
Figure 22:
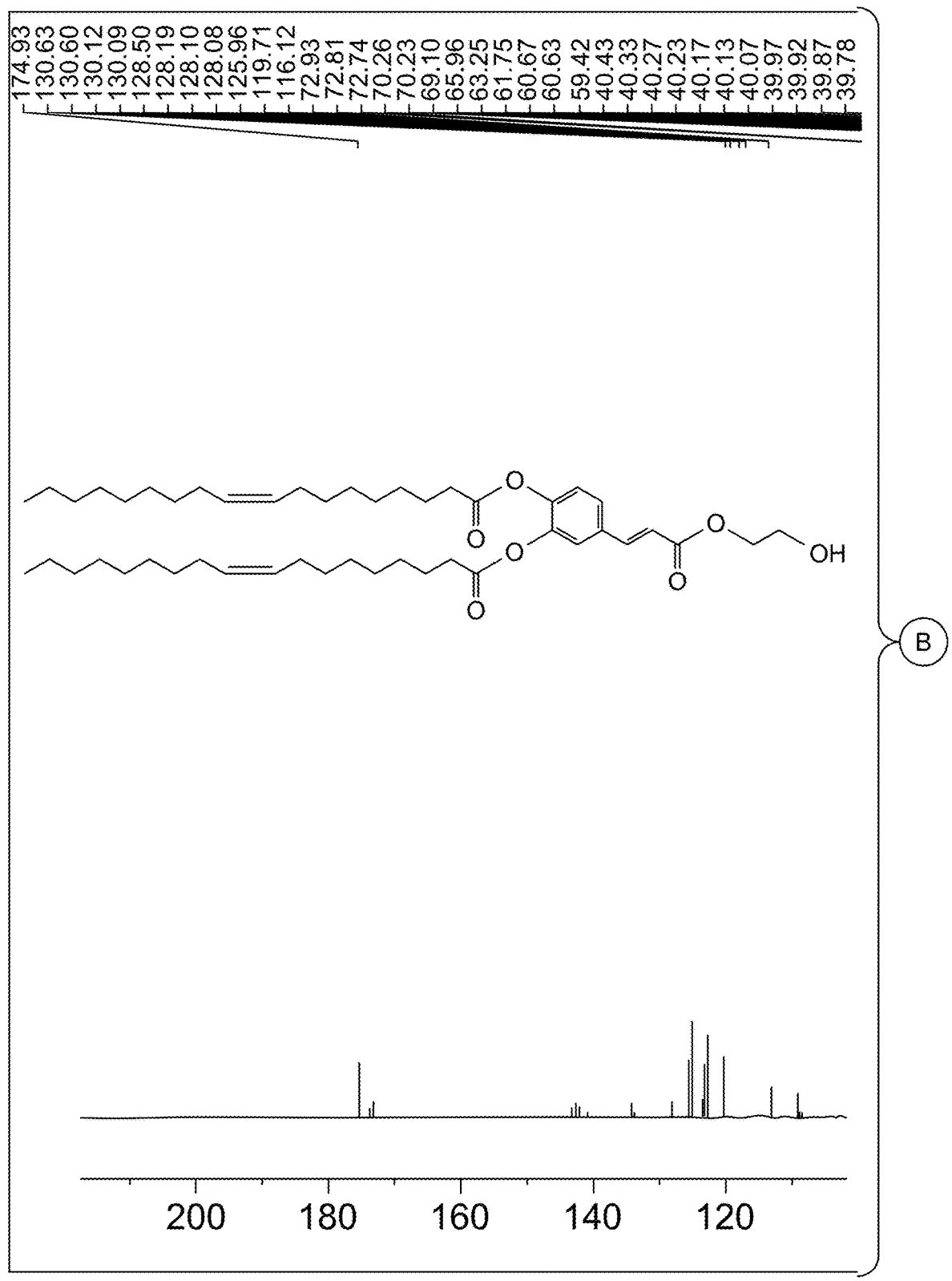
FIG. 22 is $^{13}$C NMR spectrum (850 MHz) of the HPDO in DMSO at 25° C., according to certain embodiments of the present disclosure.
Figure 22:
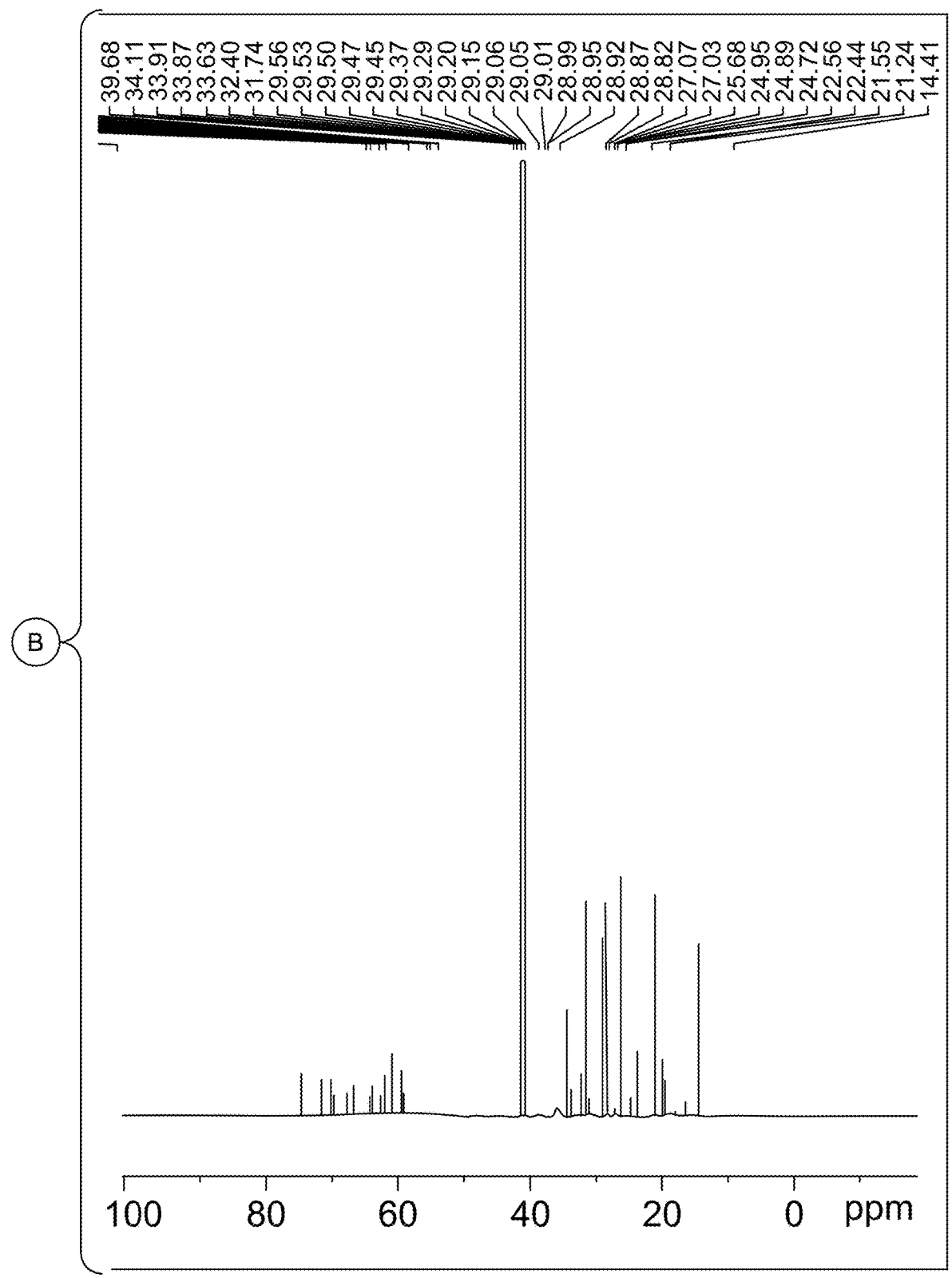
Figure 23:
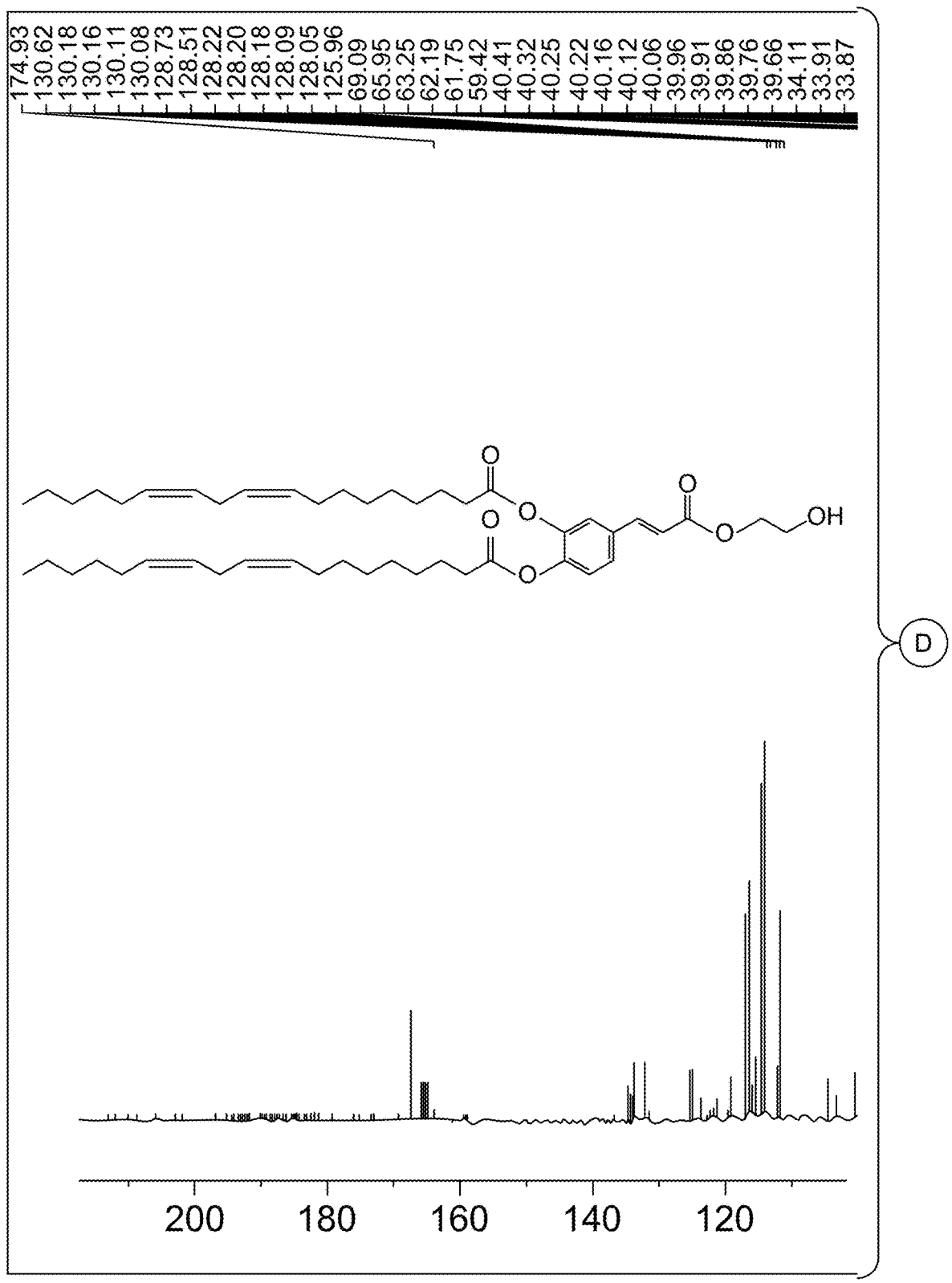
FIG. 23 is $^{13}$C NMR spectrum (850 MHz) of the HPDE in DMSO at 25° C., according to certain embodiments of the present disclosure.
Figure 23:
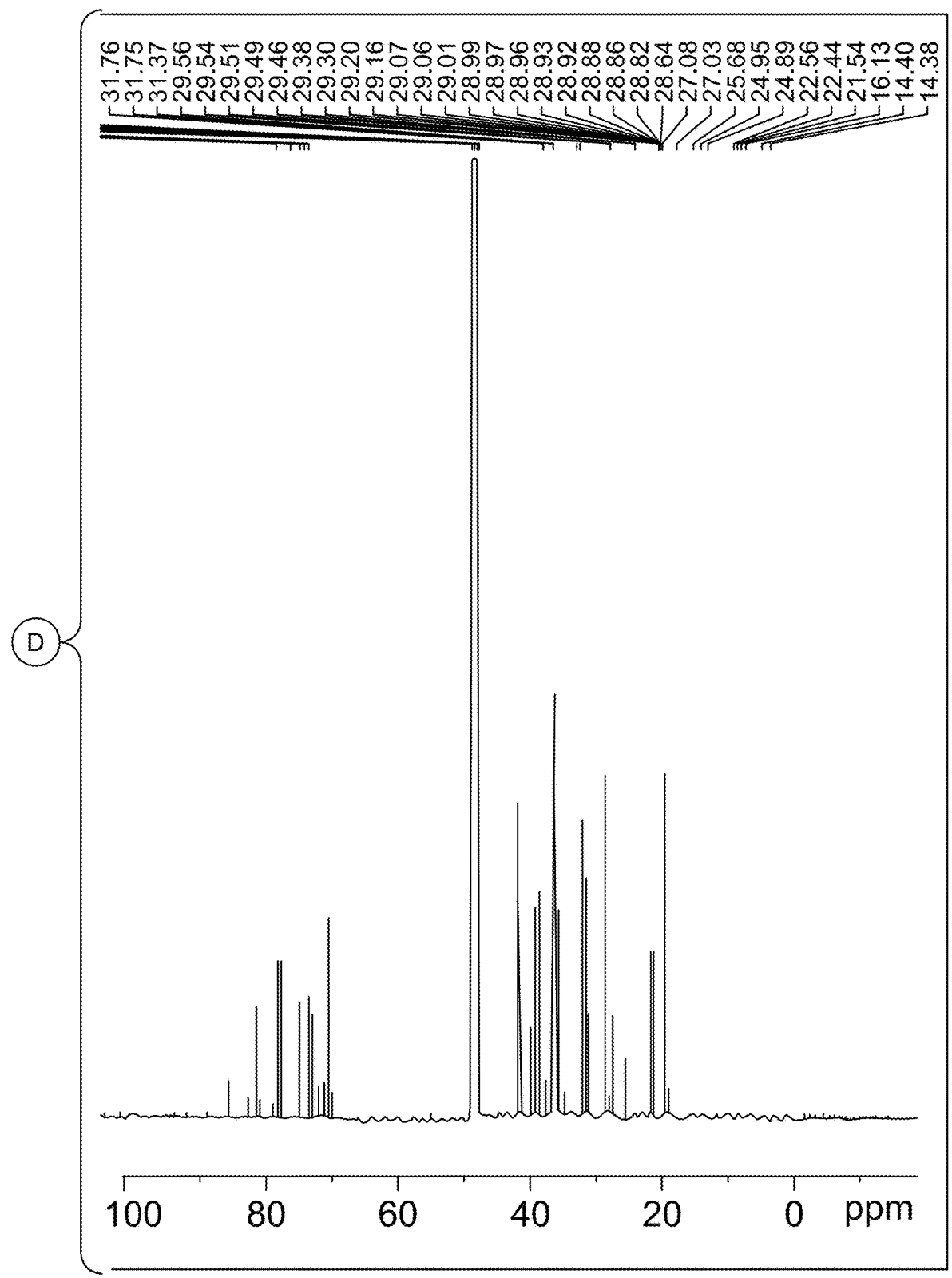

Moreover, the $^{13}$C NMR spectra in the DMSO of the (HPDS, HPDO and HPDE) showed major carbon signals at δ 14.4 corresponding to (—CH$_3$); δ 21.2-22.5 corresponding to (—CH$_2$—CH$_3$); δ 24.9 attributed to (—CH$_2$—CH$_2$—COO—); δ 28.6-29.5 corresponding to (—CH$_2$—); δ 31.7 corresponding to (CH$_3$—CH$_2$—CH$_2$—); δ 34.1 corresponding to (—CH$_2$—COO—); δ 116.1 corresponding to (—CH=CH—COO—); δ 119-146 corresponding to (6C, Ar—C); δ 146.1 corresponding to (1C, Ar—CH=CH—); δ 172.5 corresponding to (1C, —COO—CH$_2$CH$_2$OH); and δ 175.1 corresponding to (2C, —CH—COO—). A distinctive signal for (HPDS) at δ 60.6 corresponds to (1C, —CH$_2$—CH$_2$—OH) and δ 66.8 corresponds to (1C, —COO—CH$_2$—CH$_2$—OH). In addition to the appearance of a signal that distinguishes the two compounds (HPDO and HPDE) at δ 27.0 corresponds to (—CH$_2$—CH=CH) and at δ 130.6 corresponding to (—CH=CH—). Moreover, the appearance of two signals of the compound (HPDE) at δ 25.6 corresponding to (—CH=CH—CH$_2$—CH=CH—) and δ 127.0 corresponding to (—CH=CH—CH$_2$—CH=CH—) are shown in FIGS. 21-23.

Characterization of Nanostructure for Nonionic Surfactant (AgNPs/HPDS, AgNPs/HPDO and AgNPs/HPDE)

Figure 24:
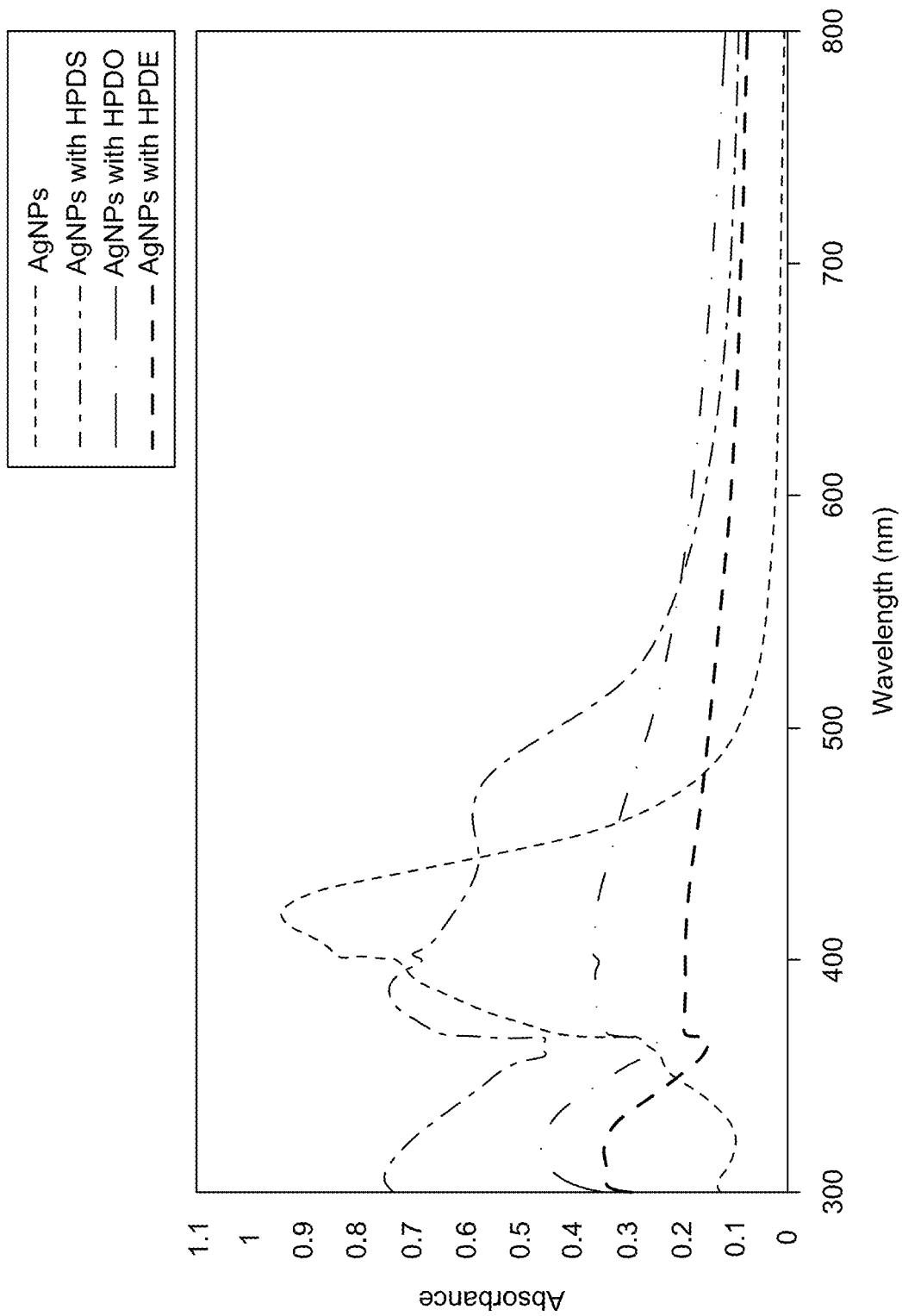
FIG. 24 depicts ultraviolet (UV) spectra of synthesized AgNPs before and after the addition of the surfactants such as the HPDS, HPDO, and HPDE, according to certain embodiments of the present disclosure.

To confirm the formation of the prepared silver and nanohybrid nanoparticles (HPDS, HPDO, and HPDE), UV studies were performed. FIG. 24 shows the UV spectrum of AgNPs prepared before and after the addition of the non-ionic surfactants. A characteristic absorption peak appeared at 426 nm before the addition of the non-ionic surfactant. The addition of the non-ionic surfactants (HPDS, HPDO, and HPDE) to the AgNPs solution resulted in changing the UV absorption spectra of AgNPs dramatically due to the aggregation of the non-ionic surfactant molecules on the AgNPs, which leads to the neutralization of charge. Metal particles in aqueous colloidal dispersions have a negative charge due to the adsorbed anions, whereby the addition of nonionic amphipathic molecules reduced the charge around the particles through the displacement of the adsorbed ions.

Characterization of Silver Nanoparticles

Figure 25F:
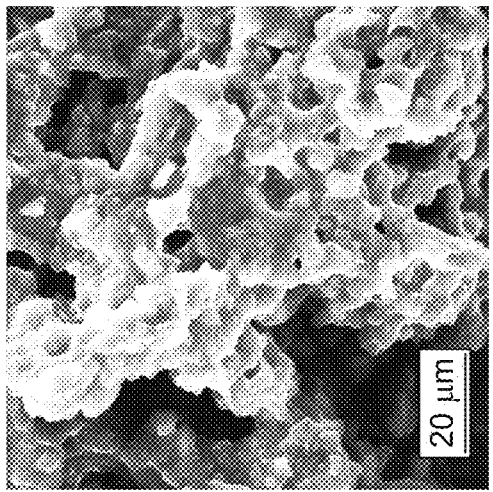
FIG. 25F is a SEM micrograph of the OANH at a magnification of 20 m, according to certain embodiments of the present disclosure.
Figure 25E:
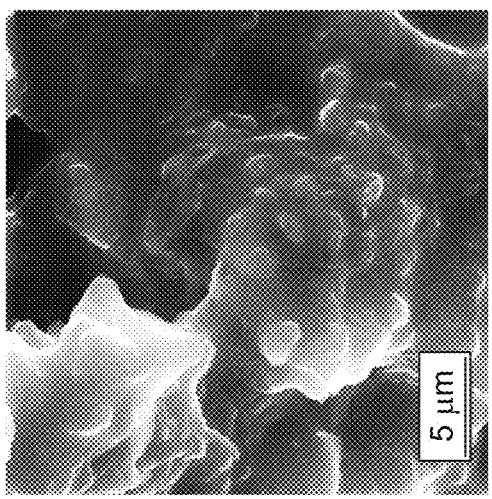
FIG. 25E is a SEM micrograph of a AgNP-(Z)-4-((E)-3-(2-hydroxyethoxy)-3-oxoprop-1-en-1-yl)-1,2-phenylene dioleate (OANH) at magnification of 5 m, according to certain embodiments of the present disclosure.
Figure 25D:
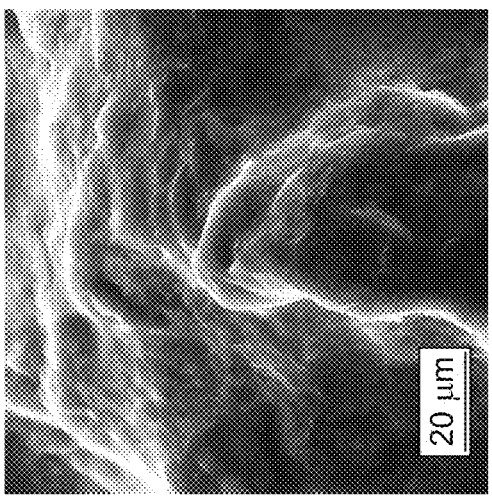
FIG. 25D is a SEM micrograph of the SANH at a magnification of 20 m, according to certain embodiments of the present disclosure.
Figure 25H:
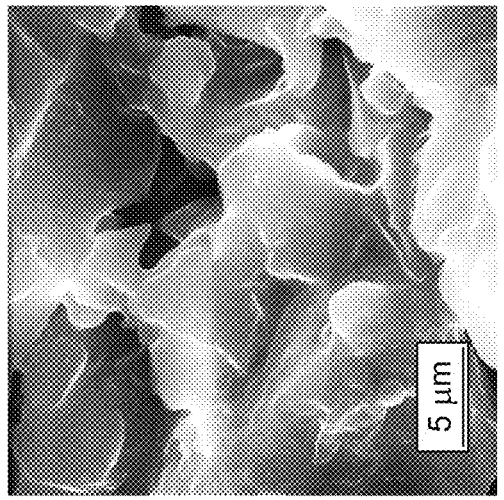
FIG. 25H is a SEM micrograph of the LANH at a magnification of 5 m, according to certain embodiments of the present disclosure.
Figure 25G:
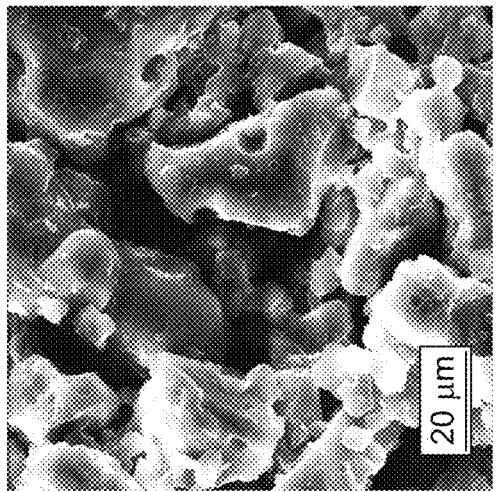
FIG. 25G is a SEM micrograph of a AgNP-(E)-4-(3-(2-hydroxyethoxy)-3-oxoprop-1-en-1-yl)-1,2-phenylene distearate (LANH) at magnification of 20 m, according to certain embodiments of the present disclosure.

FIGS. 25A-25H show the surface morphology of the AgNPs and silver nanohybrid derivatives, SANH, OANH, and LANH, with different magnifications at 1, 2, 5, and 20 micrometers (m). FIGS. 25A-25B are the SEM images depicting the surface morphology of AgNPs which show spherical shapes due to agglomerated particle distribution, and star shapes of different sizes and are aggregated.

Figure 26:
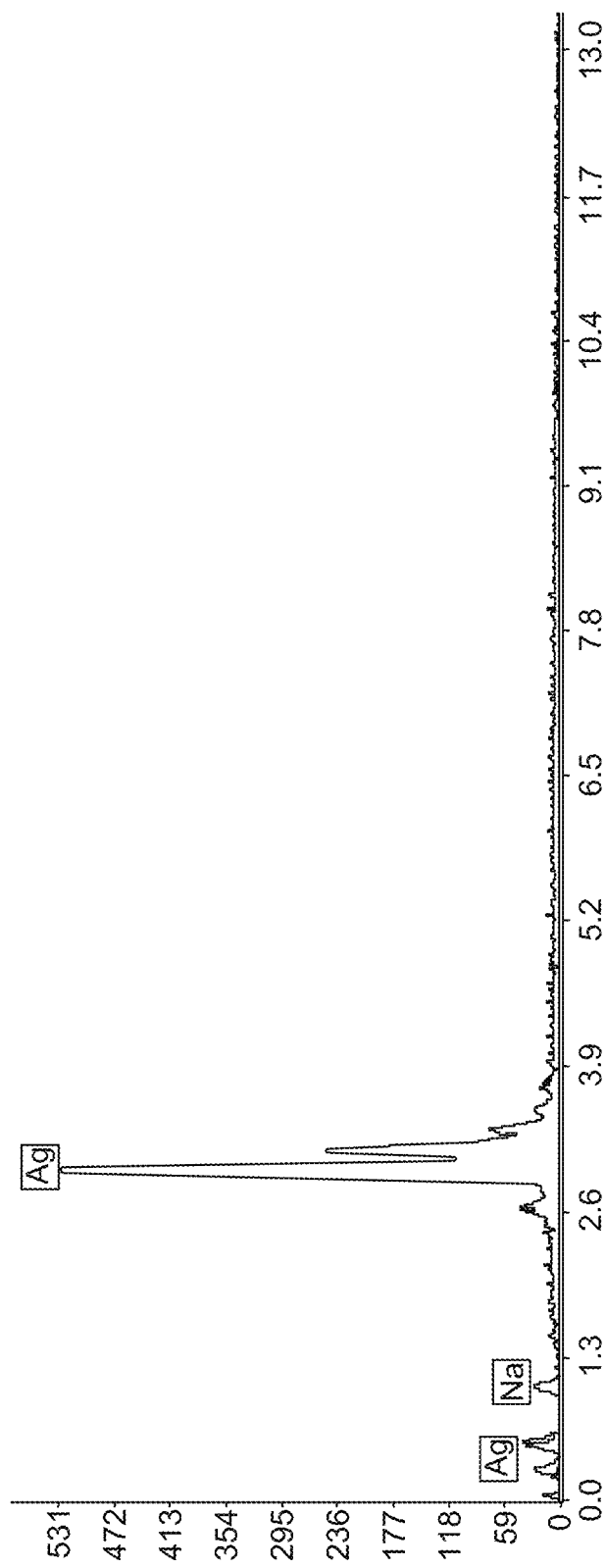
FIG. 26 is an Energy Dispersive X-Ray Analysis (EDX) spectrum along of the AgNPs of 20-25 nm sample, according to certain embodiments of the present disclosure.

The micrographs of the silver nanohybrids derivatives, SANH, OANH, and LANH, are shown in FIGS. 25C-25H. FIGS. 25C-25H show a sponge-like morphology with a porous structure with a network of interconnected pores of different micrometric sizes. In comparison, the silver nanohybrid derivatives have a higher distribution than AgNPs. The presence of a silver signal was confirmed, as indicated in FIG. 26. The study confirms that the AgNPs include different proportions of elements such as sodium and silver. The EDX spectra clearly show the successful preparation of AgNPs.

Weight Loss Measurements

Figure 27A:
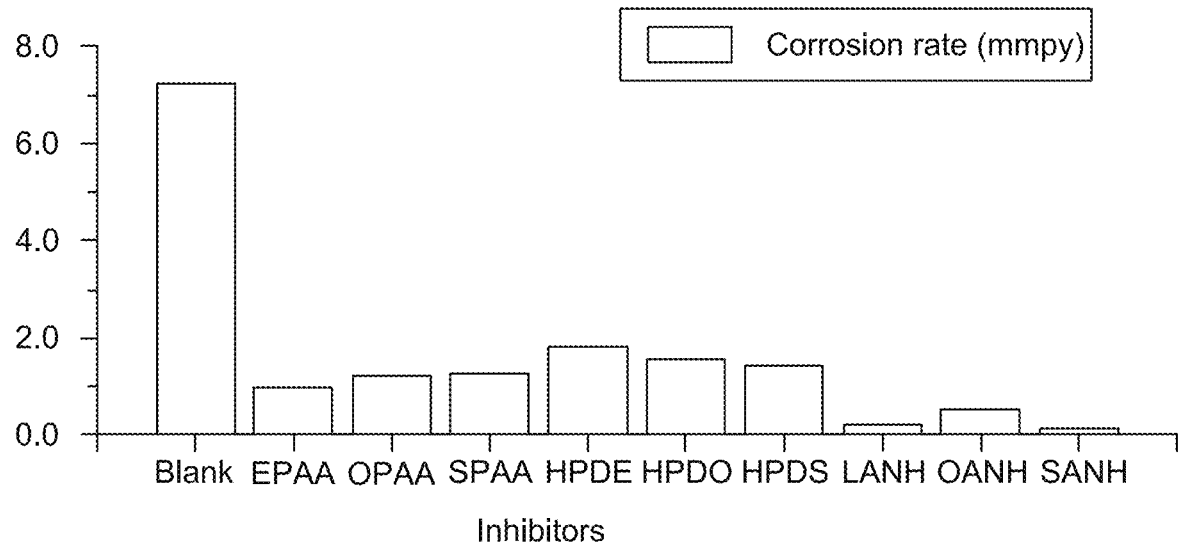
FIG. 27A is a graph depicting corrosion rates of mild steel specimen immersed in 1.0 molar (M) HCl at 298 kelvin (K) for 96 hours (h) in the absence and the presence of inhibitors, according to certain embodiments of the present disclosure.
Figure 27B:
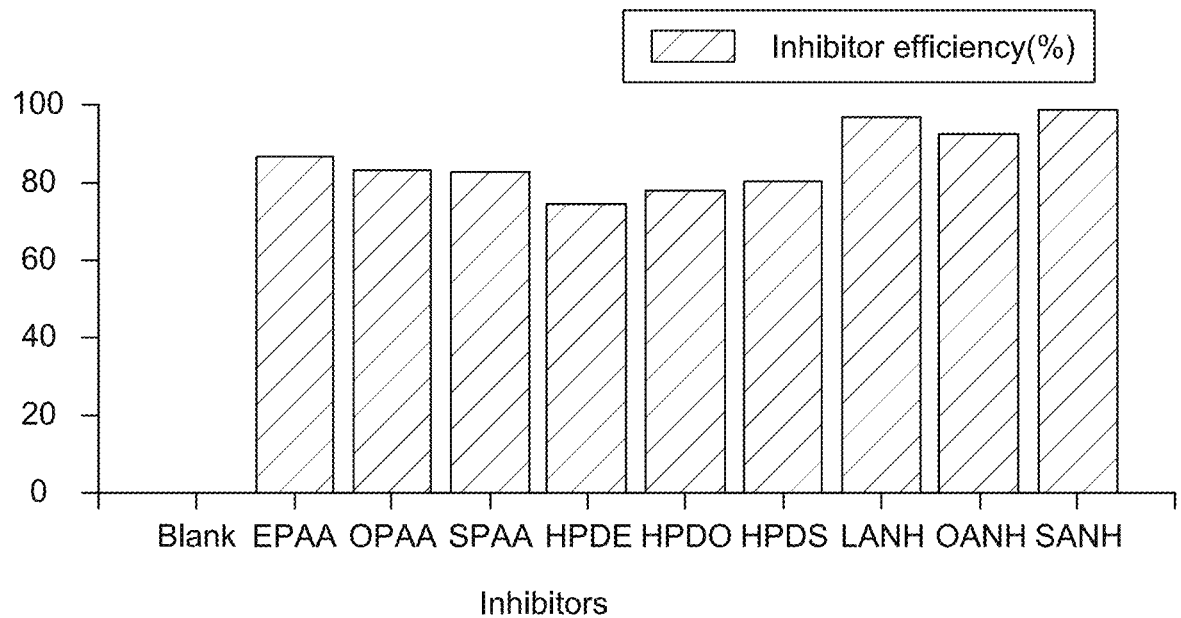
FIG. 27B is a graph depicting inhibition efficiencies of the mild steel specimen immersed in 1.0 M HCl at 298 K for 96 h in the absence and the presence of the inhibitors, according to certain embodiments of the present disclosure.

Results of weight loss corrosion measurements of the mild steel coupons immersed in 1.0 M HCl at 298 K for 96 h (4 days) in the absence and the presence of the inhibitors are presented in FIGS. 27A-27B. The specimen without the inhibitors underwent tremendous dissolution at a rate of 7.208 mmpy, whereas, the rate of dissolution was significantly suppressed in the presence of the inhibitor HPDE, having a corrosion rate of 1.838 mmpy. The hybrid molecules containing AgNPs: LANH, OANH, and SANH exhibited the lowest corrosion rates of 0.231, 0.541, and 0.079 mmpy, respectively, with inhibition efficiencies of 96.8, 92.8, and 98.9%, respectively. The attributed inhibition efficiencies of the hybrid molecules were partly due to corresponding enhanced electronic features, and also due to the presence of the $Ag^+$ ions which facilitates the adsorption of the inhibitors on the surface of the mild steel while blocking anodic and cathodic processes. The hybrid molecules demonstrating the lowest corrosion rates were selected for further corrosion studies. Mild steel corrosion involves several stages; first, the diffusion of the oxidizing species in the medium (mostly oxygen) to a double layer metal-solution interface, and through the double layer metal-solution interface to the surface of the metal, followed by the displacement of water molecules from the surface by the oxidizing species and the oxidation of the metal by the adsorbed species. The addition of the inhibitors mostly prevents the diffusion of the oxidizing species to the surface through the formation of protective layers on the surface. The corrosion of the mild steel specimen was mainly controlled by concentration polarization. To estimate the activation energy ($E_A$) of the mild steel corrosion, equation (4) was used.

$$\log CR = \frac{-E_A}{2.303RT} + \log A \qquad (4)$$

Wherein, R is the molar gas constant and has the value of 8.314 J/K·mol, A is the Arrhenius pre-exponential factor, and T is the absolute temperature.

Figure 28A:
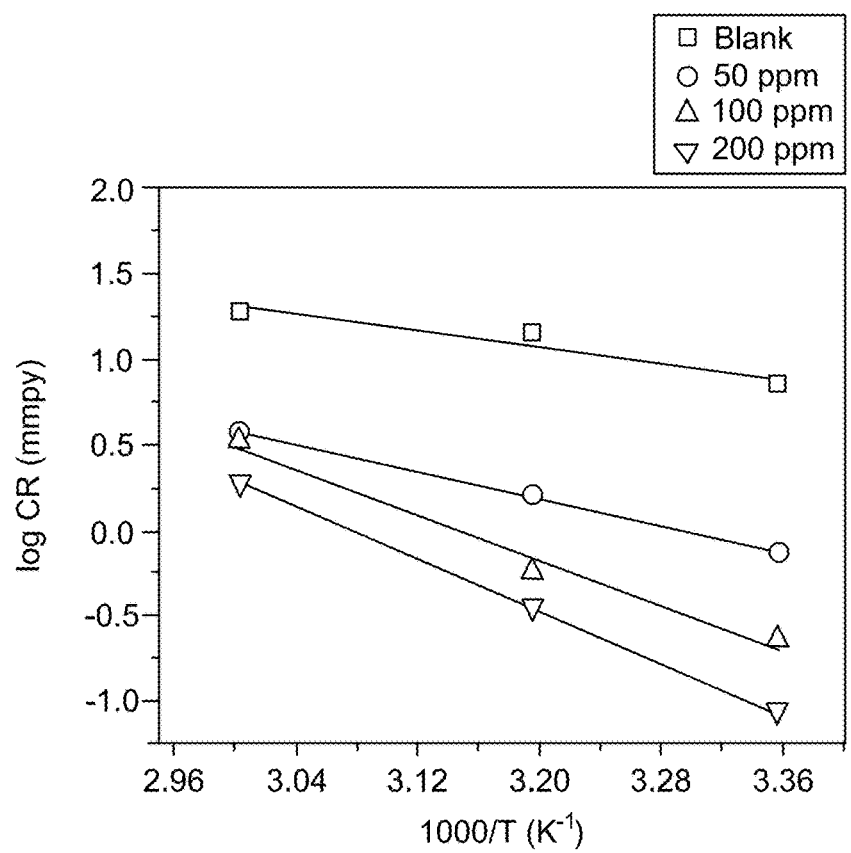
FIG. 28A is an Arrhenius plot of the mild steel corrosion in 1.0 M HCl in the absence (blank) and the presence of 50-200 parts per million (ppm) of LANH hybrid inhibitor molecules, according to certain embodiments of the present disclosure.
Figure 28B:
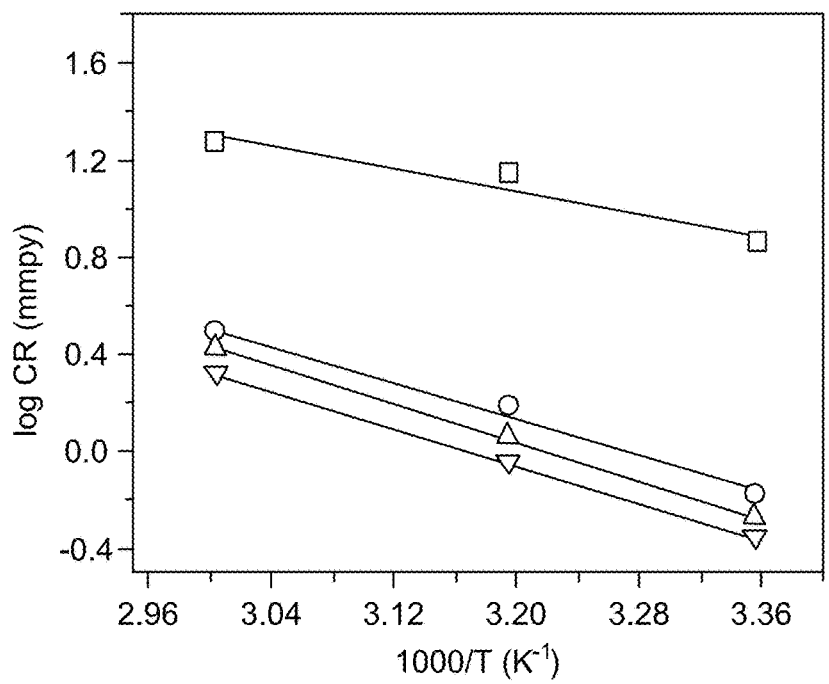
FIG. 28B is an Arrhenius plot of the mild steel corrosion in 1.0 M HCl in the absence (blank) and the presence of 50-200 ppm of OANH hybrid inhibitors, according to certain embodiments of the present disclosure.
Figure 28C:
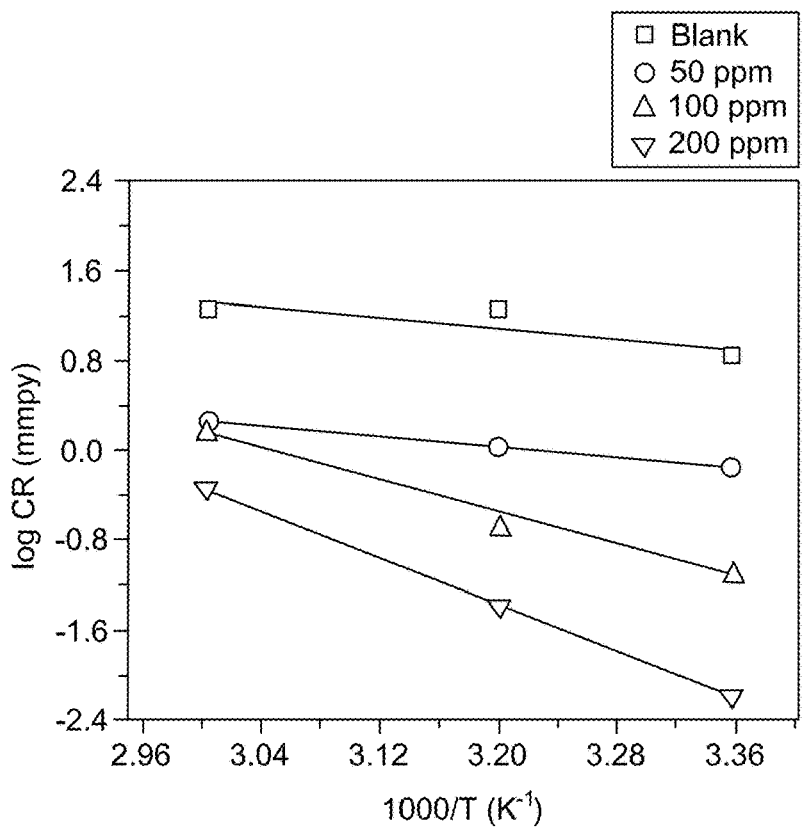
FIG. 28C is an Arrhenius plot of the mild steel corrosion in 1.0 M HCl in the absence (blank) and the presence of 50-200 ppm of SANH hybrid inhibitors, according to certain embodiments of the present disclosure.
Figure 28D:
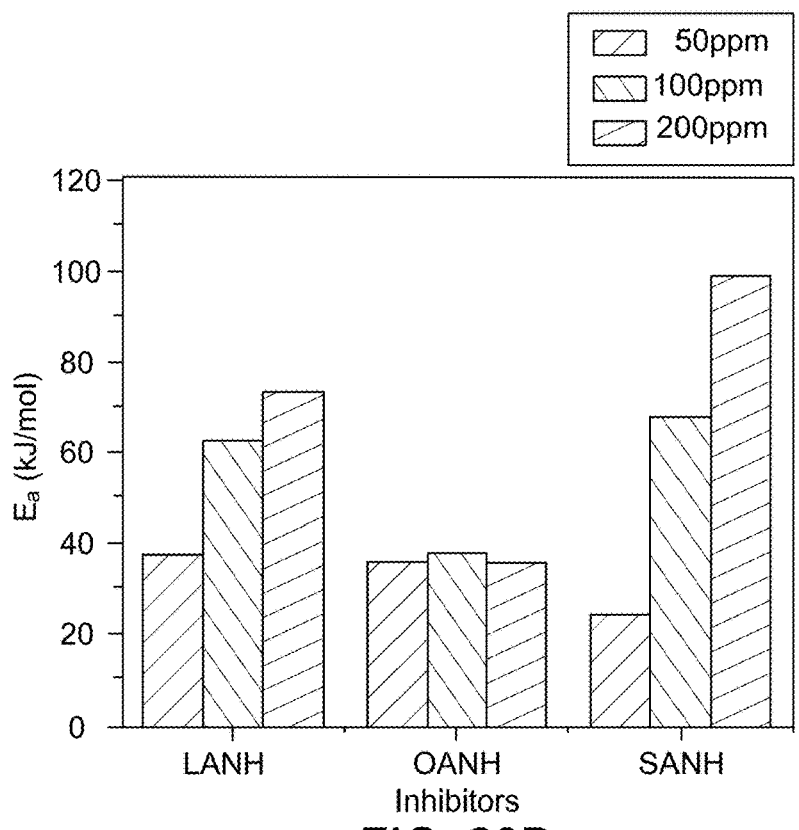
FIG. 28D is a graph depicting calculated activation energies of the LANH, OANH, and SANH hybrid inhibitors, according to certain embodiments of the present disclosure.

FIGS. 28A-28C present Arrhenius plots of the mild steel dissolution in 1.0 M HCl in the absence (blank) and the presence of 50-200 ppm of the hybrid molecules: LANH, OANH, and SANH. The overall corrosion data are summarized in Table 1. It can be observed from the calculated $E_A$ in kJ/mol (FIG. 28D) that for LANH and SANH, the $E_A$ values increased with the increase in concentration. However, the $E_A$ values remained almost constant for OANH. The $E_A$ value in a blank medium was estimated at 22.0 kJ/mol. Based on the $E_A$ values, it can be deduced that the inhibitors were rapidly adsorbed on adjacent sites on the metal surface and the adsorption process was found to be concentration dependent. The addition of the inhibitors resulted in the suppression of the mild steel corrosion through the adsorption and the consequent blocking of the active sites on the surface of the metal.

TABLE 1

Mild steel corrosion data in 1.0M HCl in the absence and presence of LANH, OANH and SANH.

| concentration (ppm) | Medium/Inhibitor | | | | | | | | |
|---|---|---|---|---|---|---|---|---|---|
| | 298K CR (mmpy) | θ | η (%) | 313K CR (mmpy) | θ | η (%) | 333K CR (mmpy) | θ | η (%) |
| Blank | 7.208 | | | 14.05 | | | 18.62 | | |
| LANH | | | | | | | | | |
| 50 | 0.757 | 0.895 | 89.5 | 1.602 | 0.886 | 88.6 | 3.724 | 0.800 | 80.0 |
| 100 | 0.231 | 0.968 | 96.8 | 0.562 | 0.960 | 89.0 | 3.240 | 0.826 | 82.6 |
| 200 | 0.086 | 0.988 | 98.8 | 0.351 | 0.975 | 97.5 | 1.881 | 0.899 | 89.9 |
| OANH | | | | | | | | | |
| 50 | 0.677 | 0.906 | 90.6 | 1.546 | 0.890 | 89.0 | 3.128 | 0.832 | 83.2 |
| 100 | 0.541 | 0.925 | 92.5 | 1.108 | 0.921 | 92.1 | 2.700 | 0.855 | 85.5 |
| 200 | 0.455 | 0.937 | 93.7 | 0.886 | 0.937 | 93.7 | 2.067 | 0.889 | 88.9 |

TABLE 1-continued

Mild steel corrosion data in 1.0M HCl in the absence and presence of LANH, OANH and SANH.

| | Medium/Inhibitor | | | | | | | |
|---|---|---|---|---|---|---|---|---|
| concen-tration (ppm) | 298K CR (mmpy) | θ | η (%) | 313K CR (mmpy) | θ | η (%) | 333K CR (mmpy) | θ | η (%) |
| SANH | | | | | | | | |
| 50 | 0.663 | 0.908 | 90.8 | 1.220 | 0.913 | 91.3 | 1.862 | 0.900 | 90.0 |
| 100 | 0.079 | 0.989 | 98.9 | 0.330 | 0.977 | 97.7 | 1.396 | 0.925 | 92.5 |
| 200 | 0.007 | 0.999 | 99.9 | 0.055 | 0.996 | 99.6 | 0.466 | 0.975 | 97.5 |

Figure 29A:
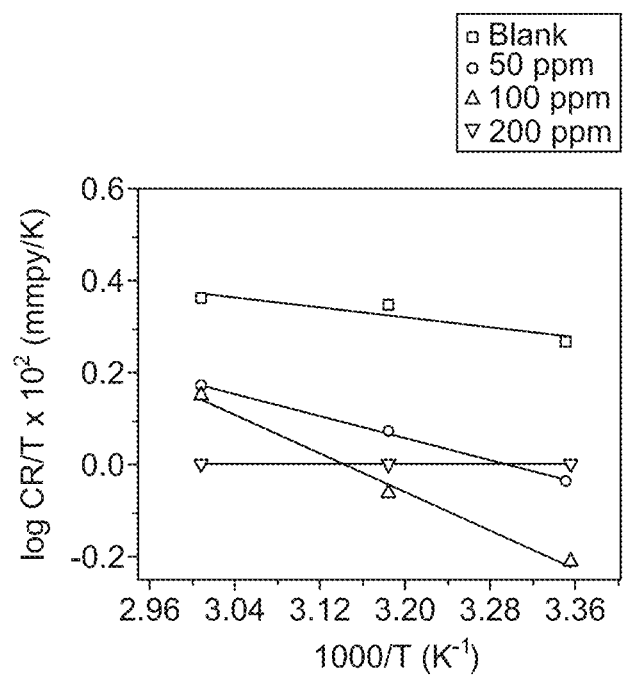
FIG. 29A is a transition state plot of the mild steel corrosion in 1.0 M HCl in the absence and the presence of 50-200 ppm of the LANH, according to certain embodiments of the present disclosure.
Figure 29B:
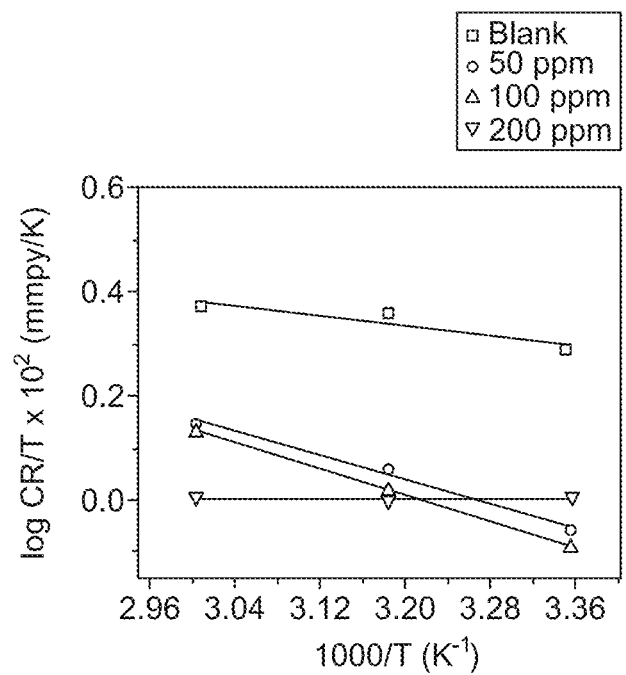
FIG. 29B is a transition state plot of the mild steel corrosion in 1.0 M HCl in the absence and the presence of 50-200 ppm of the OANH, according to certain embodiments of the present disclosure.
Figure 29C:
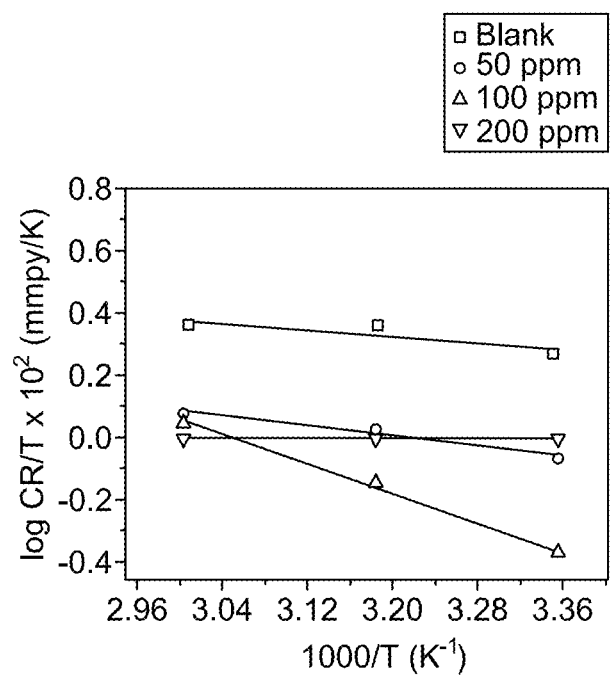
FIG. 29C is a transition state plot of the mild steel corrosion in 1.0 M HCl in the absence and the presence of 50-200 ppm of the SANH, according to certain embodiments of the present disclosure.

The enthalpy ($\Delta H^*$) and the entropy ($\Delta S^*$) changes in the dissolution of the mild steel in 1.0 M HCl in the absence and the presence of the inhibitors derived from the transition state equation (1) are presented in Table 2, and the corresponding plots are presented in FIGS. 29A-29C. The addition of the inhibitors resulted in a significant upsurge in the $E_A$ for all the inhibitors at 50 and 100 ppm suggesting that the metal dissolution is the rate-determining step. This implies that by altering the kinetics of the dissolution, the inhibitors provide protective layers on the metal surface. At higher inhibitor concentration, a sudden drop in the $\Delta H^*$ values were observed, which suggests that the metal-dissolution was significantly suppressed. Hence, the rate limiting step is controlled by the diffusion of the oxidizing species which are being shielded from the metal surface by the adsorbed inhibitors. A steady decrease in the entropy with the increase in concentration up till 100 ppm indicates the decrease in the degree of randomness upon transition from the reactants to the activation complex. At a higher concentration, however, the cooperative effect of the adsorbed inhibitors resulted in higher entropy values with consequent suppression of the rate of corrosion.

TABLE 2

Thermodynamic data of mild steel corrosion in 1.0 M HCl in the absence and presence of LANH, OANH and SANH.

| Medium | Inhibitor concentration (ppm) | $\Delta H^*$ (kJ mol$^{-1}$) | $\Delta S^*$ (J mol$^{-1}$ K$^{-1}$) |
|---|---|---|---|
| Blank | — | 49.62 | −175.2 |
| LANH | 50 | 114.8 | −159.8 |
| | 100 | 200.2 | −134.7 |
| | 200 | 2.384 | −196.8 |
| OANH | 50 | 110.8 | −161.3 |
| | 100 | 118.8 | −159.4 |
| | 200 | 1.135 | −197.2 |
| SANH | 50 | 75.79 | −173.1 |
| | 100 | 223.6 | −129.4 |
| | 200 | 3.373 | −196.6 |

Figure 30A:
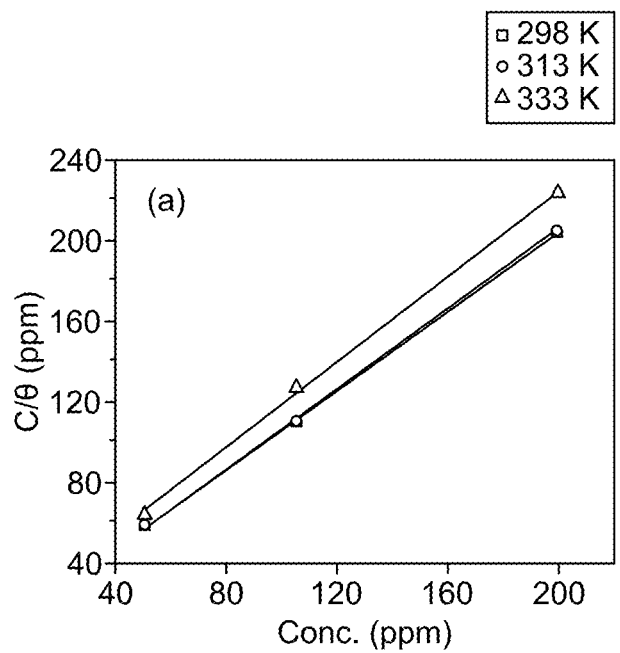
FIG. 30A is a Langmuir adsorption model of the mild steel corrosion in 1.0 M HCl in the absence and the presence of 50-200 ppm of the LANH, according to certain embodiments of the present disclosure.
Figure 30B:
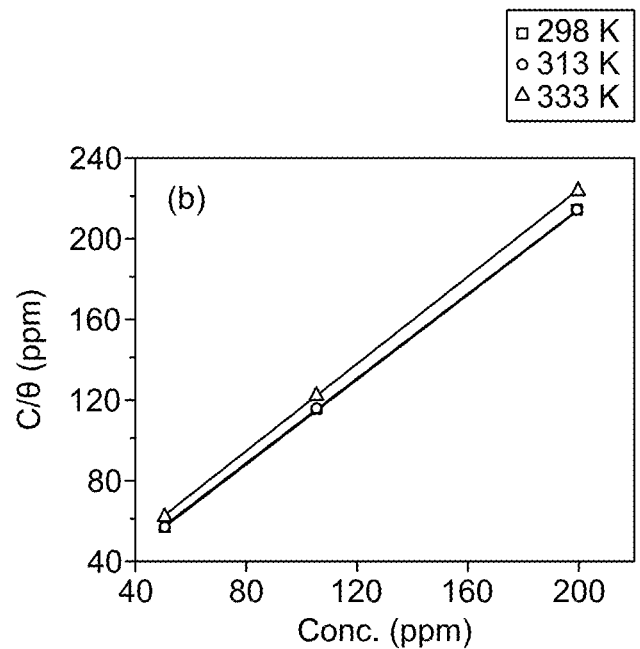
FIG. 30B is a Langmuir adsorption model of the mild steel corrosion in 1.0 M HCl in the absence and the presence of 50-200 ppm of the OANH, according to certain embodiments of the present disclosure.
Figure 30C:
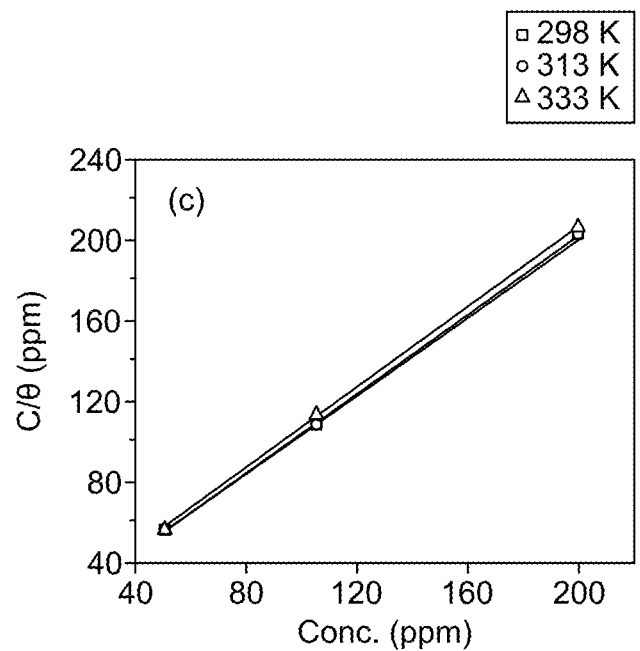
FIG. 30C is a Langmuir adsorption model of the mild steel corrosion in 1.0 M HCl in the absence and the presence of 50-200 ppm of the SANH, according to certain embodiments of the present disclosure.

Weight loss data were fitted into adsorption isotherms in order to characterize the mode of adsorption of the inhibitors. The data fitted well with the Langmuir adsorption model as presented in FIGS. 30A-30C, which suggests that the inhibitors exhibit monolayer adsorption on the metal surface. The corresponding Gibb's free energy of adsorption at 298-333 K presented in Table 3 suggests that the inhibitors exhibit chemisorption characteristics on the mild steel surface.

TABLE 3

Langmuir adsorption data of mild steel corrosion in 1.0 M HCl in the absence and presence of LANH, OANH and SANH.

| Medium | Temperature (K.) | $K_{ads} \times 10^{-2}$ (L mol$^{-1}$) | $\Delta G_{ads}$ (kJ mol$^{-1}$) |
|---|---|---|---|
| LANH | 298 | 15.86 | −38.79 |
| | 313 | 16.8 | −38.65 |
| | 333 | 8.476 | −40.34 |
| OANH | 298 | 39.71 | −36.52 |
| | 313 | 26.7 | −37.5 |
| | 333 | 16.42 | −38.7 |
| SANH | 298 | 18.11 | −38.46 |
| | 313 | 18.05 | −38.47 |
| | 333 | 14.19 | −39.07 |

Surface Characterization
SEM Images

Figure 32A:
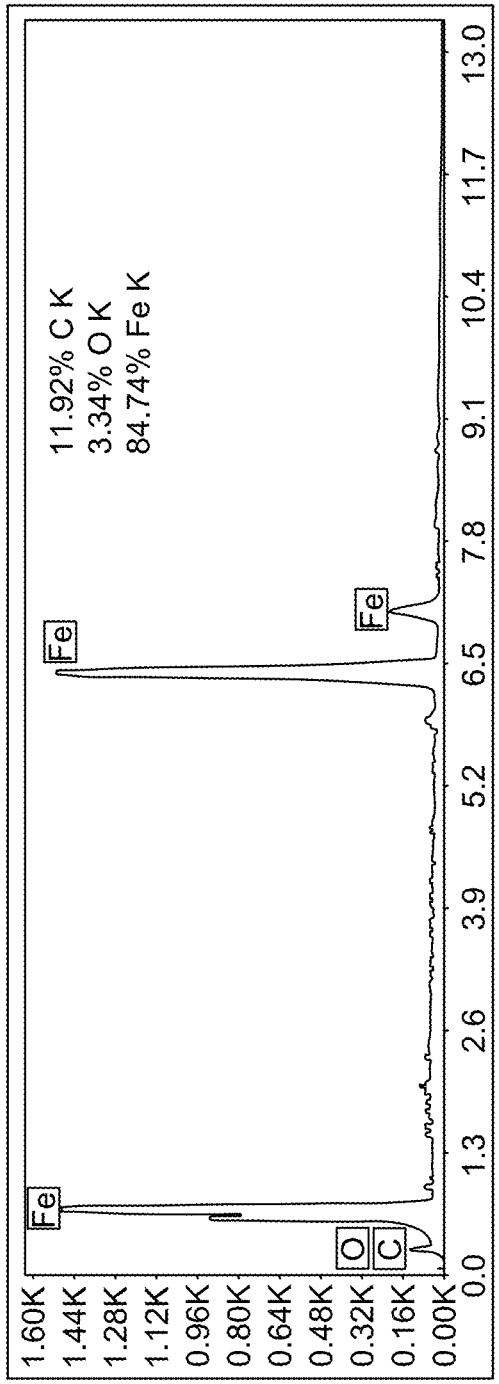
FIG. 32A is an Energy dispersive X-ray spectroscopy (EDS) spectrum of the mild steel specimen immersed in the absence of inhibitors (blank), according to certain embodiments of the present disclosure.
Figure 32B:
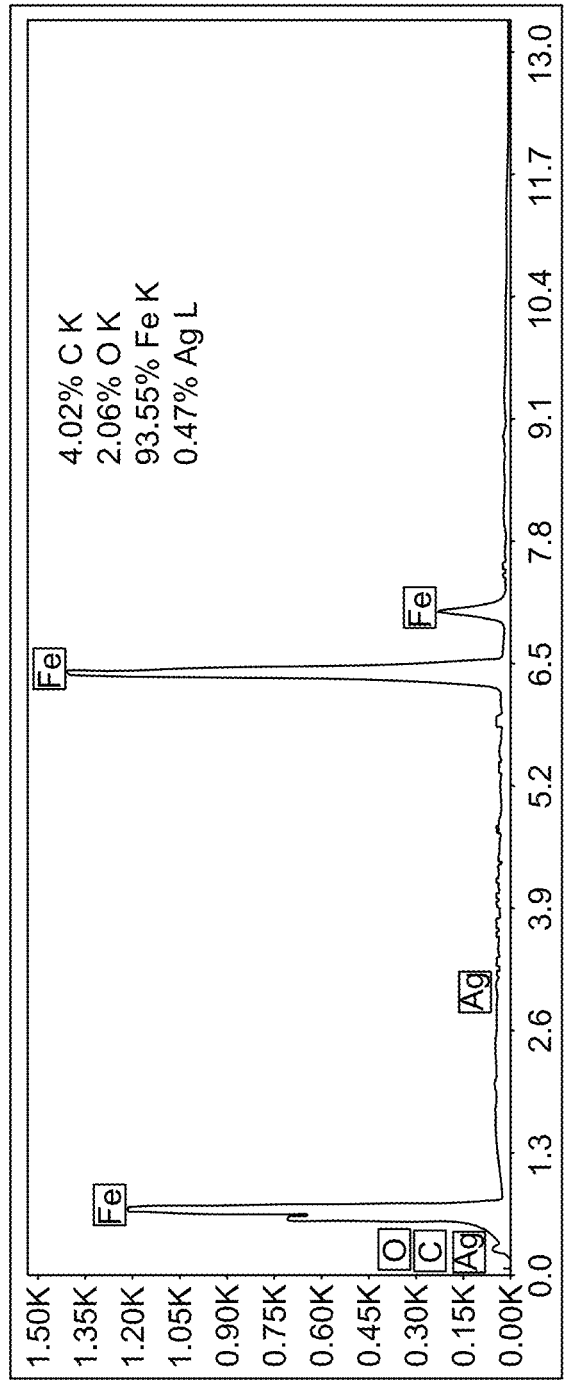
FIG. 32B is an EDS spectrum of the mild steel specimen immersed with a presence of the SANH, according to certain embodiments of the present disclosure.
Figure 32C:
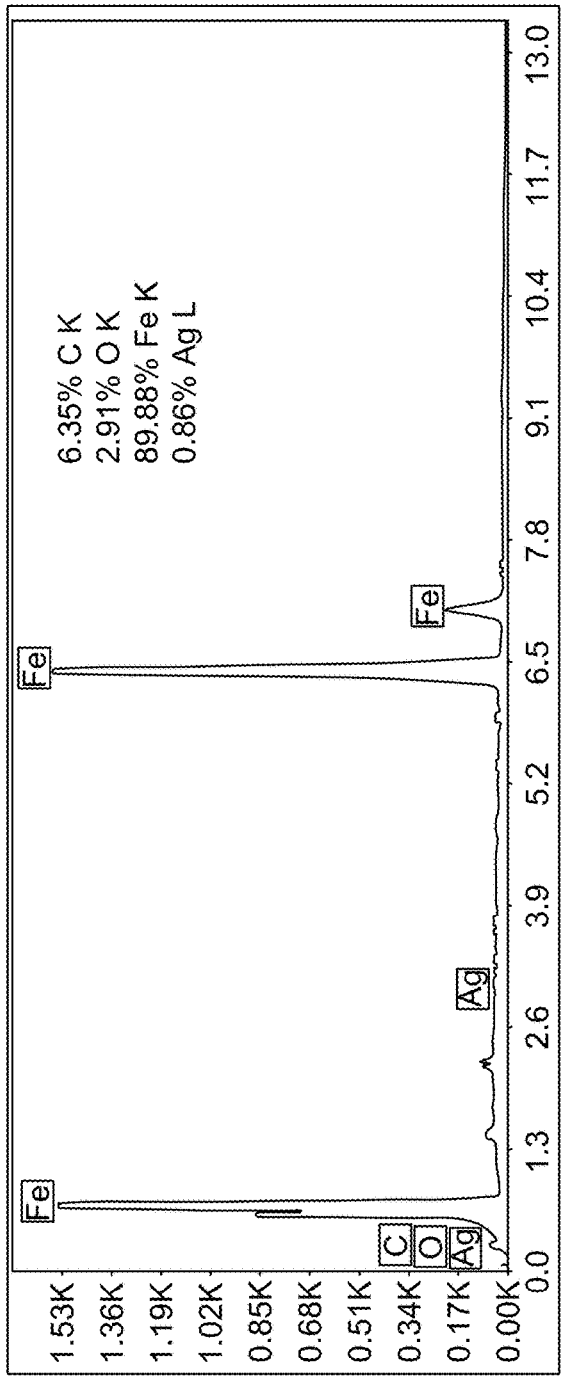
FIG. 32C is an EDS spectrum of the mild steel specimen immersed with a presence of the OANH, according to certain embodiments of the present disclosure.
Figure 32D:
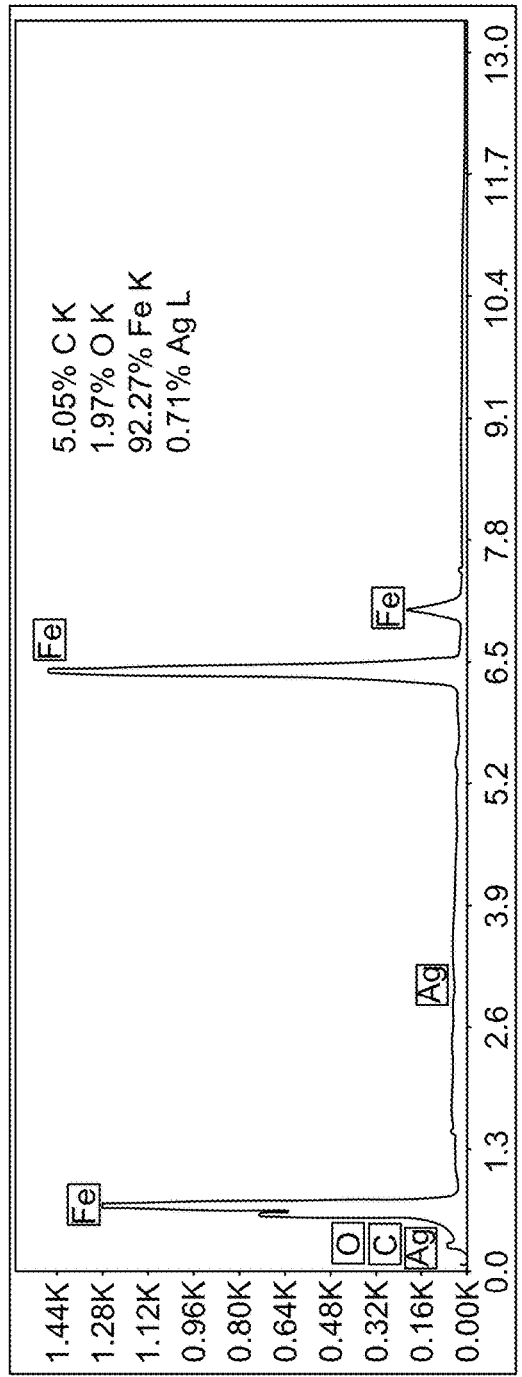
FIG. 32D is an EDS spectrum of the mild steel specimen immersed with a presence of the LANH, according to certain embodiments of the present disclosure.
Figure 33A:
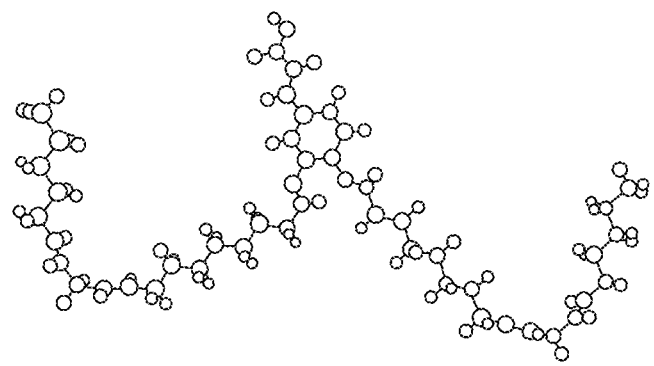
FIG. 33A is a schematic structure depicting a geometry of EPAA, according to certain embodiments of the present disclosure.
Figure 33B:
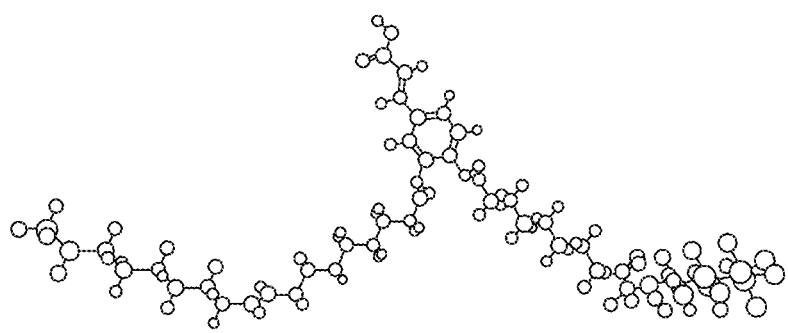
FIG. 33B is a schematic structure depicting a geometry of OPAA, according to certain embodiments of the present disclosure.
Figure 33C:
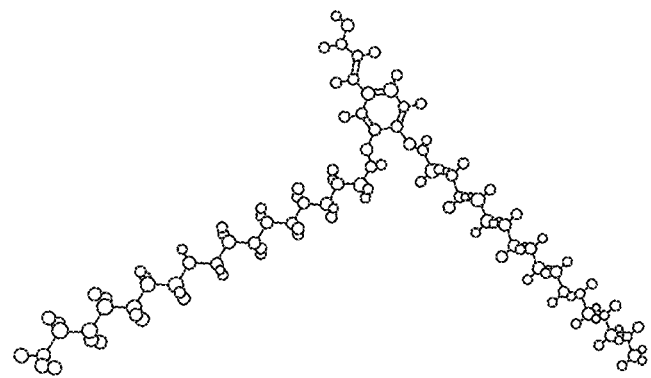
FIG. 33C is a schematic structure depicting a geometry of SPAA, according to certain embodiments of the present disclosure.
Figure 33D:
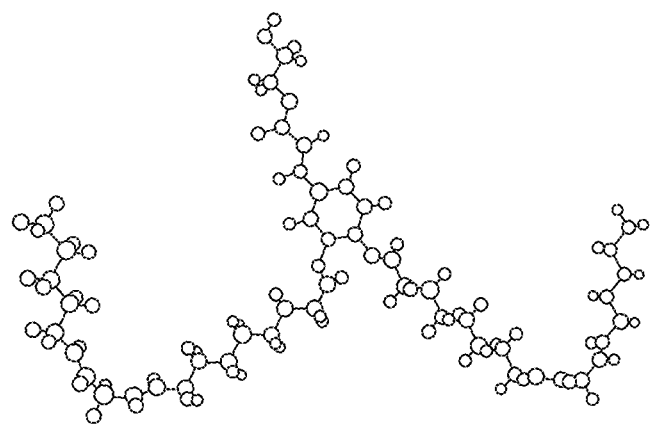
FIG. 33D is a schematic structure depicting a geometry of HPDE, according to certain embodiments of the present disclosure.
Figure 33E:
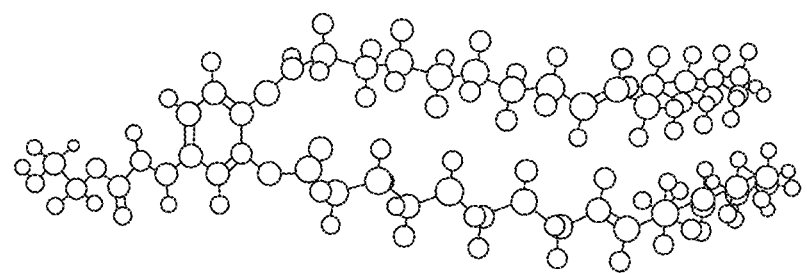
FIG. 33E is a schematic structure depicting a geometry of HDPO, according to certain embodiments of the present disclosure.
Figure 33F:
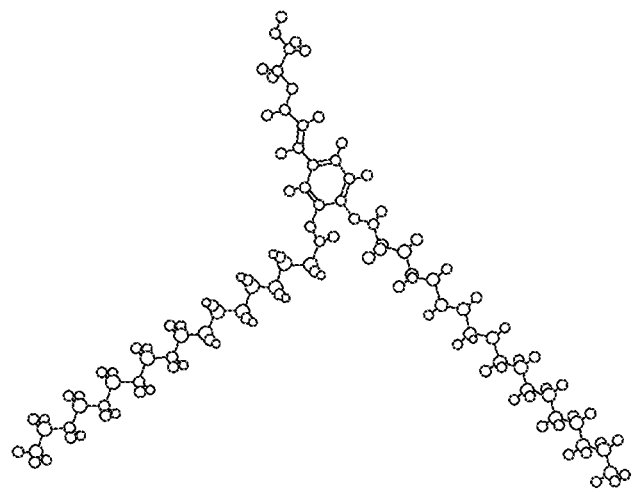
FIG. 33F is a schematic structure depicting a geometry of HDPS, according to certain embodiments of the present disclosure.
Figure 33G:
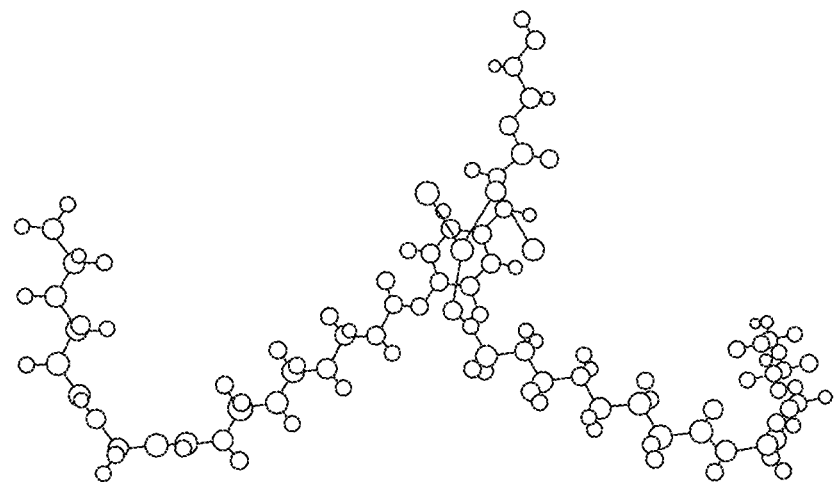
FIG. 33G is a schematic structure depicting a geometry of LANH, according to certain embodiments of the present disclosure.
Figure 33H:
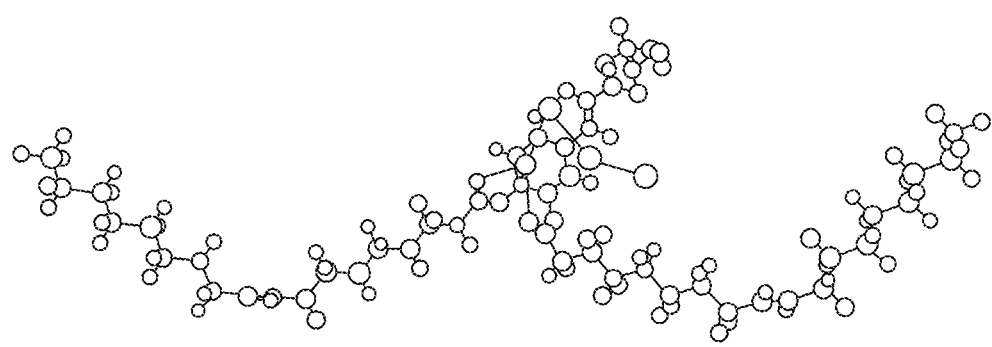
FIG. 33H is a schematic structure depicting a geometry of OANH, according to certain embodiments of the present disclosure.
Figure 33I:
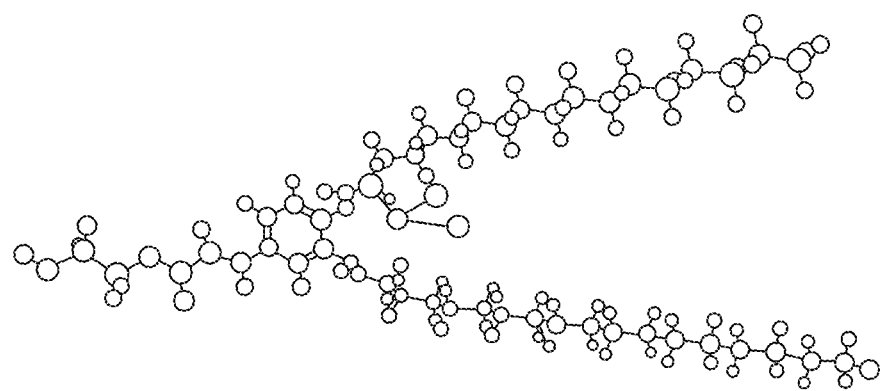
FIG. 33I is a schematic structure depicting a geometry of SANH, according to certain embodiments of the present disclosure.

The surface morphology was recorded by SEM for the mild steel samples immersed in 1.0 M HCl for 96 hours in the absence and presence of inhibitors, SANH, OANH, and LANH. The results of this study are shown in FIGS. 31A-31D, where the immersed mild steel sample in the absence of inhibitor (blank) (FIG. 31A) was exposed to severe corrosion. The results indicate that the appearance of cavities and pits on the corresponding surface compared to others (FIGS. 31B-31D) that were subjected to slight erosion, and this indicates the adsorption of the inhibitor molecules on the surface of the mild steel to form a protective layer against corrosion. In the metal surface covered with SANH and LANH inhibitors, the surface damage and burrs were found to be less due to high inhibition efficiency, higher than that of OANH where there were cavities and burrs on its surface. The results of the surface micrograph were found to be consistent with studies on weight loss. The EDS spectrum FIGS. 32A-32D indicate that the submerged sample in the absence of the inhibitors (blank), consists of different percentages of elements such as Fe, which is the main component of the present sample, and the corresponding weight percentage is about 84.74%; the sample also consists of carbon and oxygen with a weight ratio of 11.92 and 3.34%, respectively. For the mild steel sample that contains the inhibitor NHSA (FIG. 32B) the main component is also Fe, but the weight percentage of the mild steel sample is greater equal to 93.55%, and the mild steel sample consists of the elements C, O, and Ag in the percentages 4.02, 2.06 and 0.47%, respectively. FIG. 32C shows the EDS spectrum of the sample containing OANH. The sample consists of the elements C, O, Ag, and Fe, where the weight percentage of iron is 89.88%. Also, a specimen immersed with presence of inhibitor LANH (FIG. 32D) contained iron in a weight percentage of 92.27%. The EDS spectra show the weight percentages of the mild steel specimens and show the success of the inhibitors in reducing the corrosion rate compared to the blank.

Computational Results

Figure 34A:
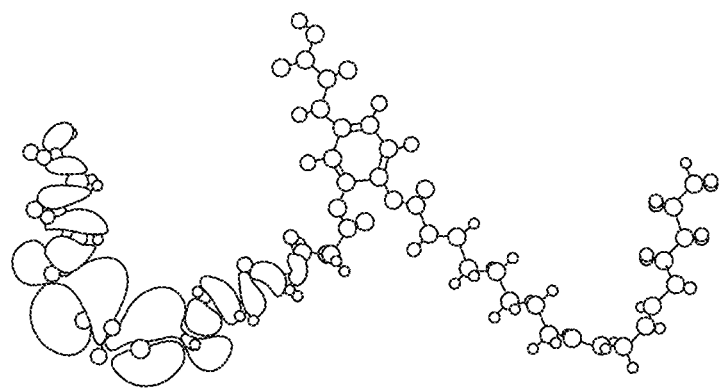
FIG. 34A is a schematic structure depicting a HOMO frontier molecular orbital distribution of EPAA, according to certain embodiments of the present disclosure.
Figure 34B:
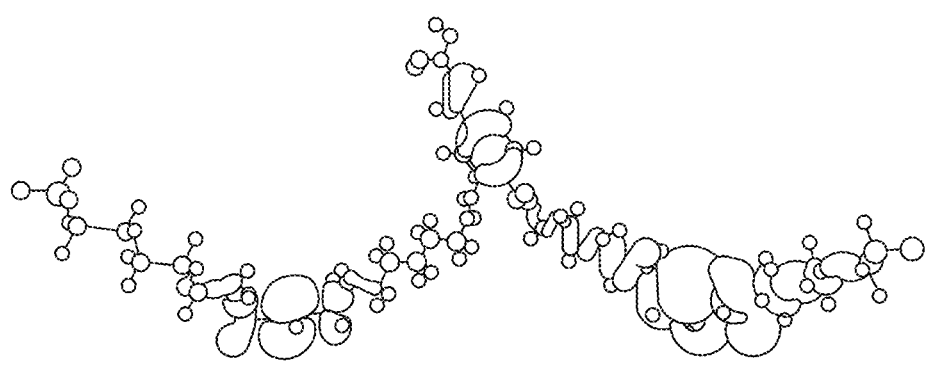
FIG. 34B is a schematic structure depicting a HOMO frontier molecular orbital distribution of OPAA, according to certain embodiments of the present disclosure.
Figure 34C:
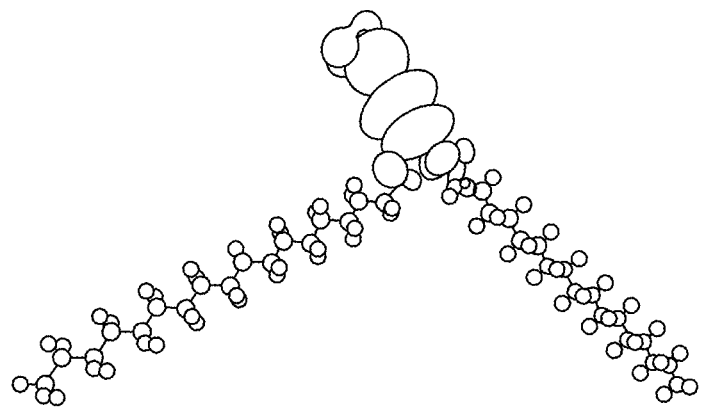
FIG. 34C is a schematic structure depicting a HOMO frontier molecular orbital distribution of SPAA, according to certain embodiments of the present disclosure.
Figure 34D:
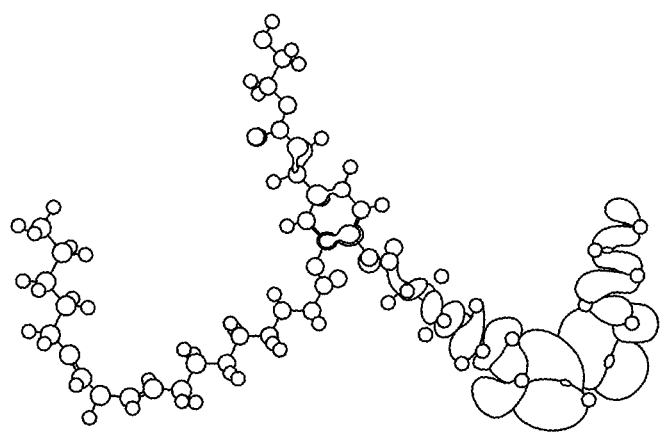
FIG. 34D is a schematic structure depicting a HOMO frontier molecular orbital distribution of HDPE, according to certain embodiments of the present disclosure.
Figure 34E:
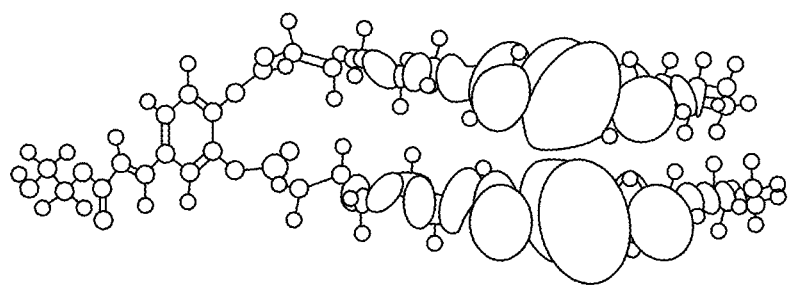
FIG. 34E is a schematic structure depicting a HOMO frontier molecular orbital distribution of HDPO, according to certain embodiments of the present disclosure.
Figure 34F:
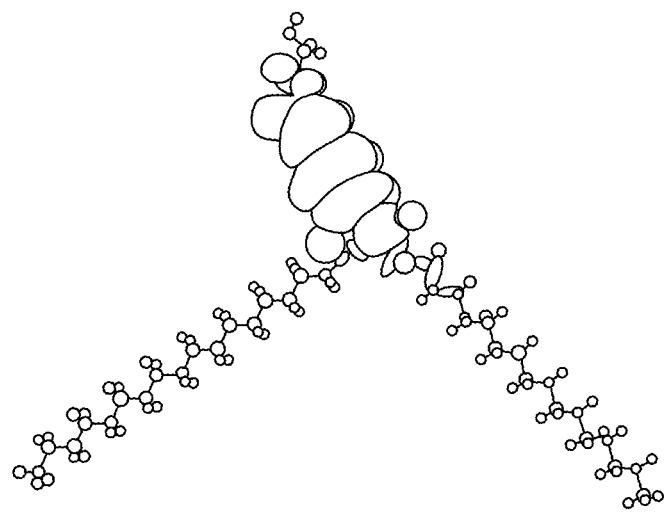
FIG. 34F is a schematic structure depicting a HOMO frontier molecular orbital distribution of HDPS, according to certain embodiments of the present disclosure.
Figure 34G:
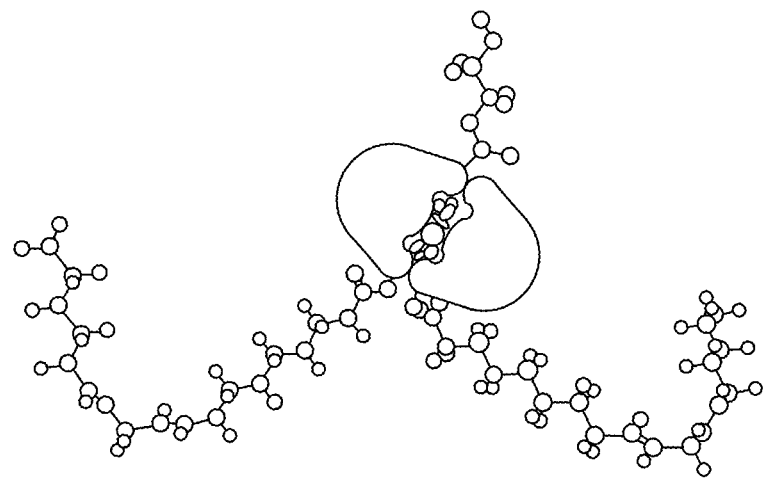
FIG. 34G is a schematic structure depicting a HOMO frontier molecular orbital distribution of LANH, according to certain embodiments of the present disclosure.
Figure 34H:
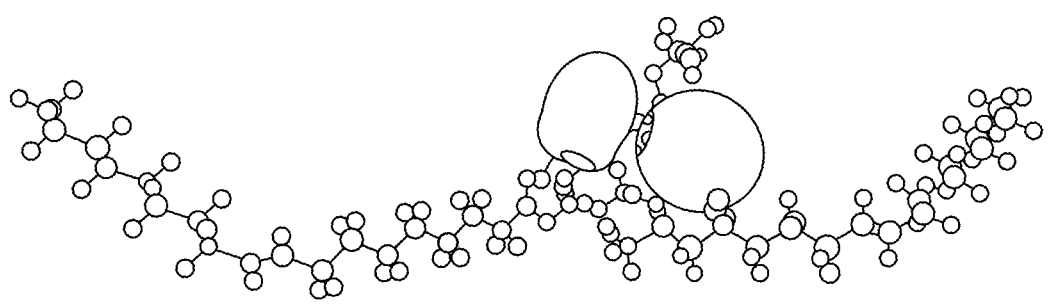
FIG. 34H is a schematic structure depicting a HOMO frontier molecular orbital distribution of OANH, according to certain embodiments of the present disclosure.
Figure 34I:
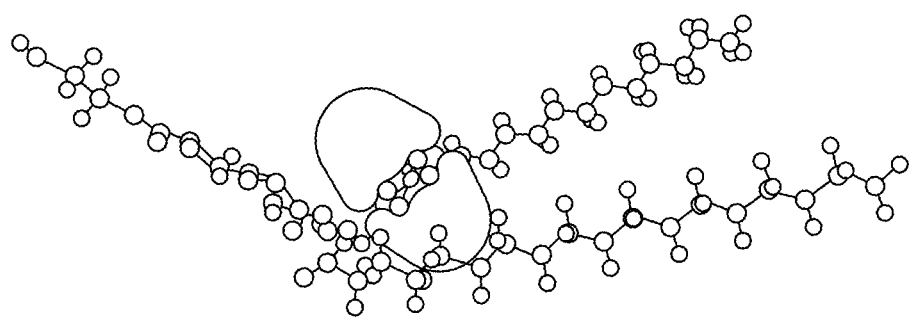
FIG. 34I is a schematic structure depicting a HOMO frontier molecular orbital distribution of SANH, according to certain embodiments of the present disclosure.
Figure 34J:
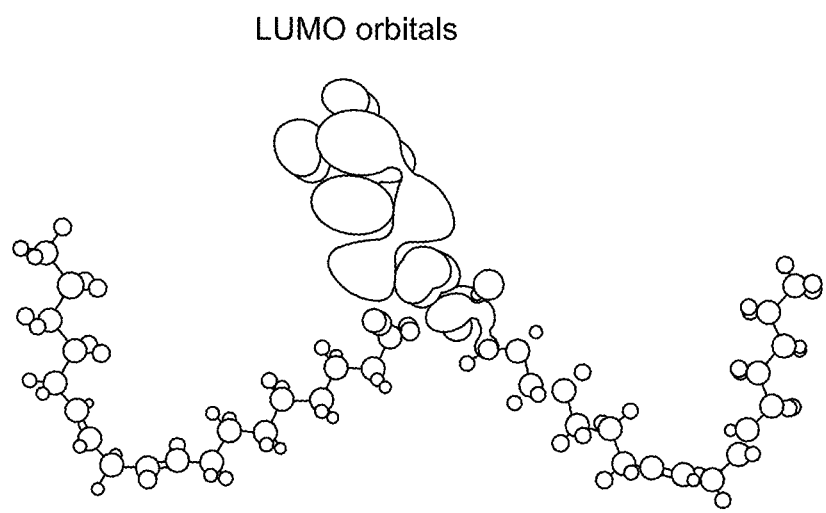
FIG. 34J is a schematic structure depicting a LUPO frontier molecular orbital distribution of EPAA, according to certain embodiments of the present disclosure.
Figure 34K:
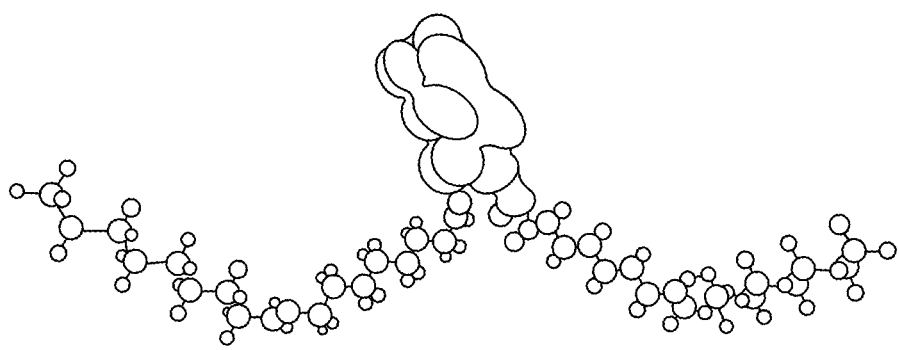
FIG. 34K is a schematic structure depicting a LUPO frontier molecular orbital distribution of OPAA, according to certain embodiments of the present disclosure.
Figure 34L:
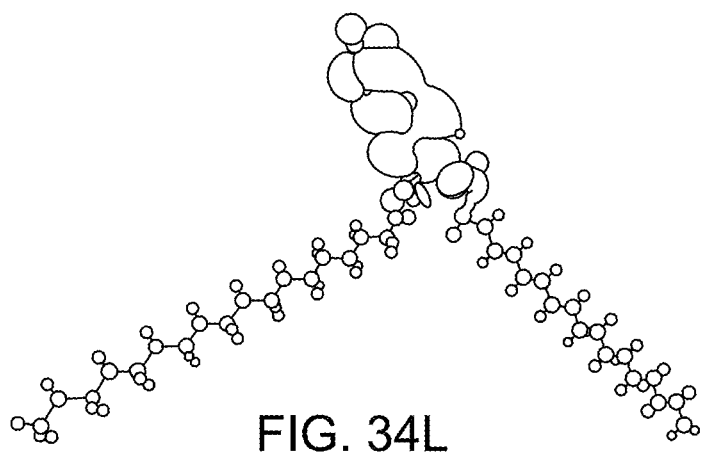
FIG. 34L is a schematic structure depicting a LUPO frontier molecular orbital distribution of SPAA, according to certain embodiments of the present disclosure.
Figure 34M:
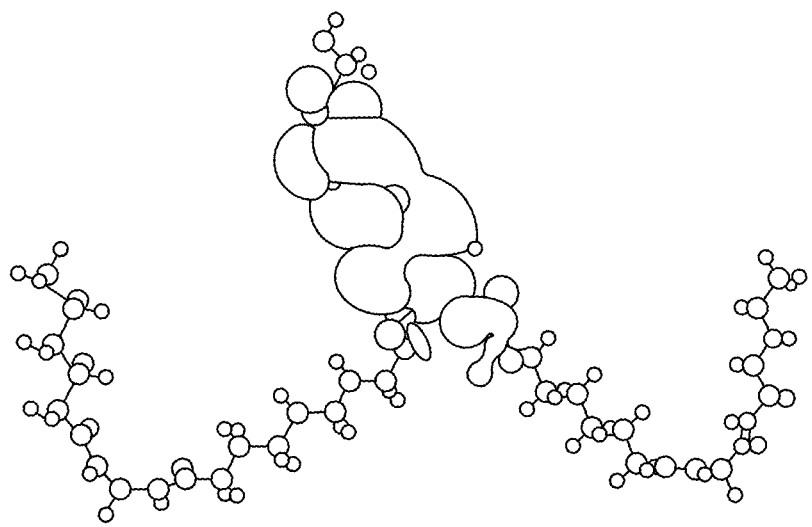
FIG. 34M is a schematic structure depicting a LUPO frontier molecular orbital distribution of HDPE, according to certain embodiments of the present disclosure.
Figure 34N:
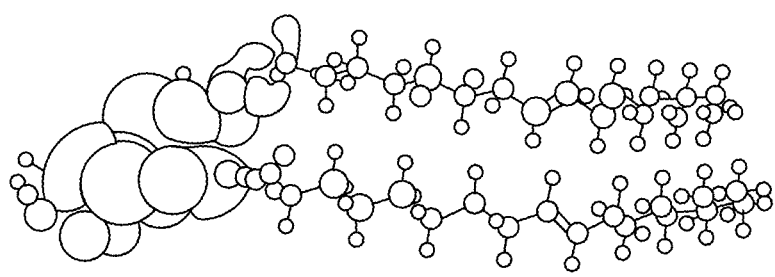
FIG. 34N is a schematic structure depicting a LUPO frontier molecular orbital distribution of HDPO, according to certain embodiments of the present disclosure.
Figure 34O:
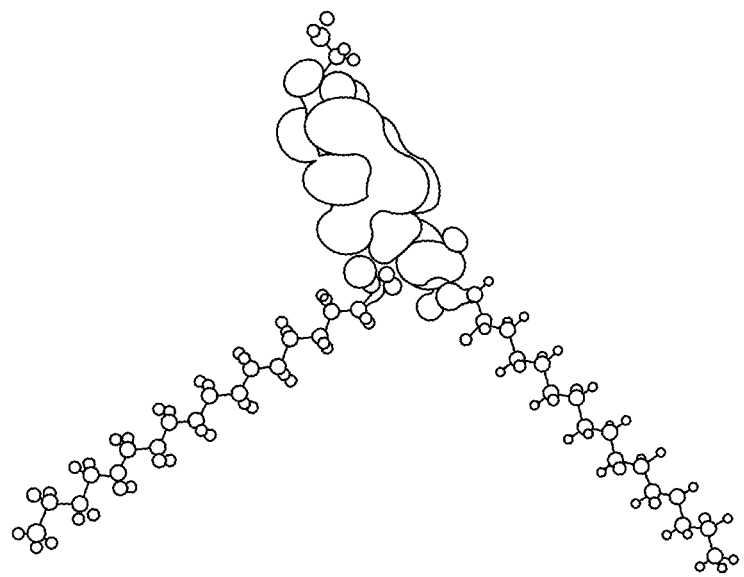
FIG. 34O is a schematic structure depicting a LUPO frontier molecular orbital distribution of HDPS, according to certain embodiments of the present disclosure.
Figure 34P:
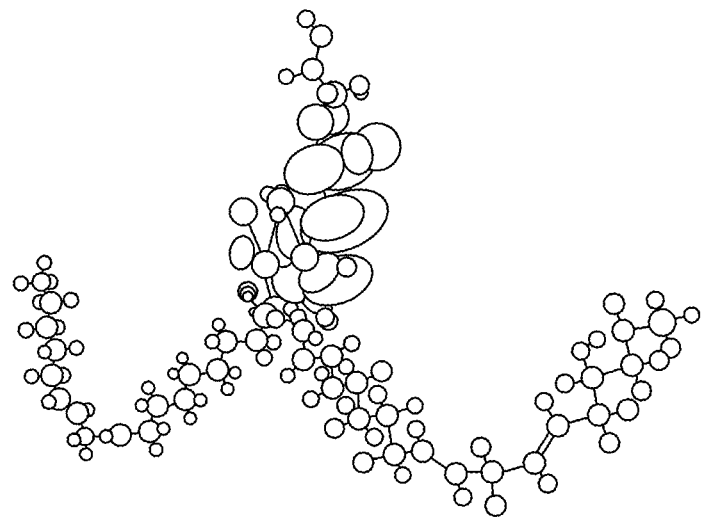
FIG. 34P is a schematic structure depicting a LUPO frontier molecular orbital distribution of LANH, according to certain embodiments of the present disclosure.
Figure 34Q:
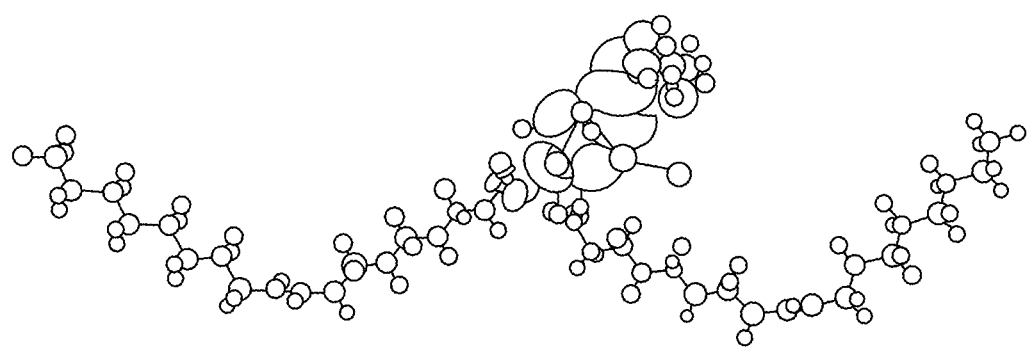
FIG. 34Q is a schematic structure depicting a LUPO frontier molecular orbital distribution of OANH, according to certain embodiments of the present disclosure.
Figure 34R:
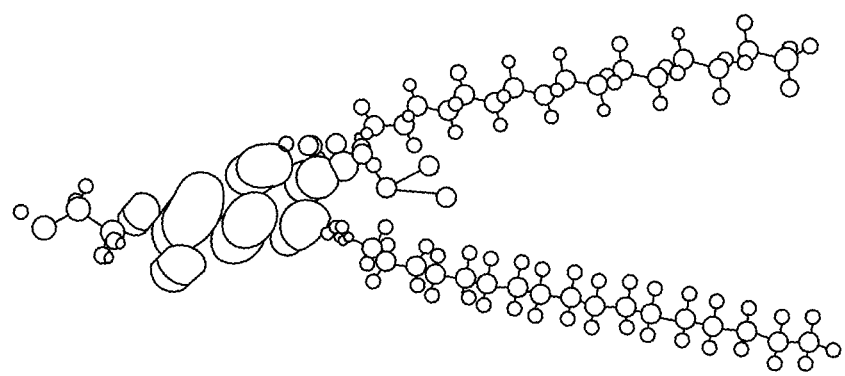
FIG. 34R is a schematic structure depicting a LUPO frontier molecular orbital distribution of SANH, according to certain embodiments of the present disclosure.
Figure 35A:
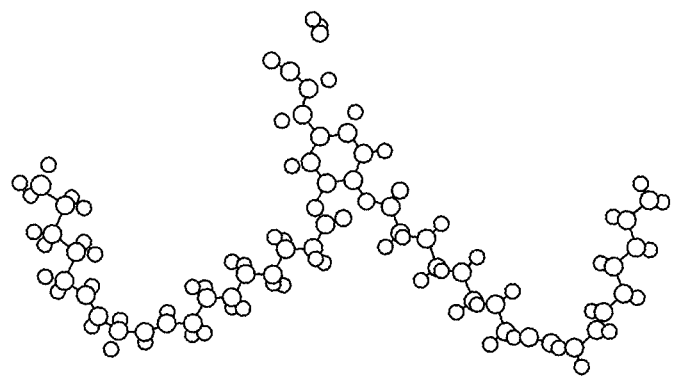
FIG. 35A is a schematic structure depicting a geometry of a protonated form of EPAA, according to certain embodiments of the present disclosure.
Figure 35B:
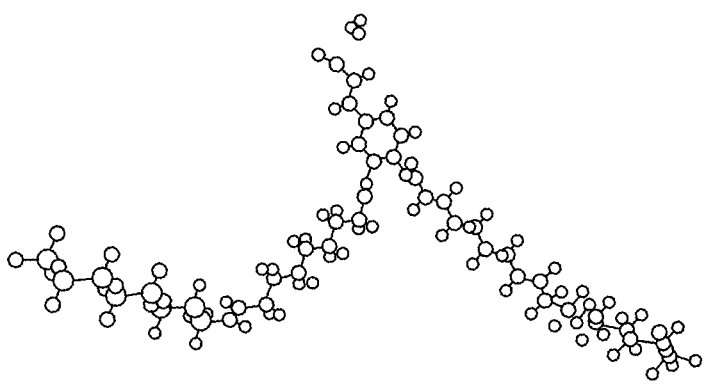
FIG. 35B is a schematic structure depicting a geometry of a protonated form of OPAA, according to certain embodiments of the present disclosure.
Figure 35C:
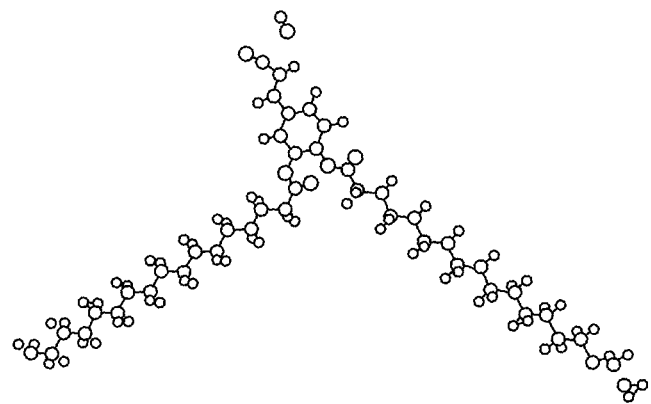
FIG. 35C is a schematic structure depicting a geometry of a protonated form of SPAA, according to certain embodiments of the present disclosure.
Figure 35D:
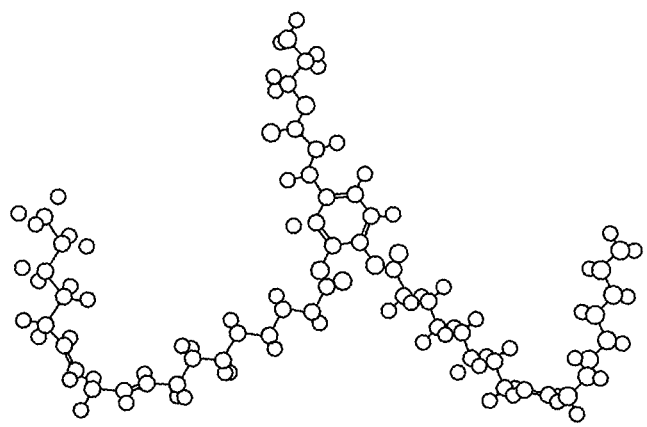
FIG. 35D is a schematic structure depicting a geometry of a protonated form of HDPE, according to certain embodiments of the present disclosure.
Figure 35E:
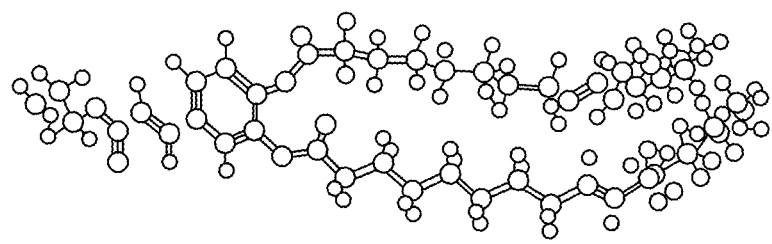
FIG. 35E is a schematic structure depicting a geometry of a protonated form of HDPO, according to certain embodiments of the present disclosure.
Figure 35F:
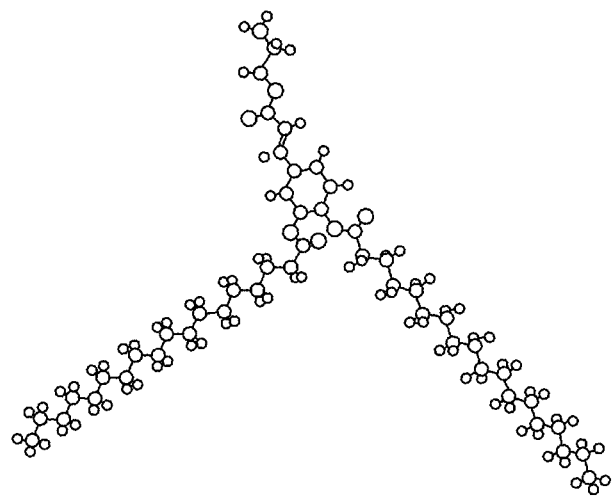
FIG. 35F is a schematic structure depicting a geometry of a protonated form of HDPO, according to certain embodiments of the present disclosure.
Figure 35G:
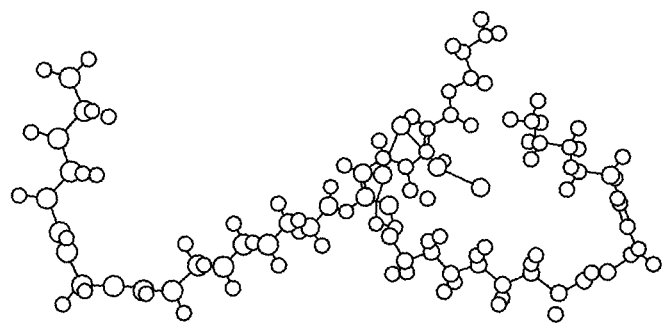
FIG. 35G is a schematic structure depicting a geometry of a protonated form of LANH, according to certain embodiments of the present disclosure.
Figure 35H:
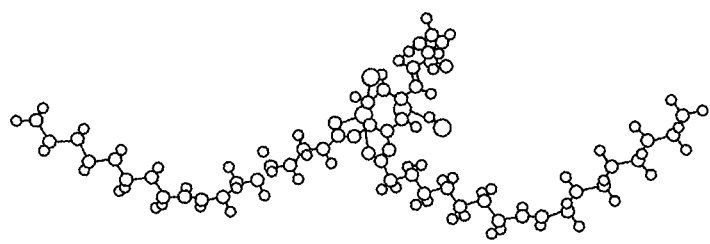
FIG. 35H is a schematic structure depicting a geometry of a protonated form of OANH, according to certain embodiments of the present disclosure.
Figure 35I:
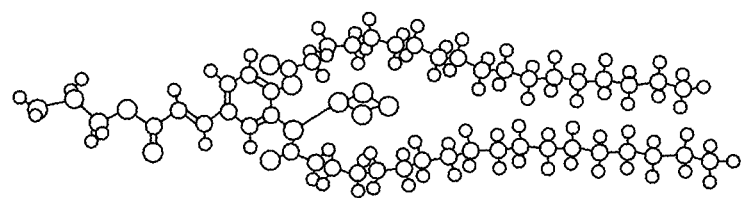
FIG. 35I is a schematic structure depicting a geometry of a protonated form of SANH, according to certain embodiments of the present disclosure.
Figure 36A:
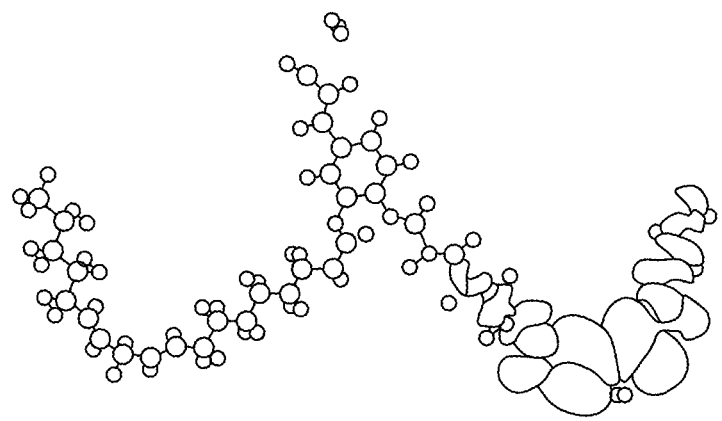
FIG. 36A is a schematic structure depicting a HOMO frontier molecular orbital distributions of the protonated form of EPAA, according to certain embodiments of the present disclosure.
Figure 36B:
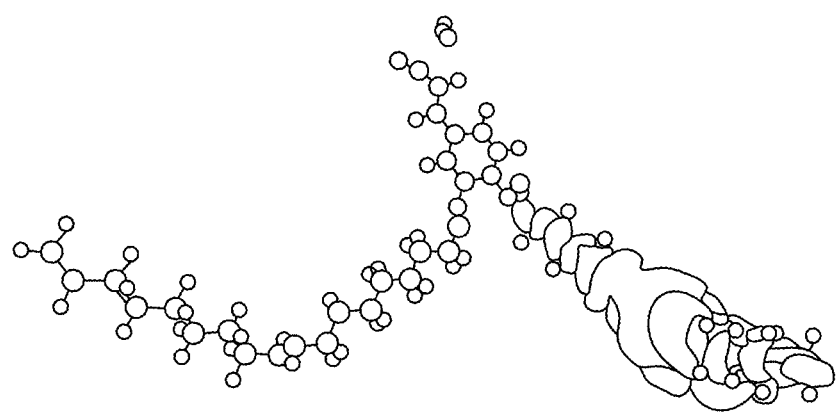
FIG. 36B is a schematic structure depicting a HOMO frontier molecular orbital distributions of the protonated form of OPAA, according to certain embodiments of the present disclosure.
Figure 36C:
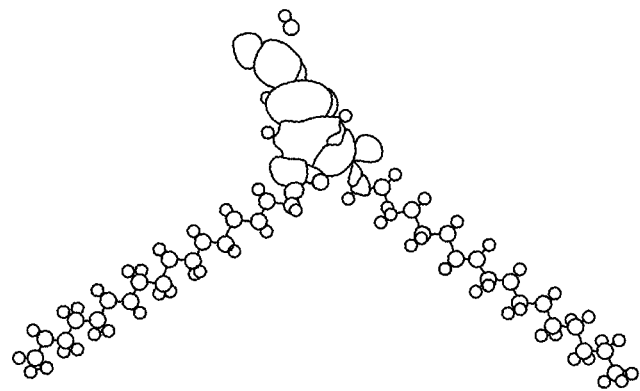
FIG. 36C is a schematic structure depicting a HOMO frontier molecular orbital distributions of the protonated form of SPAA, according to certain embodiments of the present disclosure.
Figure 36D:
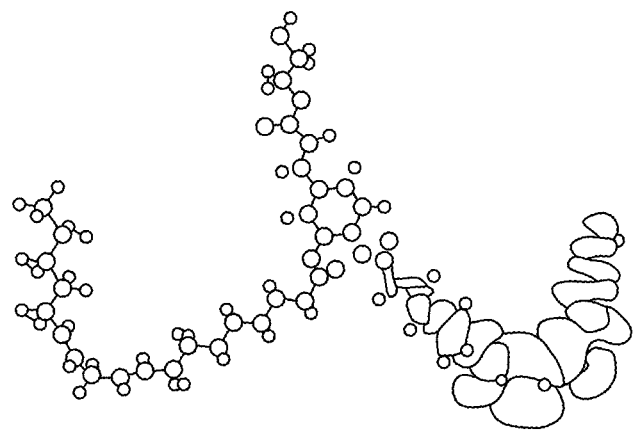
FIG. 36D is a schematic structure depicting a HOMO frontier molecular orbital distributions of the protonated form of HDPE, according to certain embodiments of the present disclosure.
Figure 36E:
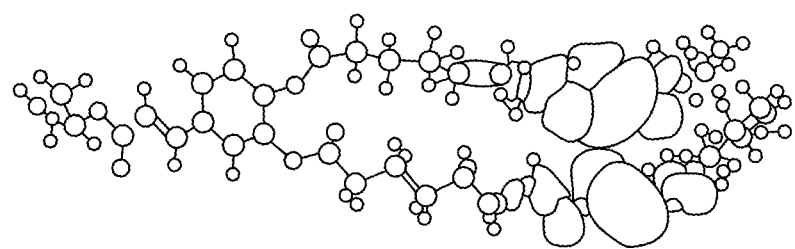
FIG. 36E is a schematic structure depicting a HOMO frontier molecular orbital distributions of the protonated form of HDPO, according to certain embodiments of the present disclosure.
Figure 36F:
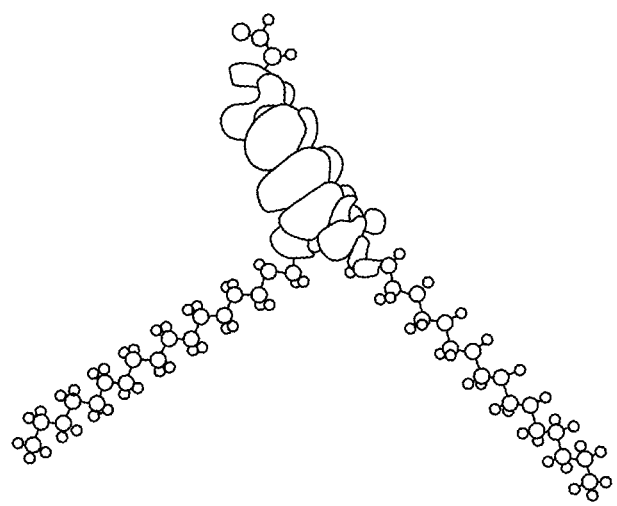
FIG. 36F is a schematic structure depicting a HOMO frontier molecular orbital distributions of the protonated form of HDPS, according to certain embodiments of the present disclosure.
Figure 36G:
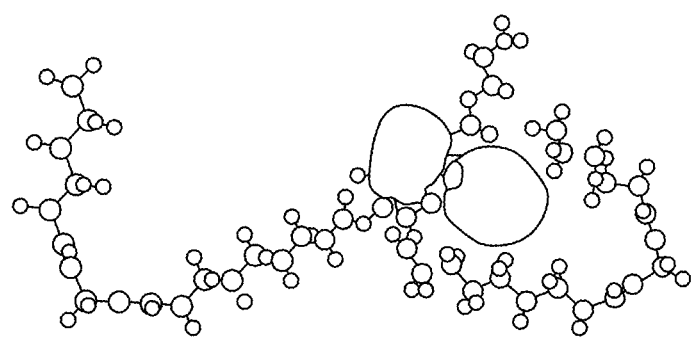
FIG. 36G is a schematic structure depicting a HOMO frontier molecular orbital distributions of the protonated form of LANH, according to certain embodiments of the present disclosure.
Figure 36H:
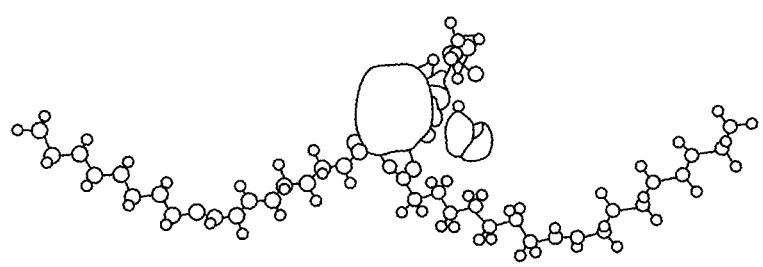
FIG. 36H is a schematic structure depicting a HOMO frontier molecular orbital distributions of the protonated form of OANH, according to certain embodiments of the present disclosure.
Figure 36I:
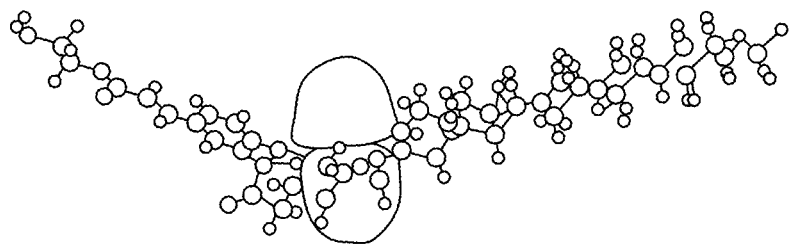
FIG. 36I is a schematic structure depicting a HOMO frontier molecular orbital distributions of the protonated form of SANH, according to certain embodiments of the present disclosure.
Figure 36J:
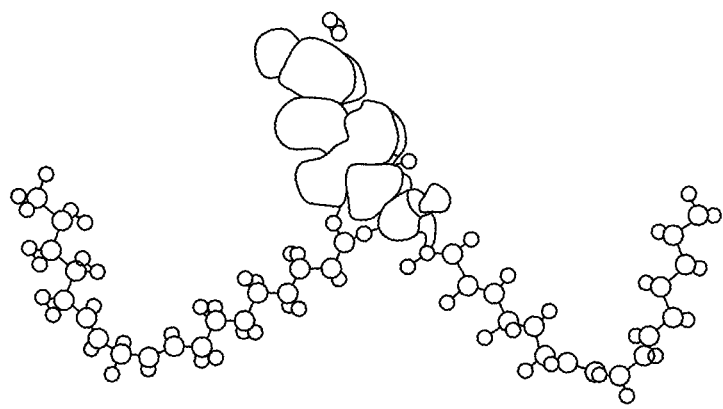
FIG. 36J is a schematic structure depicting a LUMO frontier molecular orbital distributions of the protonated form of EPAA, according to certain embodiments of the present disclosure.
Figure 36K:
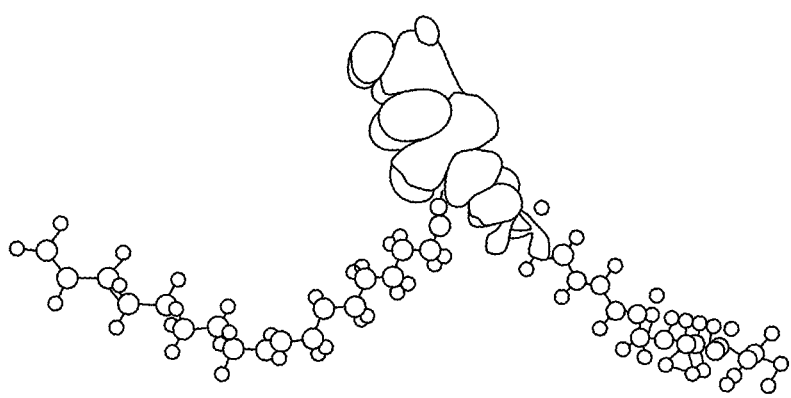
FIG. 36K is a schematic structure depicting a LUMO frontier molecular orbital distributions of the protonated form of OPAA, according to certain embodiments of the present disclosure.
Figure 36L:
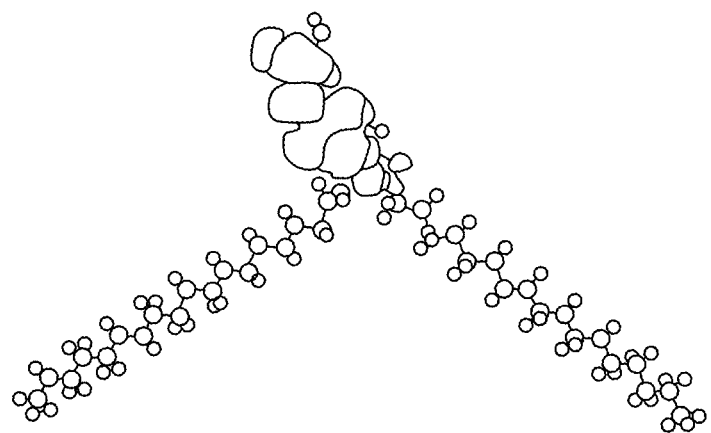
FIG. 36L is a schematic structure depicting a LUMO frontier molecular orbital distributions of the protonated form of SPAA, according to certain embodiments of the present disclosure.
Figure 36M:
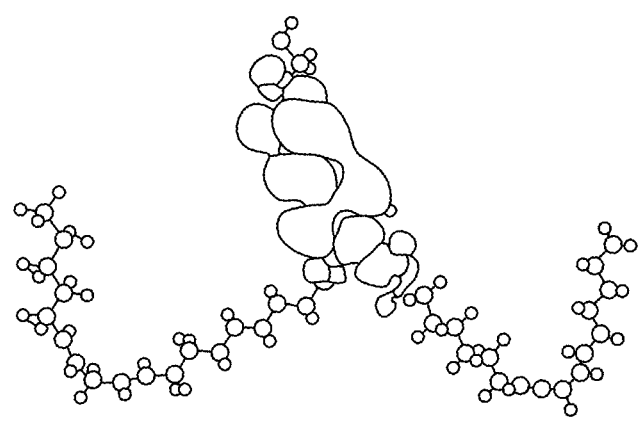
FIG. 36M is a schematic structure depicting a LUMO frontier molecular orbital distributions of the protonated form of HDPE, according to certain embodiments of the present disclosure.
Figure 36N:
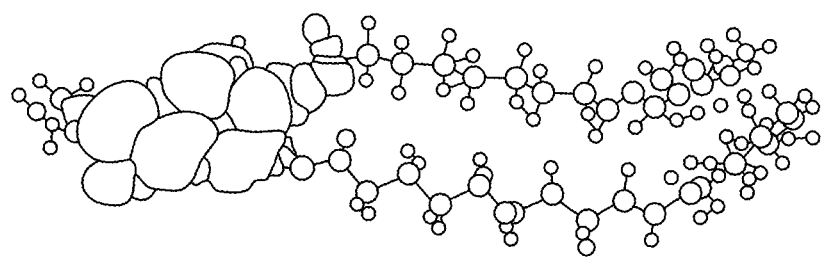
FIG. 36N is a schematic structure depicting a LUMO frontier molecular orbital distributions of the protonated form of HDPO, according to certain embodiments of the present disclosure.
Figure 36O:
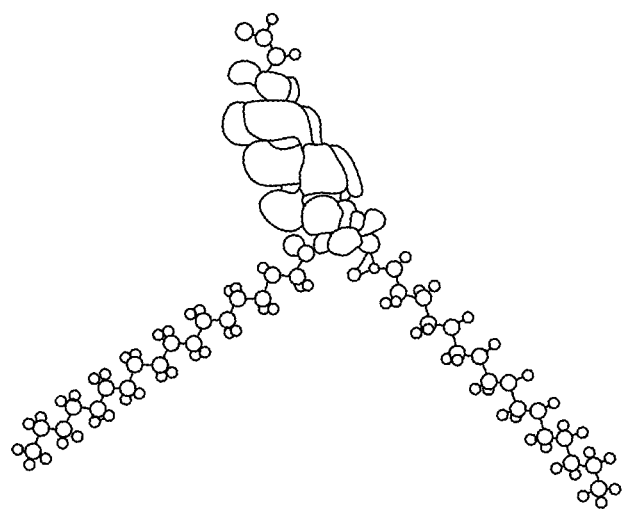
FIG. 36O is a schematic structure depicting a LUMO frontier molecular orbital distributions of the protonated form of HDPS, according to certain embodiments of the present disclosure.
Figure 36P:
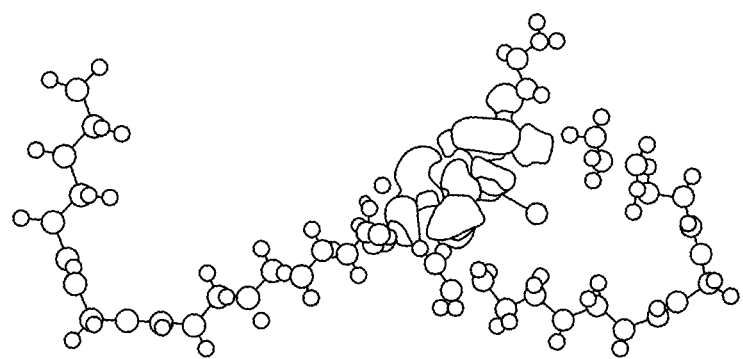
FIG. 36P is a schematic structure depicting a HOMO frontier molecular orbital distributions of the protonated form of LANH, according to certain embodiments of the present disclosure.
Figure 36Q:
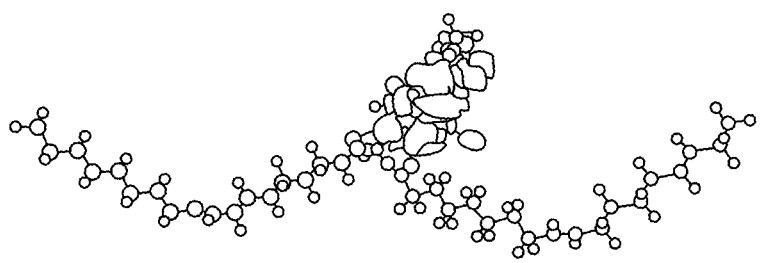
FIG. 36Q is a schematic structure depicting a LUMO frontier molecular orbital distributions of the protonated form of OANH, according to certain embodiments of the present disclosure.
Figure 36R:
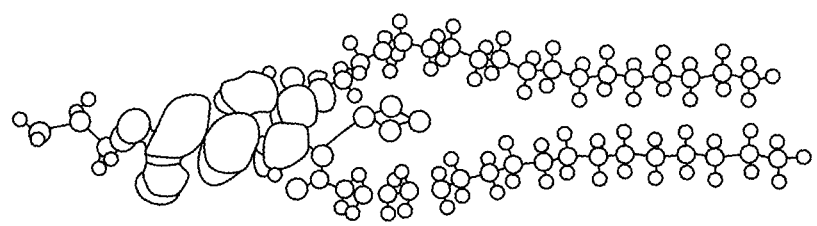
FIG. 36R is a schematic structure depicting a LUMO frontier molecular orbital distributions of the protonated form of SANH, according to certain embodiments of the present disclosure.

Geometries of the inhibitors, EPAA, OPAA, SPAA, HPDE, HPDO, HPDS, LANH, OANH, and SANH representing the lowest energy conformations at the B3LYP/6-311G** and the lanl2dz levels of theory are depicted in FIGS. 33A-33I. Corresponding frontier molecular orbital distributions are shown in FIGS. 34A-34R (FIGS. 34A-34I and FIGS. 34J-34R correspond to HOMO and LUMO orbitals, respectively). HOMO was distributed along both aliphatic and the aromatic components of the inhibitors except in the hybrid molecules whose HOMO orbitals are localized on the $Ag_4$ cluster (FIG. 34G and FIG. 34I). FIG. 34 suggests the role of the $Ag^+$ ions in promoting electron transfer to the vacant orbitals of the Fe atoms. Meanwhile, LUMO of the entire molecules was localized on the aromatic component indicating the tendency to accept back-donation into the empty p-orbitals. Similar calculations were conducted on the protonated forms of the inhibitors which simulate acid working media, and results are depicted in FIGS. 35A-35I and FIGS. 36A-36R (FIGS. 36A-36I and FIGS. 36J-36R correspond to HOMO and LUMO orbitals, respectively).

Figure 37A:
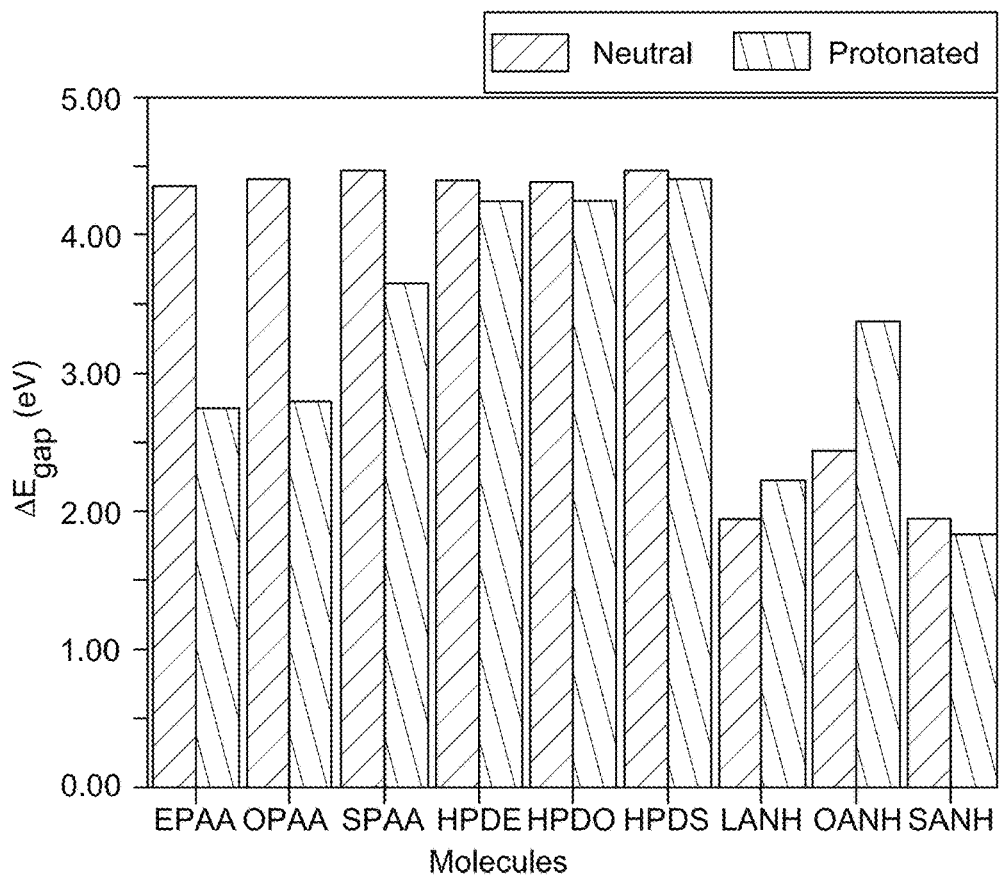
FIG. 37A is a graph depicting a frontier orbital energy gap of the protonated and non-protonated forms of the inhibitor molecules, according to certain embodiments of the present disclosure.
Figure 37B:
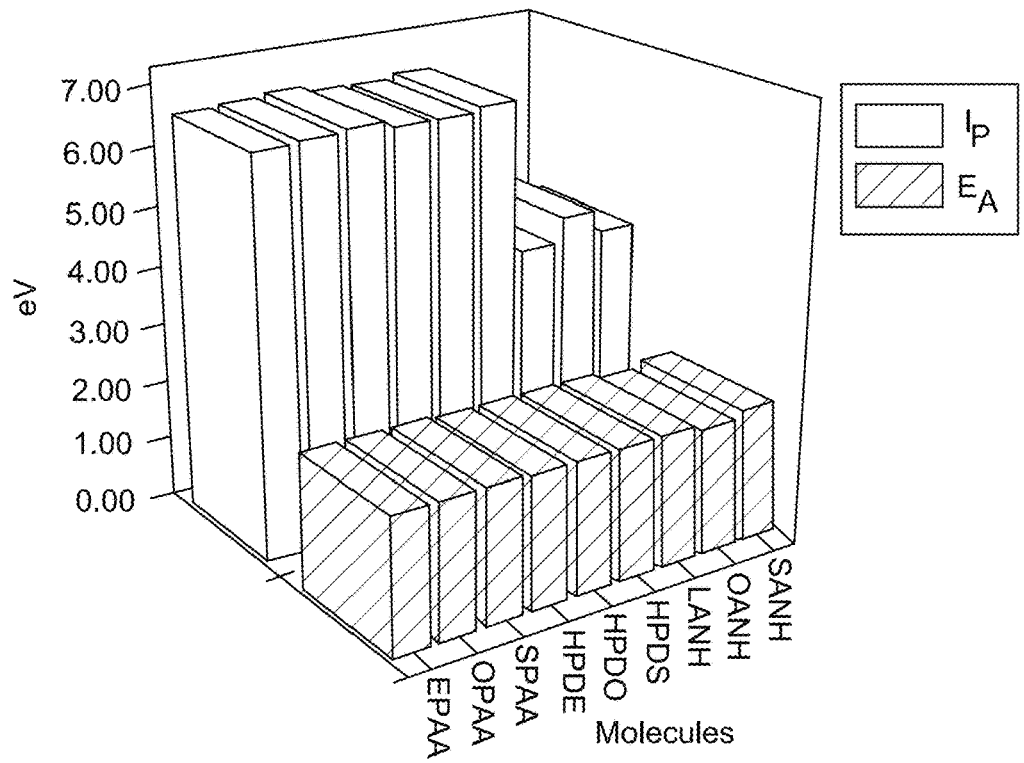
FIG. 37B is a graph depicting ionization potential ($I_p$) and electron affinities ($E_A$) of the protonated forms of the inhibitor molecules, according to certain embodiments of the present disclosure.
Figure 37C:
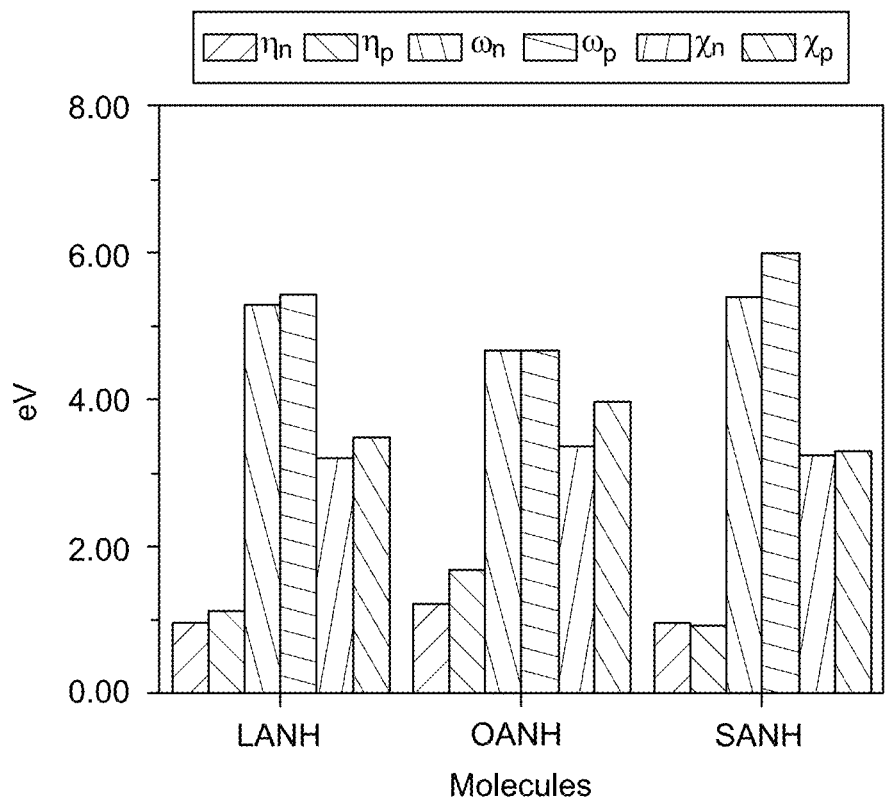
FIG. 37C is a graph depicting reactivity descriptors of hybrid molecules, according to certain embodiments of the present disclosure.
Figure 37D:
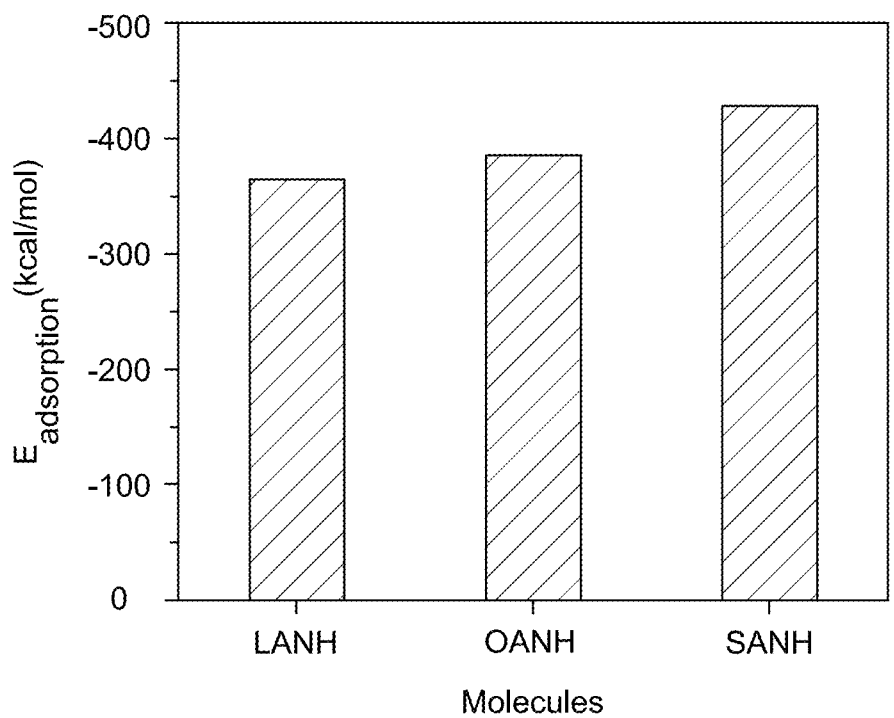
FIG. 37D is a graph depicting molecular level adsorption energies of the protonated forms of the hybrid molecules on $Fe_4$ cluster calculated at the B3LYP/6-311G** and lanl2dz levels of a theory, according to certain embodiments of the present disclosure.
Figure 38A:
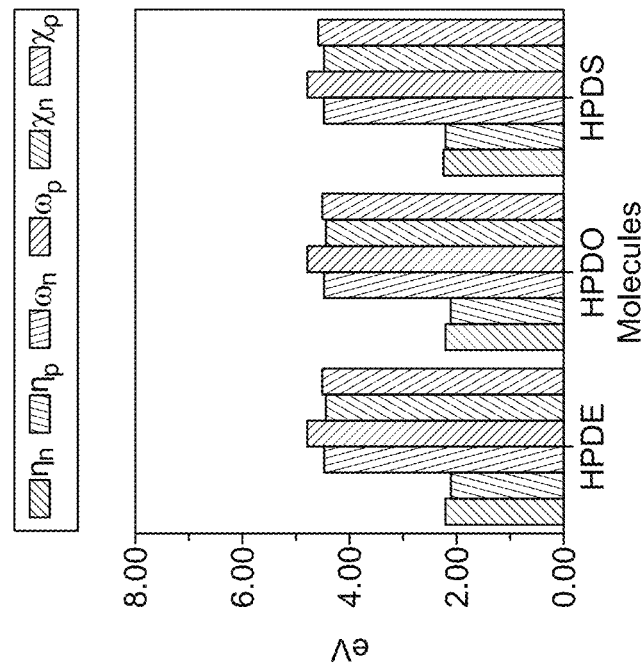
FIG. 38A is a graph depicting the reactivity descriptors of the hybrid molecules of the protonated and the non-protonated forms of the EPAA, OPAA, and SPAA molecules at the B3LYP/6-311G level of the theory, according to certain embodiments of the present disclosure.
Figure 38B:
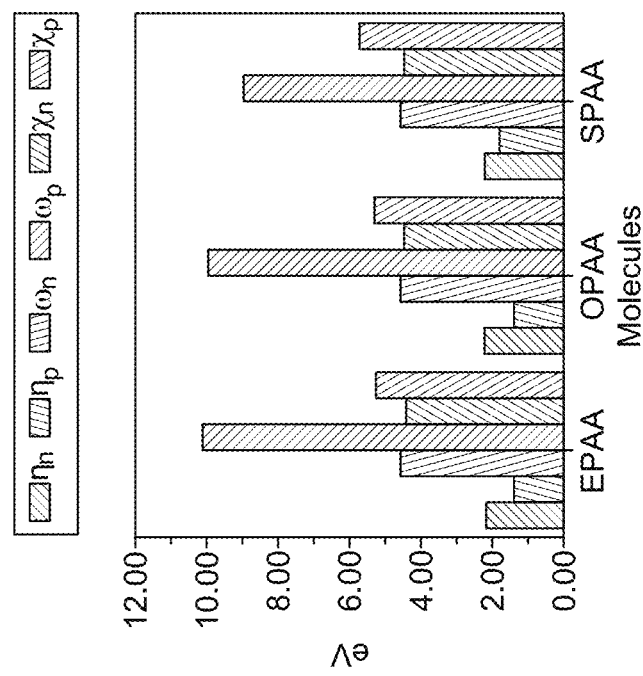
FIG. 38B is a graph depicting the reactivity descriptors of the hybrid molecules of the protonated and the non-protonated forms of the HPDE, HPDO, and HPDS molecules at the B3LYP/6-311G level of the theory, according to certain embodiments of the present disclosure.

Global reactivity descriptors include the HOMO-LUMO energy gap ($\Delta E_{gap}$), the ionization potentials ($I_p$), electron affinity ($E_A$), global hardness ($\eta$), electronegativity ($\chi$), and electrophilicity index ($\omega$) were computed for both the protonated and non-protonated forms of the inhibitors and depicted in FIGS. 37A-37D and FIGS. 38A-38B. While the EPAA, OPAA, and the SPAA molecules displayed a significant alteration in the $\Delta E_{gap}$ from neutral to the protonated forms of the inhibitors, a slight decrease was observed among the HPDE, HPDO, and HPDS molecules (FIG. 37A). A slight increase in the energy gap were observed upon protonation for the LANH, OANH, and SANH hybrid molecules. The results suggest different behaviors of the inhibitors in neutral and acid media with the SANH hybrid molecule exhibiting the lowest values in the neutral and acid media. The $I_p$ and the $E_A$ of the inhibitors (FIG. 37B) further revealed that the hybrid molecules exhibit higher inhibition potentials compared to other molecules. Other reactivity descriptors, $\eta$, $\chi$, and $\omega$ (FIG. 37C) revealed that the presence of $Ag^+$ ions in the hybrid molecules facilitated corresponding electron-donor properties and resulted in higher adsorption tendency and consequently superior inhibition tendencies in the acid medium.

The molecular level adsorption of the hybrid molecules on the mild steel surface was studied by structural modeling over a $Fe_4$ cluster. The modes of interactions of the neutral and the protonated molecules were almost similar and resulted in the formation of Fe—C aromatic bonds in the range 2.030-2.542 angstrom (Å) in the LANH and OANH. The SANH hybrid molecule showed additional Fe—Ag and Fe-Cester bonds with distances of 2.805 and 2.841 Å, respectively which falls in the range of chemisorption distances. The calculated adsorption energies are −364.7, −385.6, and −427.9 kilocalorie per mole (kcal/mol) for the LANH, OANH and SANH, respectively (FIG. 37D) which are considered very high adsorption energies. The order of the adsorption energies correlates with the weight loss corrosion data and indicates that the hybrid molecule SANH exhibits the highest corrosion inhibition efficiency.

The present disclosure is directed towards a cost-effective method of synthesizing a silver nanohybrid material that serves as an effective corrosion inhibitor against mild steel using an environmentally friendly synthesis method. The molecules which exhibit excellent corrosion inhibitive performance in the acid medium with the hybrid molecules achieving 98.8, 93.7, and 99.9% at 200 ppm, for the LANH, OANH, and SANH, respectively. The molecules exhibit chemisorption on the mild steel surface in acid media and fit the Langmuir adsorption isotherms with free energies of adsorption of −38.79, −36.52, and −38.46 kJ/mol for the LANH, OANH, and SANH, respectively. Similarly, the molecular level adsorption studies derived from density functional theory resulted in theoretical adsorption energies of −364.7, −385.6, and −427.9 kilocalories per mole (kcal/mol) for the hybrid molecules, indicating the strong adsorption and consequently higher suppression of mild steel corrosion by the compounds. Components used for the synthesis of the silver nanohybrid material are environmentally friendly materials, cheap and easily available. Further, the nonionic surfactants have a very low toxicity level, and have many different applications and uses that cannot be excluded from any industry such as wetting agents, detergents, and emulsifiers, in pharmaceuticals, cosmetics and food products.

Numerous modifications and variations of the present disclosure are possible in light of the above teachings. It is therefore to be understood that within the scope of the appended claims, the invention may be practiced otherwise than as specifically described herein.

The invention claimed is:

1. A method to synthesize a silver nanohybrid material, comprising:
   mixing a silver nitrate solution with a citrate solution to form silver nanoparticles (AgNPs);
   esterifying a first mixture comprising octadecanoic acid, octadec-9-enoic acid, and octadeca-9,12-dienoic acid with caffeic acid in the presence of an acid catalyst and a solvent to form an unsaturated carboxylic acid mixture comprising first, second, and third acrylic acid derivatives;
   reacting the unsaturated carboxylic acid mixture with ethylene glycol to form a second mixture comprising first, second, and third ester derivatives;
   mixing the silver nanoparticles with the second mixture to form a third mixture; and
   evaporating water from the third mixture to form the silver nanohybrid material, wherein the silver nanohybrid material comprises a silver nanoparticle core covered with the first, second, and third ester derivatives bonded to the silver nanoparticle core by hydrophobic tails of the first, second, and third ester derivatives.

2. The method of claim 1, wherein the citrate solution is trisodium citrate;
   the acid catalyst is p-toluene sulfonic acid and the solvent is xylene;
   the first unsaturated carboxylic acid derivative is (E)-3-(3,4-bis(stearoyloxy)phenyl)acrylic acid, the second unsaturated carboxylic acid derivative is (E)-3-(3,4-bis((E)-octadec-9-enoyloxy)phenyl)acrylic acid, and the third unsaturated carboxylic acid derivative is (E)-3-(3,4-bis((9E,12E)-octadeca-9,12-dienoyloxy)phenyl) acrylic acid;
   the first ester derivative is (E)-4-(3-(2-hydroxyethoxy)-3-oxoprop-1-en-1-yl)-1,2-phenylene distearate, the second ester derivative is (Z)-4-((E)-3-(2-hydroxyethoxy)-3-oxoprop-1-en-1-yl)-1,2-phenylene dioleate (HDPO), and the third ester derivative is (9Z,9'Z,12Z,12'Z)-4-((E)-3-(2-hydroxyethoxy)-3-oxoprop-1-en-1-yl)-1,2-phenylene bis(octadeca-9,12-dienoate).

3. The method of claim 1, wherein the octadecanoic acid, the octadec-9-enoic acid, and the ocatdeca-9,12-dienoic acid are present in the first mixture in an amount ranging from 0.005 mole to 0.25 mole per mole solvent.

4. The method of claim 1, wherein the ethylene glycol is present in an amount from 0.005 mole to 0.25 mole per mole unsaturated carboxylic acid mixture.

5. The method of claim 1, wherein the acid catalyst is present in an amount from 0.01 weight % (wt. %) to 1 wt. % of the solvent.

6. The method of claim 1, wherein the citrate solution is present in an amount from 1 milliliter (mL) to 25 mL per mL of the silver nitrate solution.

7. The method of claim 1, wherein the esterifying occurs in a temperature range of from 125 degrees Celsius (° C.) to 175° C.

8. The method of claim 1, wherein the esterifying further comprises washing the formed unsaturated carboxylic acid mixture with petroleum ether.

9. The method of claim 2, wherein the solvent consists essentially of xylene.

10. The method of claim 2, wherein the solvent consists of xylene.

11. The method of claim 1, wherein the silver nanoparticles are added to the second mixture in the form of a suspension, and the silver nanoparticles are present in the suspension at a weight percent (wt. %) of at least 1 wt. % per total weight of the suspension.

* * * * *